US012038493B2

(12) United States Patent
Beg et al.

(10) Patent No.: US 12,038,493 B2
(45) Date of Patent: Jul. 16, 2024

(54) SYSTEMS AND METHODS FOR MOTION DETECTION USING SENSING TRANSMISSION CLUSTERS

(71) Applicant: COGNITIVE SYSTEMS CORP., Waterloo (CA)

(72) Inventors: Chris Beg, Waterloo (CA); Mohammad Omer, Waterloo (CA)

(73) Assignee: COGNITIVE SYSTEMS CORP., Waterloo (CA)

( * ) Notice: Subject to any disclaimer, the term of this patent is extended or adjusted under 35 U.S.C. 154(b) by 0 days.

(21) Appl. No.: 18/185,851

(22) Filed: Mar. 17, 2023

(65) Prior Publication Data

US 2024/0085551 A1     Mar. 14, 2024

Related U.S. Application Data

(60) Provisional application No. 63/379,077, filed on Oct. 11, 2022, provisional application No. 63/374,973, filed on Sep. 8, 2022.

(51) Int. Cl.
| | |
|---|---|
| *G01S 13/62* | (2006.01) |
| *H04W 84/18* | (2009.01) |
| *H04W 4/38* | (2018.01) |
| *H04W 84/12* | (2009.01) |

(52) U.S. Cl.
CPC ............. *G01S 13/62* (2013.01); *H04W 84/18* (2013.01); *H04W 4/38* (2018.02); *H04W 84/12* (2013.01)

(58) Field of Classification Search
CPC ......... G01S 13/62; H04W 84/18; H04W 4/38; H04W 84/12
See application file for complete search history.

(56) References Cited

U.S. PATENT DOCUMENTS 11,711,183 B2 *   7/2023   Cherian ................ H04L 5/0035
                                                                        370/330
11,711,763 B2 *   7/2023   Park .................. H04W 52/0216
                                                                        370/329
(Continued)

FOREIGN PATENT DOCUMENTS

| WO | 2019/109163 A1 | 6/2019 |
| WO | 2019/222829 A1 | 11/2019 |
| WO | 2021/081635 A1 | 5/2021 |

OTHER PUBLICATIONS

International Search Report, International Application No. PCT/IB2023/058825, Mailing Date: Dec. 14, 2023.

*Primary Examiner* — Ernest G Tacsik
(74) *Attorney, Agent, or Firm* — MEDLER FERRO WOODHOUSE & MILLS PLLC

(57) ABSTRACT

Systems and methods for Wi-Fi sensing are provided. A networking device is configured to transmit a sensing trigger message including information about a plurality of fast sounding sensing signals to be transmitted. The networking device receives the plurality of fast sounding sensing signals transmitted by a sensing transmitter in response to the sensing trigger message within a transmission opportunity. The networking device performs a plurality of sensing measurements on the plurality of fast sounding sensing signals wherein the plurality of sensing measurements include measurements of Doppler frequency information associated with motion in a sensing space.

26 Claims, 48 Drawing Sheets

(56) References Cited

U.S. PATENT DOCUMENTS

| | | | |
|---|---|---|---|
| 11,711,804 B2* | 7/2023 | Sethi | H04W 72/1273 |
| | | | 370/329 |
| 11,711,847 B2* | 7/2023 | Abouelseoud | H04W 74/0808 |
| | | | 370/329 |
| 2017/0086202 A1* | 3/2017 | Chen | H04W 72/541 |
| 2018/0213424 A1* | 7/2018 | Du | H04W 24/00 |
| 2019/0013978 A1* | 1/2019 | Zhou | H04L 1/0006 |
| 2020/0359248 A1* | 11/2020 | Sadeghi | H04W 28/18 |
| 2020/0400778 A1* | 12/2020 | da Silva | H04W 8/005 |
| 2021/0211973 A1* | 7/2021 | Chen | H04W 48/16 |
| 2021/0273735 A1 | 9/2021 | Da Silva et al. | |
| 2021/0288779 A1 | 9/2021 | Da Silva et al. | |
| 2022/0026519 A1* | 1/2022 | Wu | G01S 7/006 |
| 2022/0070710 A1* | 3/2022 | Lim | H04W 24/10 |
| 2022/0286885 A1* | 9/2022 | Wang | G01S 5/0278 |
| 2022/0304051 A1* | 9/2022 | Aboul-Magd | H04B 7/0626 |
| 2022/0327360 A1* | 10/2022 | Merlin | H04W 16/20 |
| 2023/0216631 A1* | 7/2023 | Dong | H04B 7/04 |
| | | | 370/329 |
| 2023/0236307 A1* | 7/2023 | Kim | G01S 7/006 |
| | | | 342/52 |

\* cited by examiner

FIG. 7A

| Category | Public Action | Dialog Token | Measurement Setup ID | DMG Sensing Measurement Setup Element | Sensing Measurement Parameters Element |
|---|---|---|---|---|---|
| 1 | 1 | 1 | TBD | TBD | TBD |

Octets:

FIG. 7B

| Element ID | Length | Element ID Extension | Sensing Measurement Parameters | TBD |
|---|---|---|---|---|
| 1 | 1 | 1 | TBD | TBD |

Octets:

FIG. 7C

| Sensing Transmitter | Sensing Receiver | Sensing Measurement Report | Measurement Report Type |
|---|---|---|---|
| 1 | 1 | TBD | TBD |

Bits: 1, 1, TBD, TBD

FIG. 7D

| Category | Public Action | Dialog Token | Status Code | DMG Sensing Measurement Setup Element | Sensing Measurement Parameters Element |
|---|---|---|---|---|---|
| 1 | 1 | 1 | TBD | TBD | TBD |

Octets: 1, 1, 1, TBD, TBD, TBD

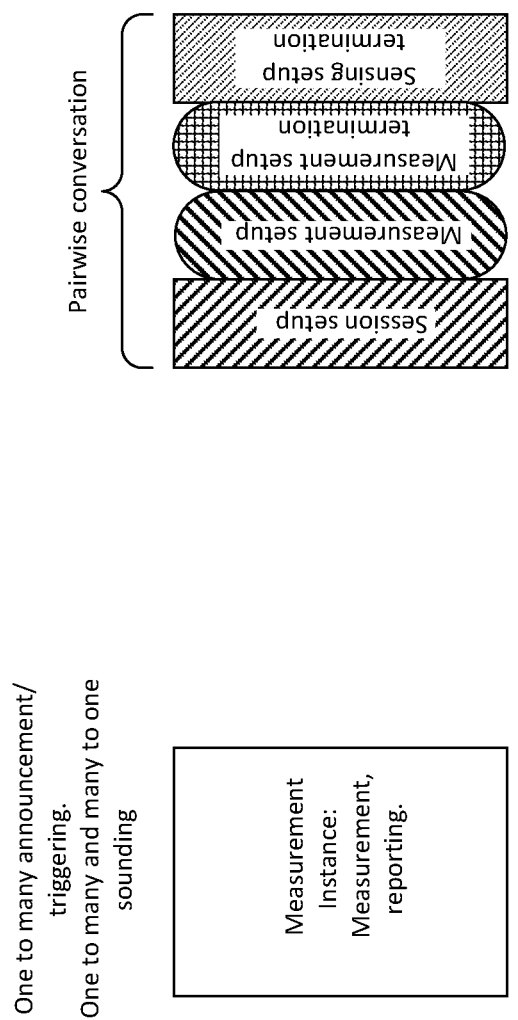

| B0 B3 | B4 B15 | B16 | B17 | B18 B19 | B20 B21 | B22 | B23 B25 |
|---|---|---|---|---|---|---|---|
| Trigger Type | UL Length | More TF | CS Required | UL BW | GI And HE-LTF Type | MU-MIMO HE-LTF Mode | Number Of HE-LTF Symbols And Mid-Amble Periodicity |
| 4 | 12 | 1 | 1 | 2 | 2 | 1 | 3 |

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRO) |
| 7 | NDP Feedback Report Poll (NFRP) |
| 8 | Ranging |
| 9-15 | Reserved |

FIG. 15B

| B7..B1 of the RU Allocation subfield | UL BW subfield | RU Size | RU Index |
|---|---|---|---|
| 53,54 | 20 MHz, 40 MHz, 80 MHz, 80+80 MHz or 160 MHz | 106 | RU1 and RU2 respectively |
| 55,56 | 40 MHz, 80 MHz, 80+80 MHz or 160 MHz | | RU3 and RU4 respectively |
| 57..60 | 80 MHz, 80+80 MHz or 160 MHz | | RU5..RU8 respectively |
| 61 | 20 MHz, 40 MHz, 80 MHz, 80+80 MHz or 160 MHz | 242 | RU1 |
| 62 | 40 MHz, 80 MHz, 80+80 MHz or 160 MHz | | RU2 |
| 63,64 | 80 MHz, 80+80 MHz or 160 MHz | | RU3 and RU4 respectively |
| 65 | 40 MHz, 80 MHz, 80+80 MHz or 160 MHz | 484 | RU1 |
| 66 | 80 MHz, 80+80 MHz or 160 MHz | | RU2 |
| 67 | 80 MHz, 80+80 MHz or 160 MHz | 996 | RU1 |
| 68 | 80+80 MHz or 160 MHz | 2×996 | RU1 |

| Category | Public Action | Dialog Token | Sensing Measurement Report element(s) |
|---|---|---|---|
| 1 | 1 | 1 | variable |

Octets:

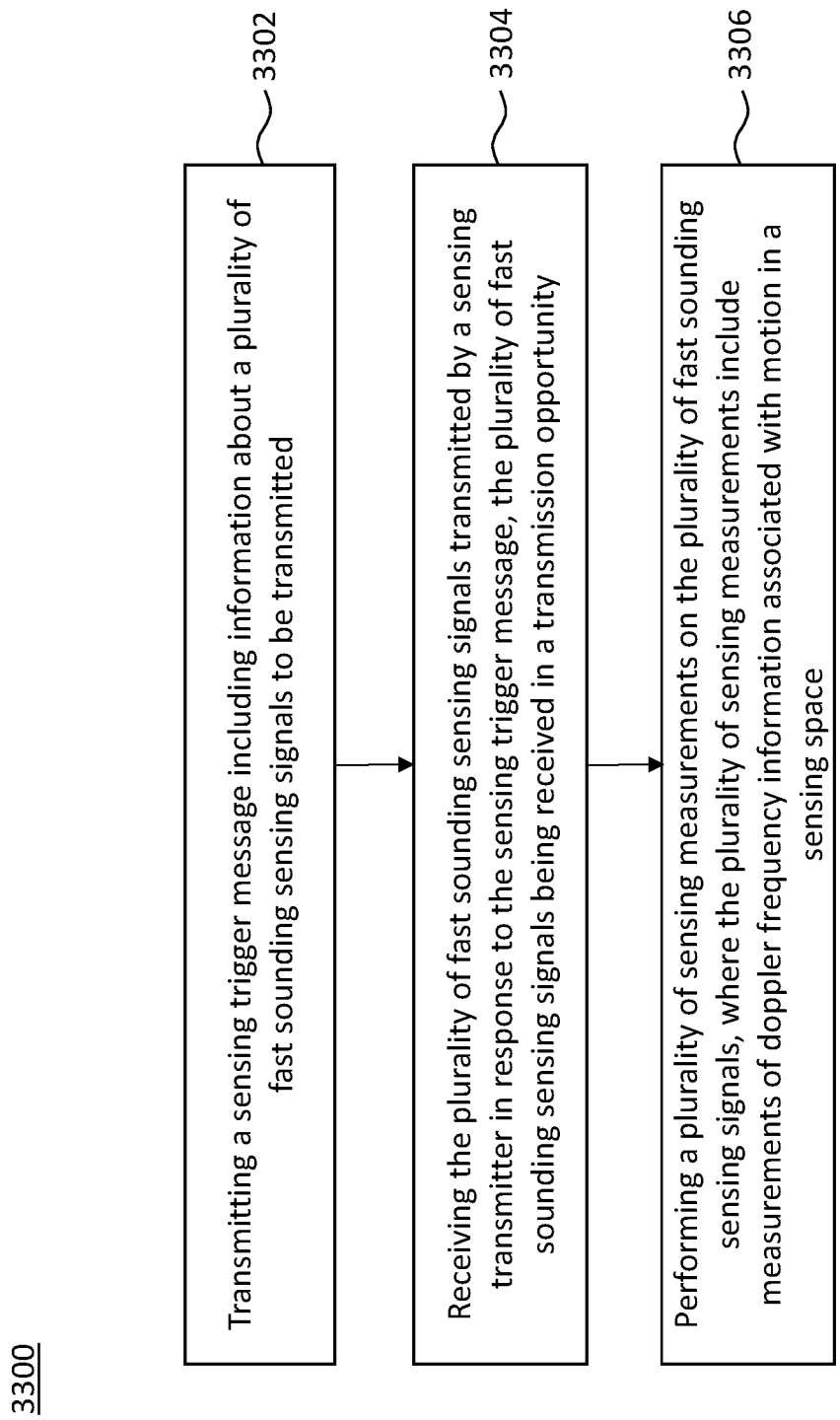

SYSTEMS AND METHODS FOR MOTION DETECTION USING SENSING TRANSMISSION CLUSTERS

RELATED APPLICATIONS

This application claims priority to U.S. Provisional Application No. 63/374,973, filed Sep. 8, 2022 and to U.S. Provisional Application No. 63/379,077, filed Oct. 11, 2022, both of which are hereby incorporated herein in their entirety.

TECHNICAL FIELD

The present disclosure generally relates to systems and methods for Wi-Fi sensing. In particular, the present disclosure relates to systems and methods for motion detection in Wi-Fi sensing using sensing transmission clusters.

BACKGROUND OF THE DISCLOSURE

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems. A Wi-Fi sensing system (which may be referred to as a WLAN sensing system) is one recent addition to motion detection systems. A Wi-Fi sensing system may be a network of Wi-Fi-enabled devices that may be a part of an IEEE 802.11 network. In an example, a Wi-Fi sensing system may be configured to detect features of interest in a sensing space. A sensing space may refer to any physical space in which a Wi-Fi sensing system may operate and may include a place of abode, a place of work, a shopping mall, a sports hall or sports stadium, a garden, or any other physical space. A Wi-Fi sensing system may be a network of Wi-Fi-enabled devices which are part of an IEEE 802.11 network (sometimes referred to as a basic service set (BSS) or extended service set (ESS)). The features of interest may include motion of objects and motion tracking, presence detection, intrusion detection, gesture recognition, fall detection, breathing rate detection, and other applications.

BRIEF SUMMARY OF THE DISCLOSURE

Systems and methods are provided for motion detection in Wi-Fi sensing using sensing transmission clusters. In an example embodiment, a method for Wi-Fi sensing carried out by a networking device configured to operate as a sensing responder and including at least one processor configured to execute instructions is described. The method includes transmitting, by the sensing responder, a sensing trigger message including information about a plurality of fast sounding sensing signals to be transmitted. In some embodiments, the method includes receiving, by the sensing responder, the plurality of fast sounding sensing signals transmitted by a sensing transmitter in response to the sensing trigger message, the plurality of fast sounding sensing signals being received in a transmission opportunity. In some embodiments, the method includes performing, by the sensing responder, a plurality of sensing measurements on the plurality of fast sounding sensing signals, where the plurality of sensing measurements include measurements of Doppler frequency (also referred to as Doppler signature) information associated with motion in a sensing space.

In some embodiments, the method includes receiving, by the sensing responder, a plurality of slow sounding sensing signals transmitted by the sensing transmitter, the plurality of slow sounding sensing signals being received in one or more availability windows, and performing, by the sensing responder, a second plurality of sensing measurements on the plurality of slow sounding sensing signals, where detecting motion in the sensing space is based on the plurality of sensing measurements performed on the plurality of fast sounding sensing signals and the second plurality of sensing measurements performed on the plurality of slow sounding sensing signals.

In some embodiments, at least one of the plurality of fast sounding sensing signals is included in at least one of the plurality of slow sounding sensing signals.

In some embodiments, at least one of the plurality of slow sounding sensing signals is transmitted in response to a regular sensing sounding trigger frame.

In some embodiments, the method includes associating a time stamp with one or more sensing measurements performed on one or more of the plurality of slow sounding sensing signals.

In some embodiments, the method includes associating a plurality of time stamps with one or more sensing measurements performed on one or more of the plurality of fast sounding sensing signals.

In some embodiments, the sensing trigger message is a sensing sounding trigger frame.

In some embodiments, the method includes receiving, by the sensing responder, the plurality of fast sounding sensing signals as a series of sensing transmissions transmitted one short interframe space apart from one another.

In some embodiments, the method includes identifying, by the sensing responder from the sensing trigger message, a predefined number of fast sounding sensing signals to be received within the transmission opportunity.

In some embodiments, the method includes receiving, by the sensing responder, the plurality of fast sounding sensing signals as a plurality of frames within a sensing transmission.

In some embodiments, the plurality of frames includes a predefined number of high efficiency long training fields.

In some embodiments, the method includes transmitting, by the sensing responder, a plurality of sensing trigger messages including the sensing trigger message, and receiving, by the sensing responder, the plurality of fast sounding sensing signals transmitted in response to respective ones of the plurality of sensing trigger messages.

In some embodiments, the plurality of fast sounding sensing signals include a plurality of sensing transmissions, each including at least one high efficiency long training field.

In some embodiments, the method includes receiving the plurality of fast sounding sensing signals at a rate configured to sense an object moving at at least a threshold speed within a channel of the plurality of fast sounding sensing signals without aliasing. In an example, the threshold speed is 3.0 m/s.

In some embodiments, the method includes receiving the plurality of fast sounding sensing signals at an average rate of at least 280 Hz.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 7A depicts an example of a Sensing Measurement Setup Request frame format, according to some embodiments.

FIG. 7B illustrates an example of a Sensing Measurement Parameters element, according to some embodiments.

FIG. 7C illustrates an example of a format of a Sensing Measurement Parameters field, according to some embodiments.

FIG. 7D depicts an example of a Sensing Measurement Setup Response frame, according to some embodiments.

FIG. 8A depicts one-to-many and many-to-one aspects of an example of a WLAN sensing procedure, according to some embodiments.

FIG. 8B depicts pairwise aspects of an example of a WLAN sensing procedure, according to some embodiments.

FIG. 15A to FIG. 15H depict a hierarchy of fields within a sensing trigger, according to some embodiments.

FIG. 23 depicts an example of a format of a Sensing Measurement Report frame, according to some embodiments.

FIG. 33 depicts a flowchart for performing a plurality of sensing measurements on a plurality of fast sounding sensing signals to detect motion in a sensing space, according to some embodiments.

DETAILED DESCRIPTION

Figure 1:
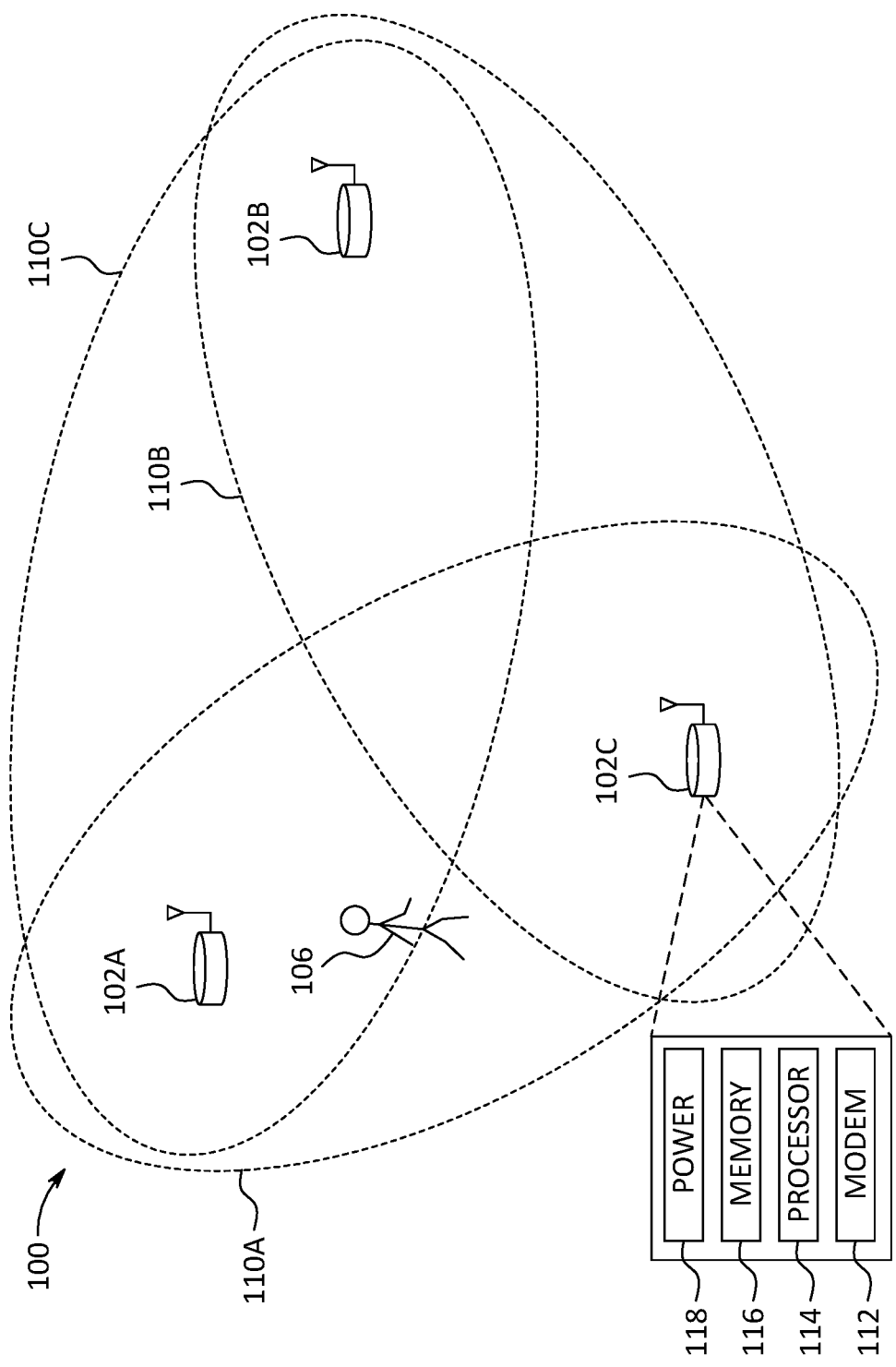
FIG. 1 is a diagram showing an example wireless communication system.

Wireless sensing enables a device to obtain sensing measurements of transmission channel(s) between two or more devices. With the execution of a wireless sensing procedure, it is possible for a device to obtain sensing measurements useful for detecting and tracking changes in the environment. In some aspects of what is described herein, a wireless sensing system may be used for a variety of wireless sensing applications by processing wireless signals (e.g., radio frequency (RF) signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, a wireless sensing system may be configured to control measurement rates, wireless connections, and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate similar to a bistatic radar system, where a Wi-Fi access point (AP) assumes the receiver role, and each Wi-Fi device (station (STA), node, or peer) connected to the AP assumes the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information, etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at some angles experience constructive interference while others experience destructive interference.

The channel information for each of the communication links may be analyzed (e.g., by a hub device or other device in a wireless communication network, or a sensing transmitter, sensing receiver, or sensing initiator communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered or caused to make sensing transmissions or sensing measurements less frequently. In some implementations, when motion is present, for example, the wireless sensing system can increase the triggering rate or sensing transmissions rate or sensing measurement rate to produce a time-series of measurements with finer time resolution. Controlling a variable sensing measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or extended service set (ESS) topology, multiple coordinating wireless APs each provide a basic service set (BSS) which may occupy different frequency bands and allow devices to transparently move between from one participating AP to another (e.g., mesh). For instance, within a home mesh network, Wi-Fi devices can connect to any of the APs, but typically select one with good signal strength. The coverage footprint of the mesh APs typically overlap, often putting each device within communication range or more than one AP. If the AP supports multi-bands (e.g., 2.4 GHz and 5 GHz), the wireless sensing system may keep a device connected to the same physical AP but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage, or to better localize motion within an area.

In some cases, beamforming may be performed between wireless communication devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, many beamforming matrices (e.g., feedback matrices or steering matrices) may be generated to represent a multitude of directions that an object may be located relative to a wireless communication device. These many beamforming matrices may be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on environmental conditions. In some cases, such controls can improve operation of the motion detection system or provide other technical advantages. For example, the measurement rate may be controlled in a manner that optimizes or otherwise improves air-time usage versus detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

In various embodiments of the disclosure, non-limiting definitions of one or more terms that will be used in the description are provided below.

A wireless access point (WAP) or simply an access point (AP) is a networking device in a WLAN network that allows other networking devices in a WLAN network to connect to a wired network. In examples, an AP creates a wireless local area network.

A station (STA) is any device that is connected to a WLAN network and which contains 802.11 compliant MAC and PHY interface to the wireless medium. A STA may be a laptop, desktop, smartphone, or a smart appliance. A STA may be fixed, mobile or portable. A STA that does not take on the roles of an AP may be referred to as a non-AP STA.

A term "transmission opportunity (TXOP)" may refer to a negotiated interval of time during which a particular quality of service (QoS) station (e.g., a STA, an AP, or either a STA or an AP, for example in the role of a sensing initiator, a sensing responder, a sensing transmitter or a sensing receiver) may have the right to initiate a frame exchange onto a wireless medium. A QoS access category (AC) of the transmission opportunity may be requested as part of a service or session negotiation.

A term "Quality of Service (QoS) access category (AC)" may refer to an identifier for a frame which classifies a priority of transmission that the frame requires. In an example, four QoS access categories are defined namely AC_VI: Video, AC_VO: Voice, AC_BE: Best-Effort, and AC_BK: Background. Further, each QoS access category may have different TXOP parameters defined for it.

A term "short interframe space (SIFS)" may refer to a period within which a processing element (for example, a microprocessor, dedicated hardware, or any such element) within a device of a Wi-Fi sensing system is able to process data presented to it in a frame. In an example, a short interframe space may be 10 ms.

A term "PHY-layer Protocol Data Unit (PPDU)" may refer to a data unit that includes preamble and data fields. The preamble field may include transmission vector format information and the data field may include payload and higher layer headers.

A term "null data PPDU (NDP)" may refer to a PPDU that does not include a data field. In an example, a null data PPDU may be used for a sensing transmission, where a MAC header of the NDP includes information required for a sensing receiver to make a sensing measurement on the sensing transmission.

A term "transmission parameters" may refer to a set of IEEE 802.11 PHY transmitter configuration parameters which are defined as a part of transmission vector (TXVECTOR) corresponding to a specific PHY and which may be configurable for each PHY-layer PPDU transmission or each null data PPDU (NDP) transmission.

A term "resource unit (RU)" may refer to an allocation of orthogonal frequency division multiplexing (OFDM) channels which may be used to carry a modulated signal. An RU may include a variable number of carriers depending on the mode of the modem.

A term "tone" may refer to an individual subcarrier in an OFDM signal. A tone may be represented in time domain or frequency domain. In time domain, a tone may also be referred to as a symbol. In frequency domain, a tone may also be referred to as a subcarrier.

A term "sensing goal" may refer to a goal of a sensing activity at a time. A sensing goal is not static and may change at any time. In an example, a sensing goal may require sensing measurements of a specific type, a specific format, or a specific precision, resolution, or accuracy to be available to a sensing algorithm.

A term "sensing space" may refer to any physical space in which a Wi-Fi sensing system may operate.

A term "wireless local area network (WLAN) sensing session" or "Wi-Fi sensing session" may refer to a period during which objects in a physical space may be probed, detected and/or characterized. In an example, during a WLAN sensing session, several devices participate in, and thereby contribute to the generation of sensing measurements. A WLAN sensing session may be referred to as a "measurement campaign."

A term "non-sensing message" may refer to a message which is not primarily related to sensing. In an example, non-sensing messages may include data, management, and control messages.

A term "sensing measurement" may refer to a measurement of a state of a wireless channel between a transmitter device (for example, a sensing transmitter) and a receiver device (for example, a sensing receiver) derived from a sensing transmission. In an example, sensing measurement may also be referred to as channel response measurement.

A term "sensing algorithm" may refer to a computational algorithm that achieves a sensing goal. A sensing algorithm may be executed on any device in a Wi-Fi sensing system.

Wireless network management (WNM) may provide information on network conditions and may also provide a means to obtain and exchange WLAN sensing information.

A sensing receiver is a station (STA) that receives sensing transmissions (for example, PPDUs or any other transmission including a data transmission which may be opportunistically used as a sensing transmission) sent by a sensing transmitter and performs sensing measurements as part of a WLAN sensing procedure. An AP is an example of a sensing receiver. In some examples, a STA may also be a sensing receiver.

A sensing transmitter is a station (STA) that transmits a sensing transmission (for example, PPDUs or any other transmission) used for sensing measurements (for example, channel state information) in a WLAN sensing procedure. In an example, a STA is an example of a sensing transmitter. In some examples, an AP may be a sensing transmitter for Wi-Fi sensing purposes, for example where a STA acts as a sensing receiver.

A sensing initiator is a station (STA) that initiates a WLAN sensing procedure. The role of sensing initiator may be taken on by a sensing receiver, a sensing transmitter, or a separate device which includes a sensing algorithm (for example, a remote processing device).

A sensing responder is a station (STA) that participates in a WLAN sensing procedure initiated by a sensing initiator. The role of sensing responder may be taken on by a sensing receiver or a sensing transmitter. In examples, multiple sensing responders may take part in a Wi-Fi sensing session.

A term "sensing transmission" may refer to a transmission made from a sensing transmitter to a sensing receiver which may be used to make a sensing measurement. In an example, a sensing transmission may also be referred to as wireless sensing signal or wireless signal.

A term "sensing trigger message" may refer to a message sent from a sensing initiator to a sensing transmitter to initiate or trigger one or more sensing transmissions.

A term "sensing response message" may refer to a message which is included within a sensing transmission from a sensing transmitter to a sensing receiver. A sensing transmission that includes a sensing response message may be used by a sensing receiver to perform a sensing measurement.

A term "sensing response announcement" may refer to a message that is included within a sensing transmission from a sensing transmitter to a sensing receiver that announces that a sensing response NDP will follow within a short interframe space (SIFS). An example of a sensing response announcement is an NDP announcement, or NDPA. In examples, a sensing response NDP may be transmitted using a requested transmission configuration.

A term "sensing response NDP" may refer to a response transmitted by a sensing transmitter and used for a sensing measurement at a sensing receiver. In examples, a sensing response NDP may be used when a requested transmission configuration is incompatible with transmission parameters required for successful non-sensing message reception. A sensing response NDP may be announced by a sensing response announcement. In an example, a sensing response NDP may be implemented with a null data PPDU. In some examples, a sensing response NDP may be implemented with a frame that does not contain any data.

A term "channel representation information (CRI)" may refer to properties of a communications channel, such as how wireless signals propagate from a sensing transmitter to a sensing receiver along multiple paths, that are known or measured by a technique of channel estimation. For example, CRI may refer to one or more sensing measurements made on one or more sensing transmissions during a sampling instance which together represent the state of the channel at the sampling instance between two devices.

A term "channel state information (CSI)" may refer to an example of CRI which is represented in a frequency domain. CSI is typically a matrix of complex values representing the amplitude attenuation and phase shift of signals, which provides an estimation of a communications channel.

A term "time-domain channel representation information (TD-CRI)" may refer to an example of CRI which is represented in a time domain. TD-CRI may be generated by applying an inverse transform, such as an IDFT or an IFFT, to CSI.

A term "feature of interest" may refer to item or state of an item in a sensing space which is positively detected and/or identified by a sensing algorithm.

A term "requested transmission configuration" may refer to transmission parameters a sensing transmitter is requested to use when sending a sensing transmission.

A term "delivered transmission configuration" may refer to transmission parameters applied by a sensing transmitter to a sensing transmission.

A term "steering matrix configuration" may refer to a matrix of complex values representing real and complex phase required to pre-condition one or more antenna of a radio frequency (RF) transmission signal chain for each transmit signal. Application of a steering matrix configuration (for example, by a spatial mapper) enables beamforming and beam-steering.

A term "spatial mapper" may refer to a signal processing element that adjusts the amplitude and phase of a signal input to an RF transmission chain in a sensing transmitter. A spatial mapper may include elements to process the signal to each RF chain implemented. The operation carried out may be called spatial mapping. The output of a spatial mapper is one or more spatial streams.

A term "aliasing" may refer to a signal processing phenomenon that may occur when the sampling rate of a received signal is insufficient to unambiguously determine the frequency of the received signal.

A term "signal to noise ratio (SNR)" may refer to a measure of the strength of a desired signal relative to background noise (undesired signal).

A term "sounding" may refer to a measurement of the impulse response of a channel which is based on emitting RF signal from one antenna and receiving the RF signal.

A term "guard interval" may refer to the space between symbols (not packets) being transmitted, the purpose of which is to eliminate inter-symbol interference (ISI).

A term "responder-to-initiator (R2I)" may indicate the direction of transmission of a packet.

A term "initiator-to-responder (I2R)" may indicate the direction of transmission of a packet.

A term "Fresnel Zone" is a reference to a three dimensional space around a direct line between a sensing transmitter and a sensing receiver capturing the situation that some of the signals may travel directly along the path from the sensing transmitter to the sensing receiver while other signals travel off of this straight line on paths off axis which results in their transmission paths to be of a longer distance, causing phase shift between these different beams.

A term "long training field (LTF)" may be a part of the preamble in 802.11 WLAN, which may be used for fine carrier frequency offset synchronization, fine time synchronization, and channel estimation.

A term "availability window" or "availability window instance" is a time window referenced to the end of the previous measurement instance. During the time window, an initiating device may come to the channel at any time and use contention based access to initiate a new measurement exchange. In examples, a potential responding device needs to be awake and active during the availability window.

A term "time stamp" may refer to a value associated with a sensing measurement which indicates a time reference for the sensing measurement. In an example, a sensing algorithm may use timestamp for calculating a sensing result.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes systems and methods that are useful for a wireless sensing system configurated to send sensing transmissions and make sensing measurements.

Section C describes embodiments of systems and methods that are useful for motion detection in Wi-Fi sensing using sensing transmission clusters.

A. Wireless Communications System, Wireless Transmissions and Sensing Measurements FIG. 1 illustrates wireless communication system 100. Wireless communication system 100 includes three wireless communication devices: first wireless communication device 102A, second wireless communication device 102B, and third wireless communication device 102C. Wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a wireless local area network (WLAN), a personal area network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., Bluetooth®, Near Field Communication (NFC), ZigBee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as code division multiple access (CDMA), wideband code division multiple access (WCDMA), Universal Mobile Telecommunications System (UMTS), and time division synchronous code division multiple access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include standard wireless network components. For example, wireless communication devices 102A, 102B, 102C may be commercially-available Wi-Fi APs or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially-available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional, or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate RF signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and RF circuitry. The RF circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or may include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to RF signals, and wirelessly transmits the RF signals (e.g., through an antenna). In some instances, the radio subsystem in modem 112 wirelessly receives RF signals (e.g., through an antenna), down-converts the RF to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes herein disclosed.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an alternating current (AC) adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to FIG. 33, FIG. 34A, and FIG. 34B, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples, data will be added for the express purpose of motion detection, or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
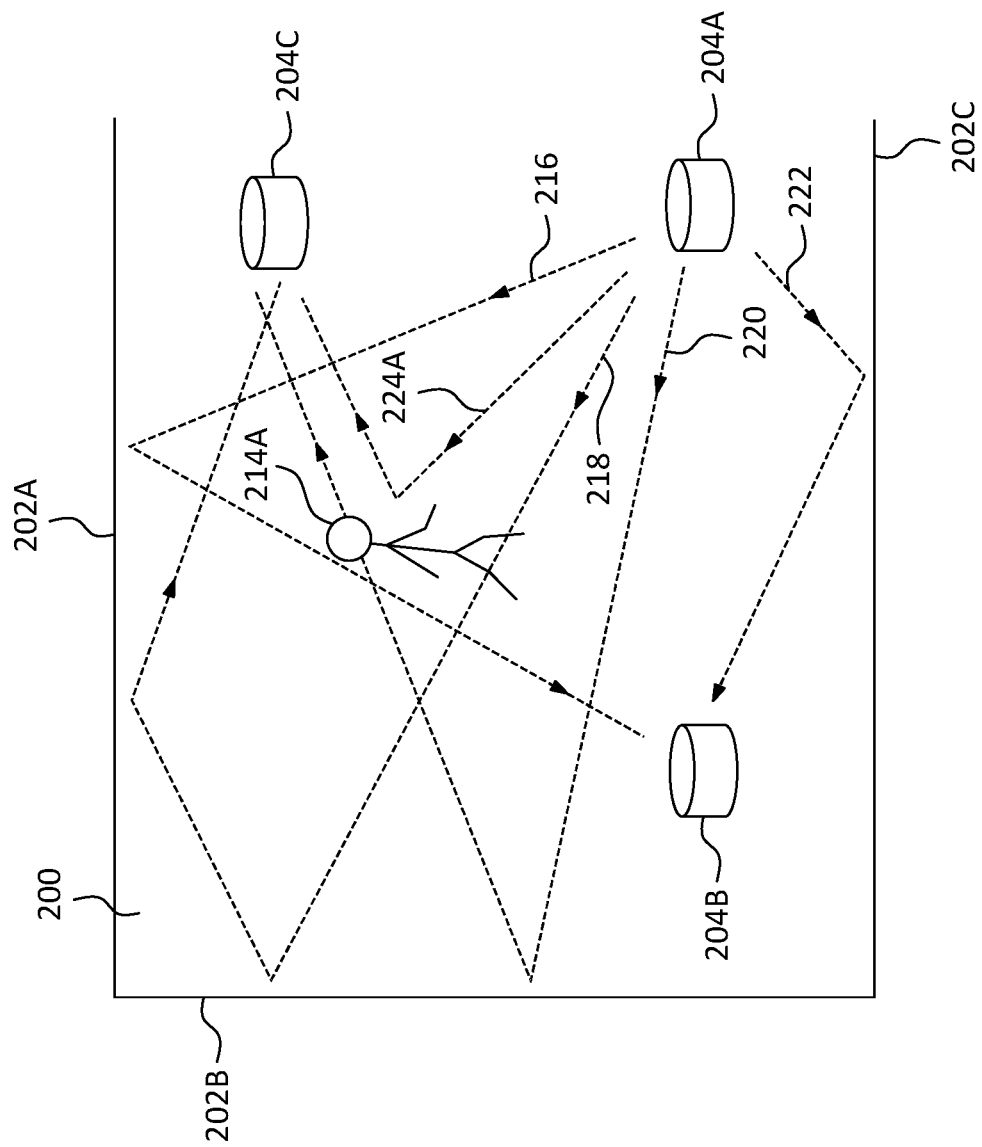
FIG. 2A and FIG. 2B are diagrams showing example wireless signals communicated between wireless communication devices.
Figure 2B:
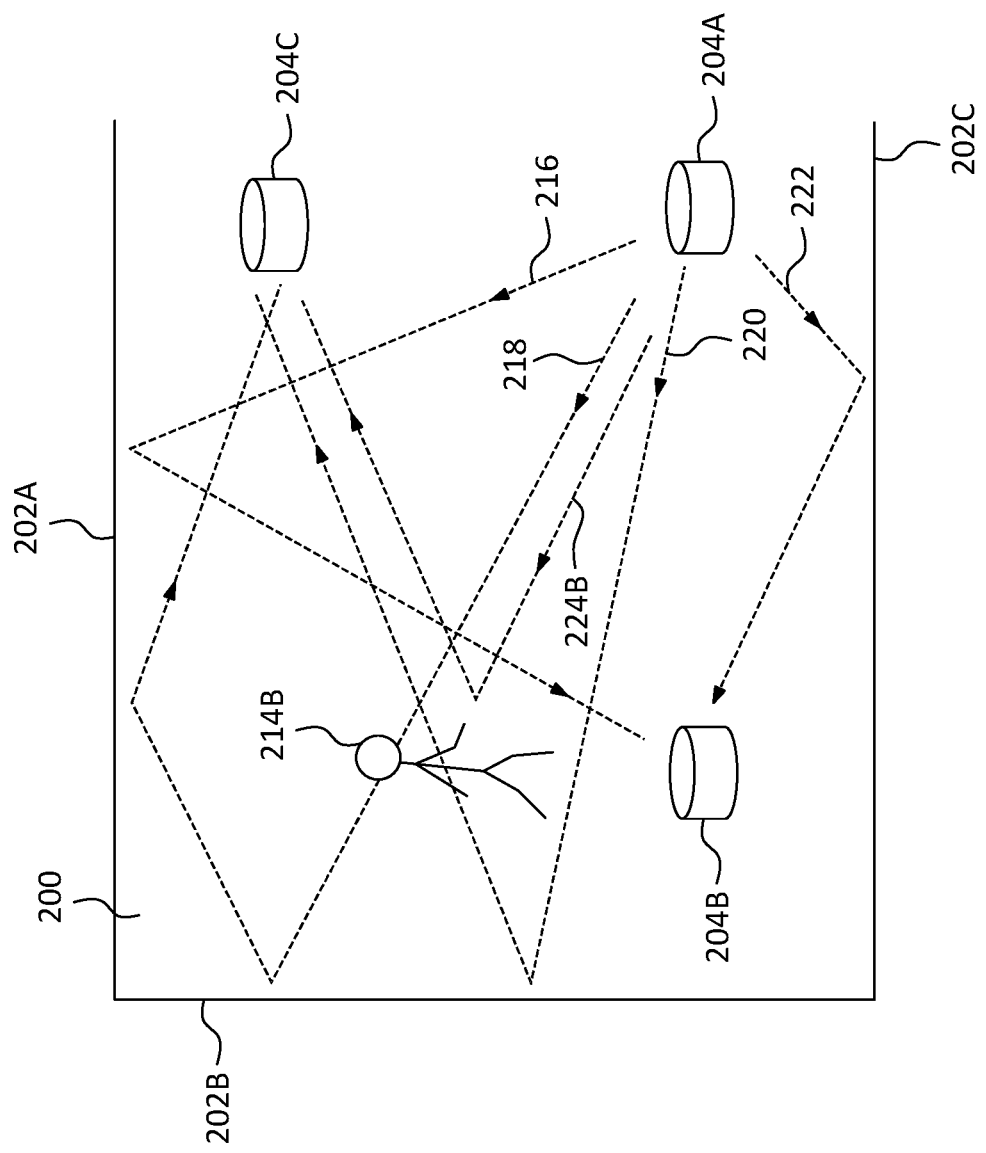

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. In an example, space 200 may be a sensing space. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t)=\Sigma_{n=-\infty}^{\infty} c_n e^{j\omega_n t} \quad (1)$$

Where $\omega_n$ represents the frequency of nth frequency component of the transmitted signal, $c_n$ represents the complex coefficient of the nth frequency component, and t represents time. With the f(t) being transmitted from the first wireless communication device 204A, an output signal $r_k(t)$ from a path, k, may be described according to Equation (2):

$$r_k(t)=\Sigma_{n=-\infty}^{\infty} \alpha_{n,k} c_n e^{j(\omega_n t + \phi_{n,k})} \quad (2)$$

Where $\alpha_{n,k}$ represents an attenuation factor (or channel response; e.g., due to scattering, reflection, and path losses) for the nth frequency component along k, and $\phi_{n,k}$ represents the phase of the signal for nth frequency component along k. Then, the received signal, R, at a wireless communication device can be described as the summation of all output signals $r_k(t)$ from all paths to the wireless communication device, which is shown in Equation (3):

$$R=\Sigma_k r_k(t) \quad (3)$$

Substituting Equation (2) into Equation (3) renders the following Equation (4):

$$R=\Sigma_k \Sigma_{n=-\infty}^{\infty} (\alpha_{n,k} e^{j\phi_{n,k}}) c_n e^{j\omega_n t} \quad (4)$$

R at a wireless communication device can then be analyzed. R at a wireless communication device can be transformed to the frequency domain, for example, using a fast Fourier transform (FFT) or another type of algorithm. The transformed signal can represent R as a series of n complex values, one for each of the respective frequency components (at the n frequencies $\omega_n$). For a frequency component at frequency $\omega_n$, a complex value, $H_n$, may be represented as follows in Equation (5):

$$H_n=\Sigma_k c_n \alpha_{n,k} e^{j\phi_{n,k}} \quad (5)$$

$H_n$ for a given $\omega_n$ indicates a relative magnitude and phase offset of the received signal at $\omega_n$. When an object moves in the space, $H_n$ changes due to $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch}=\Sigma_k \Sigma_{n=-\infty}^{\infty} \alpha_{n,k} \quad (6)$$

In some instances, the channel response, $h_{ch}$, for a space can be determined, for example, based on the mathematical theory of estimation. For instance, a reference signal, $R_{ef}$, can be modified with candidate $h_{ch}$, and then a maximum likelihood approach can be used to select the candidate channel which gives best match to the received signal ($R_{cvd}$). In some cases, an estimated received signal ($\hat{R}_{cvd}$) is obtained from the convolution of $R_{ef}$ with the candidate $h_{ch}$, and then the channel coefficients of $h_{ch}$ are varied to minimize the squared error of $\hat{R}_{cvd}$. This can be mathematically illustrated as follows in Equation (7):

$$R_{cvd}=R_{ef} \otimes h_{ch}=\Sigma_{k=-m}^{m} R_{ef}(n-k) h_{ch}(k) \quad (7)$$

with the optimization criterion as in Equation (8):

$$\min_{h_{ch}} \left\{ \sum (\hat{R}_{cvd} - R_{cvd})^2 \right\} \quad (8)$$

The minimizing, or optimizing, process can utilize an adaptive filtering technique, such as least mean squares (LMS), recursive least squares (RLS), batch least squares (BLS), etc. The channel response can be a finite impulse response (FIR) filter, infinite impulse response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3A:
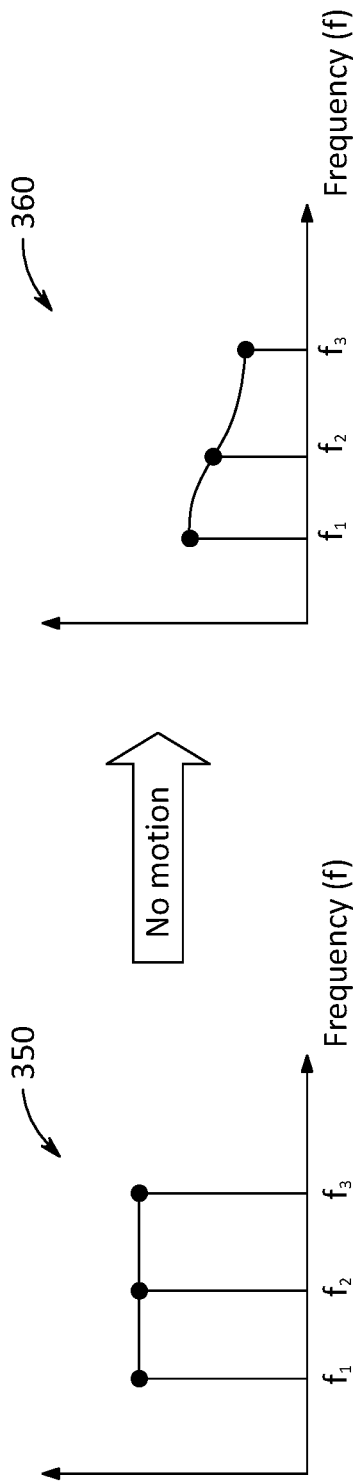
FIG. 3A and FIG. 3B are plots showing examples of channel responses computed from the wireless signals communicated between wireless communication devices in FIG. 2A and FIG. 2B.
Figure 3B:
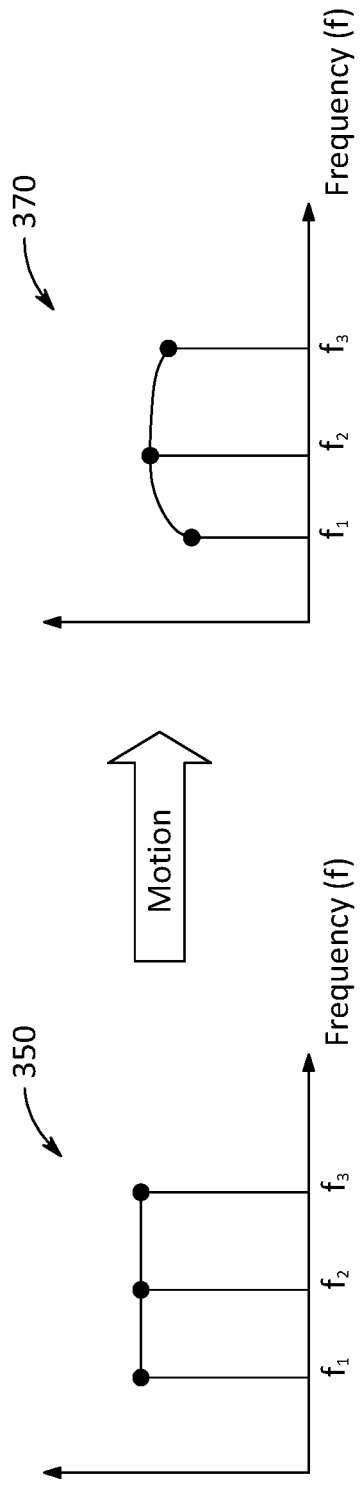

FIG. 3A and FIG. 3B are plots showing examples of channel responses 360, 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component, $f_1$, $f_2$ and $f_3$ is the same), as shown in frequency domain representation 350. Because of the interaction of the signal with space 200 (and the objects therein), the signals received at wireless communication device 204B that are based on the signal sent from wireless communication device 204A are different from the transmitted signal. In this example, where the transmitted signal has a flat frequency profile, the received signal represents the channel response of space 200. As shown in FIG. 3A and FIG. 3B, channel responses 360, 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
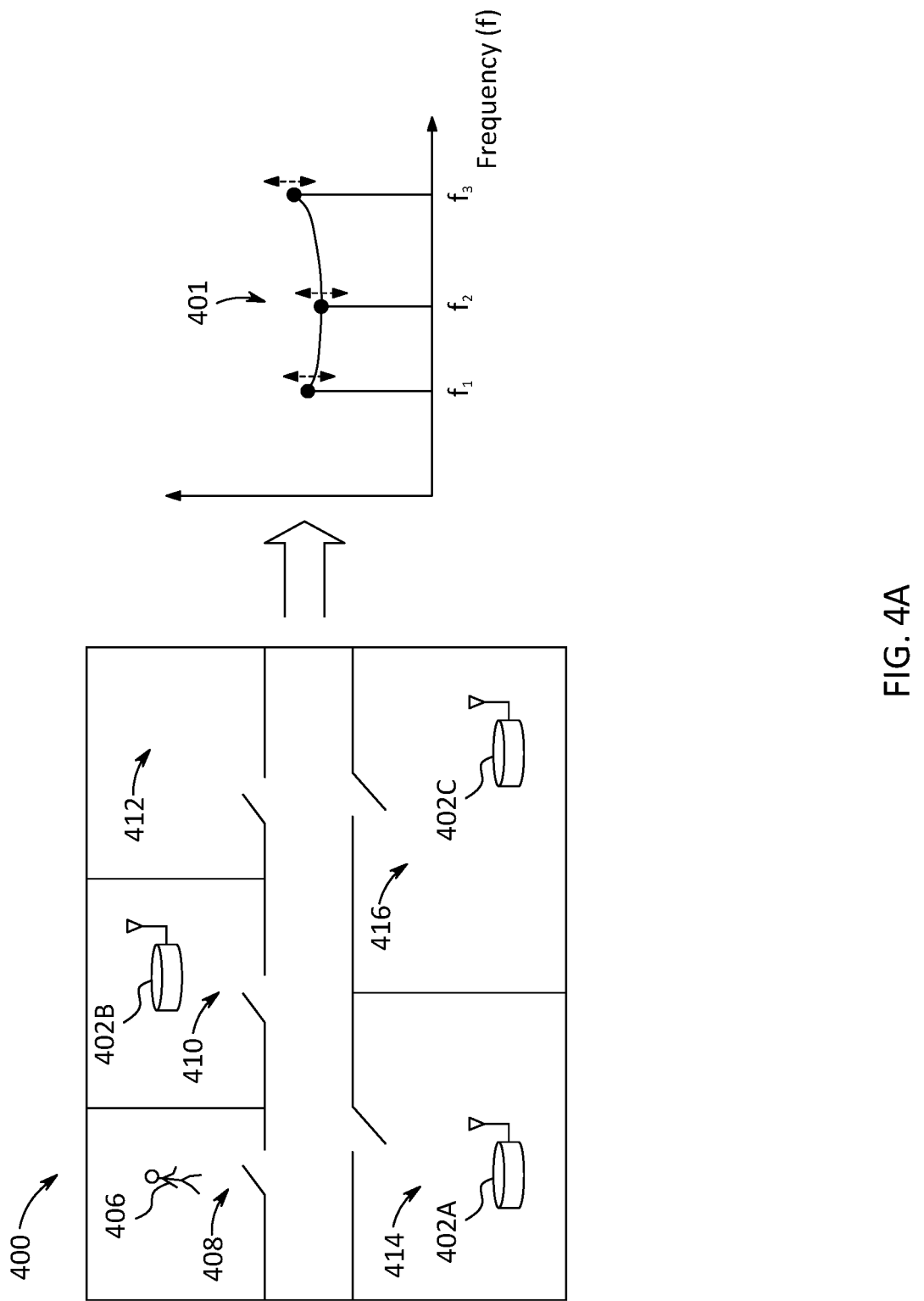
FIG. 4A and FIG. 4B are diagrams showing example channel responses associated with motion of an object in distinct regions of a space.
Figure 4B:
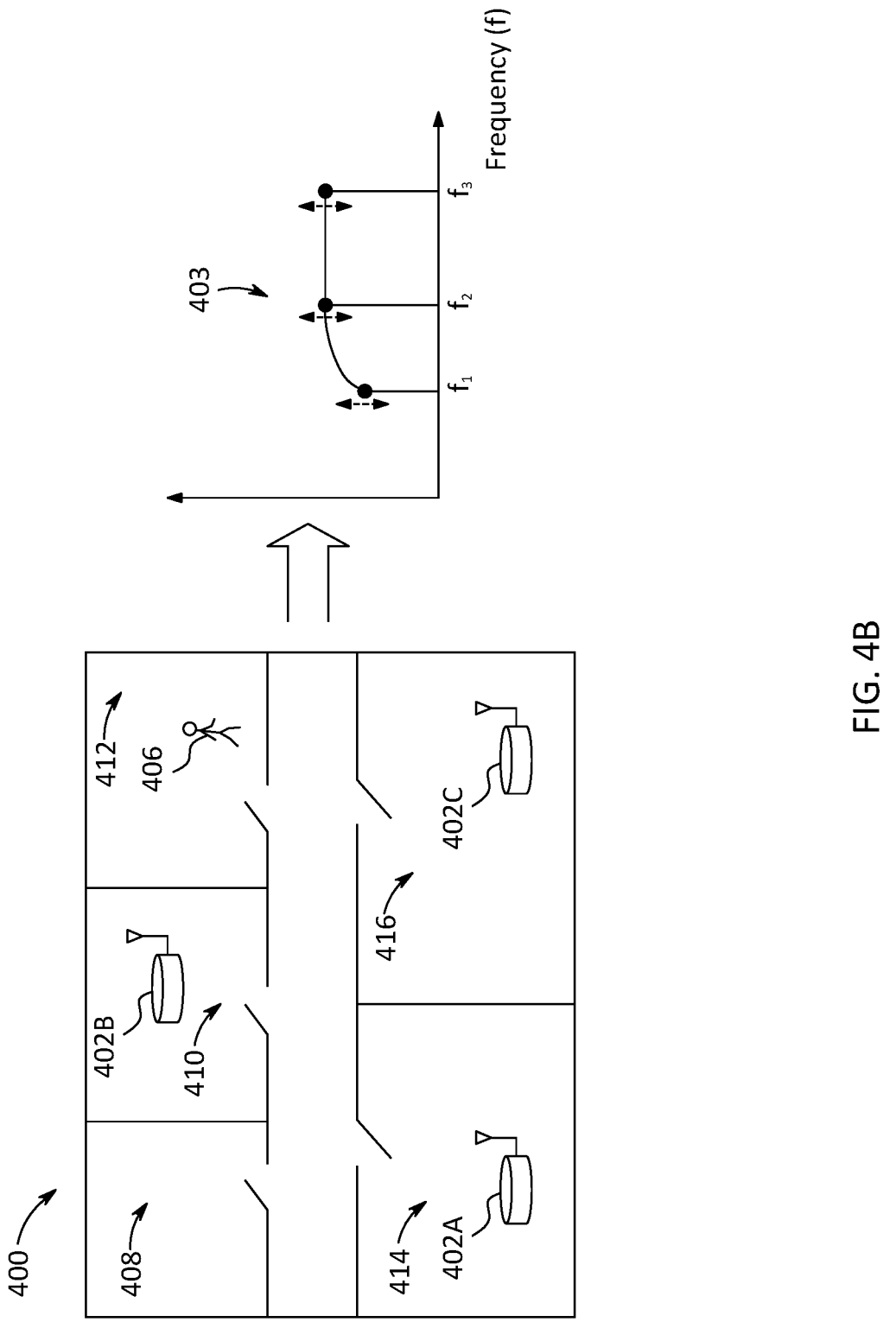

FIG. 4A and FIG. 4B are diagrams showing example channel responses 401, 403 associated with motion of object 406 in distinct regions 408, 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 406, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of $f_1$, $f_2$ and $f_3$ is the same or nearly the same. For example, the motion probe signals may have a frequency response similar to frequency domain representation 350 shown in FIG. 3A and FIG. 3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel responses 401, 403 are associated with signals received by the same wireless communication device 402 in space 400.

Figure 4C:
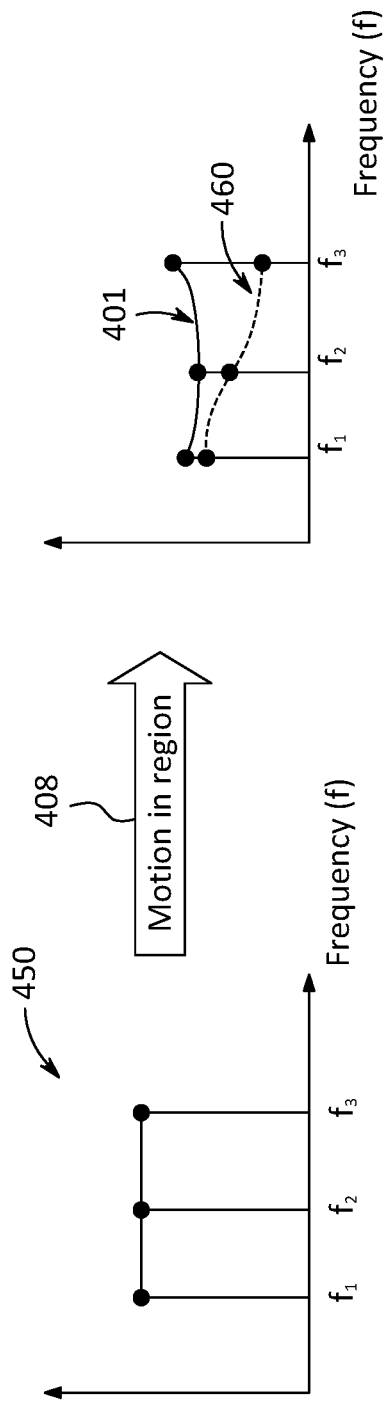
FIG. 4C and FIG. 4D are plots showing the example channel responses of FIG. 4A and FIG. 4B overlaid on an example channel response associated with no motion occurring in the space.
Figure 4D:
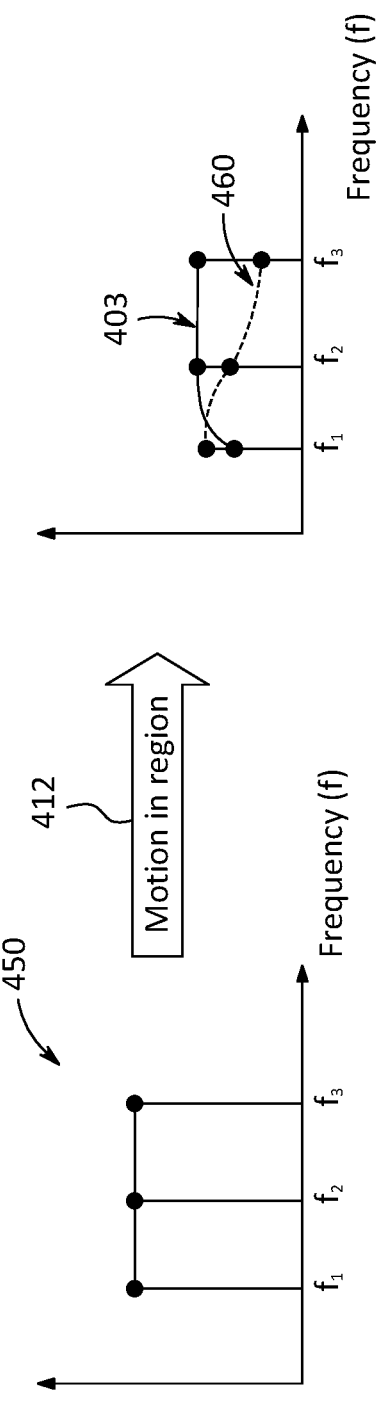

FIG. 4C and FIG. 4D are plots showing channel responses 401, 403 of FIG. 4A and FIG. 4B overlaid on channel response 460 associated with no motion occurring in space 400. In the example shown, wireless communication device 402 transmits a motion probe signal that has a flat frequency profile as shown in frequency domain representation 450. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained artificial intelligence (AI) model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each of $f_1$, $f_2$ and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component, $f_2$, is less than the outer frequency components f1 and f3), while channel response 403 has a convex-asymptotic frequency profile (the magnitude of the middle frequency component f2 is greater than the outer frequency components, $f_1$ and $f_3$). The profiles of channel responses 401, 403 may differ in some instances (e.g., based on different room layouts or placement of the wireless communication devices 402).

Analyzing channel responses may be considered similar to analyzing a digital filter. A channel response may be formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points, or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an AI model may be used to process data. AI models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentrations of values into separate clusters, while the second layer combines some of these clusters together to create a category for a distinct region. Additionally, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Wi-Fi Sensing System Example Methods and Apparatus

Section B describes systems and methods that are useful for a wireless sensing system configured to send sensing transmissions and make sensing measurements.

Figure 5:
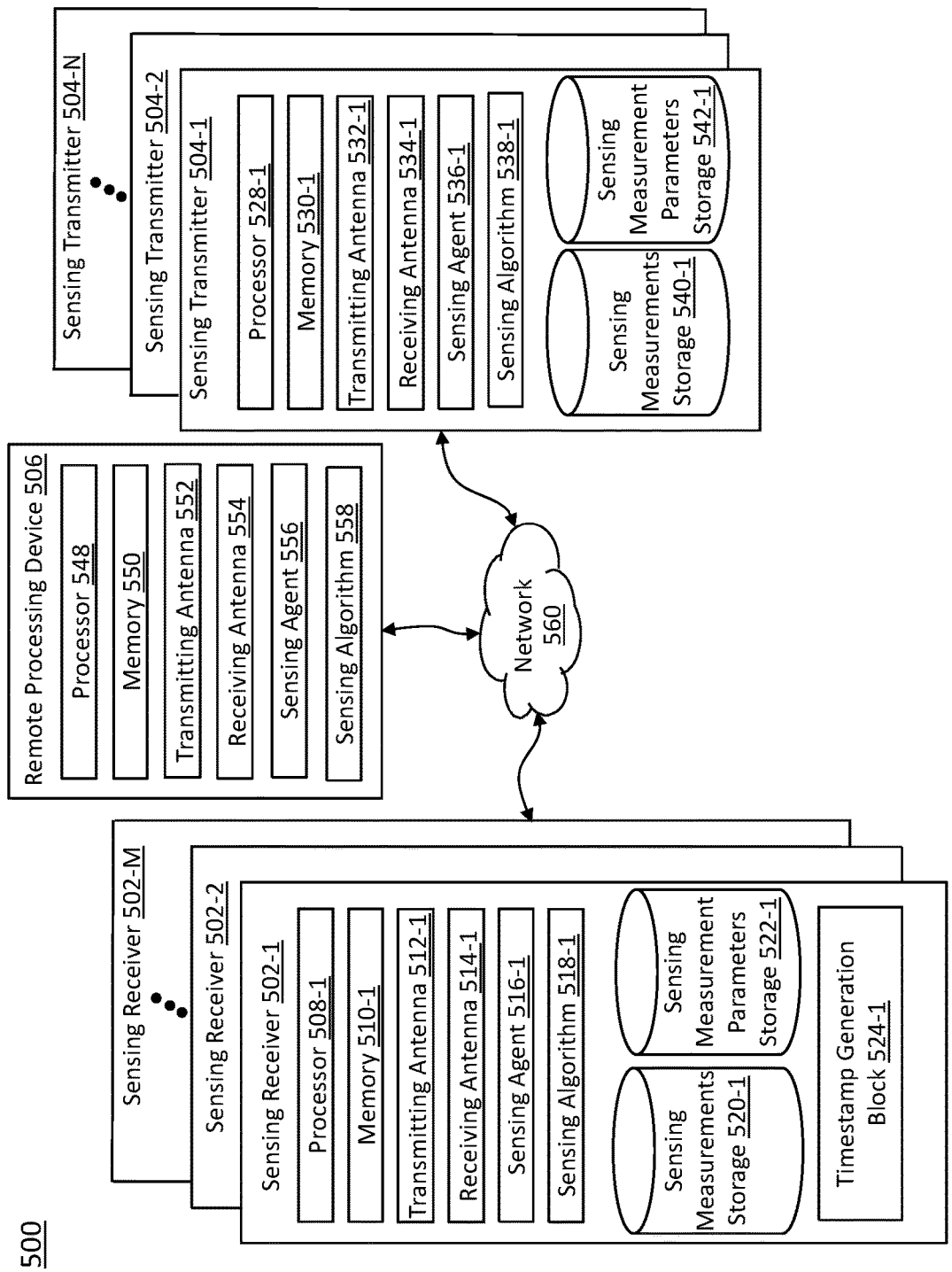
FIG. 5 depicts an implementation of some of an architecture of a system for Wi-Fi sensing, according to some embodiments.

FIG. 5 depicts an implementation of some of an architecture of an implementation of system 500 for Wi-Fi sensing, according to some embodiments.

System 500 may include a plurality of networking devices. In an example, system 500 may include plurality of sensing receivers 502-(1-M), plurality of sensing transmitters 504-(1-N), remote processing device 506, and network 560 enabling communication between the system components for information exchange. In an example implementation, plurality of sensing transmitters 504-(1-N) may include at least first sensing transmitter 504-1 and second sensing transmitter 504-2. In an example implementation, plurality of sensing receivers 502-(1-M) may include at least first sensing receiver 502-1 and second sensing receiver 502-2. System 500 may be an example or instance of wireless communication system 100 and network 560 may be an example or instance of wireless network or cellular network, details of which are provided with reference to FIG. 1 and its accompanying description.

According to an embodiment, plurality of sensing receivers 502-(1-M) may be configured to receive one or more sensing transmissions (for example, from one or more of plurality of sensing transmitters 504-(1-N)) and perform one or more measurements (for example, channel representation information (CRI) measurements such as channel state information (CSI) or time domain channel representation information (TD-CRI)) useful for Wi-Fi sensing. In examples, these measurements may be known as sensing measurements. Sensing measurements may be processed to achieve a sensing goal of system 500. In an embodiment, one or more of plurality of sensing receivers 502-(1-M) may be an AP. In some embodiments, one or more of plurality of sensing receivers 502-(1-M) may take a role of sensing initiator and/or sensing responder.

According to an implementation, one or more of plurality of sensing receivers 502-(1-M) may be implemented by a device, such as wireless communication device 102 shown in FIG. 1. In some implementations, one or more of plurality of sensing receivers 502-(1-M) may be implemented by a device, such as wireless communication device 204 shown in FIG. 2A and FIG. 2B. Further, one or more of plurality of sensing receivers 502-(1-M) may be implemented by a device, such as wireless communication device 402 shown in FIG. 4A and FIG. 4B. In an implementation, one or more of plurality of sensing receivers 502-(1-M) may coordinate and control communication among plurality of sensing transmitters 504-(1-N). According to an implementation, one or more of plurality of sensing receivers 502-(1-M) may be enabled to control a sensing measurement session comprising one or more sensing measurement instances to ensure that required sensing transmissions are made at a required times and to ensure an accurate determination of one or more sensing measurements. In some embodiments, one or more of plurality of sensing receivers 502-(1-M) may process sensing measurements to achieve the sensing goal of system 500. In some embodiments, one or more of plurality of sensing receivers 502-(1-M) may be configured to transmit sensing measurements to one or more of plurality of sensing transmitters 504-(1-N), and one or more of plurality of sensing transmitters 504-(1-N) may be configured to process the sensing measurements to achieve a sensing result of system 500.

In an embodiment, one or more of plurality of sensing receivers 502-(1-M) may be a STA. In an embodiment, one or more of plurality of sensing receivers 502-(1-M) may be an AP. In some embodiments, one or more of plurality of sensing receivers 502-(1-M) may be configured to transmit sensing measurements to remote processing device 506, and remote processing device 506 may be configured to process sensing measurements to achieve the sensing goal of system 500. In some embodiments, first sensing receiver 502-1 may be any computing device, such as a desktop computer, a laptop, a tablet computer, a mobile device, a personal digital assistant (PDA), or any other computing device.

Referring again to FIG. 5, in some embodiments, one or more of plurality of sensing transmitters 504-(1-N) may be configured to send one or more sensing transmissions to one or more of plurality of sensing receivers 502-(1-M) based on which one or more sensing measurements may be performed for Wi-Fi sensing. In an embodiment, one or more of plurality of sensing transmitters 504-(1-N) may be a STA. In an embodiment, one or more of plurality of sensing transmitters 504-(1-N) may be an AP. In some embodiments, one or more of plurality of sensing transmitters 504-(1-N) may take a role of sensing initiator and/or sensing responder.

According to an implementation, one or more of plurality of sensing transmitters 504-(1-N) may be implemented by a device, such as wireless communication device 102 shown in FIG. 1. In some implementations, one or more of plurality of sensing transmitters 504-(1-M) may be implemented by a device, such as wireless communication device 204 shown in FIG. 2A and FIG. 2B. Further, one or more of plurality of sensing transmitters 504-(1-M) may be implemented by a device, such as wireless communication device 402 shown in FIG. 4A and FIG. 4B. In some embodiments, first sensing transmitter 504-1 may be any computing device, such as a desktop computer, a laptop, a tablet computer, a mobile device, a PDA, or any other computing device. In some implementations, communication between one or more of plurality of sensing receivers 502-(1-M) and one or more of plurality of sensing transmitters 504-(1-N) may happen via station management entity (SME) and MAC layer management entity (MLME) protocols.

In some embodiments, remote processing device 506 may be configured to receive sensing measurements from one or more of plurality of sensing receivers 502-(1-M) and process the sensing measurements. In an example, remote processing device 506 may process and analyze sensing measurements to identify one or more features of interest. According to some implementations, remote processing device 506 may include/execute a sensing algorithm. In an embodiment, remote processing device 506 may be a STA. In some embodiments, remote processing device 506 may be an AP. According to an implementation, remote processing device 506 may be implemented by a device, such as wireless communication device 102 shown in FIG. 1. In some implementations, remote processing device 506 may be implemented by a device, such as wireless communication device 204 shown in FIG. 2A and FIG. 2B. Further, remote processing device 506 may be implemented by a device, such as wireless communication device 402 shown in FIG. 4A and FIG. 4B. In some embodiments, remote processing device 506 may be any computing device, such as a desktop computer, a laptop, a tablet computer, a mobile device, a personal digital assistant (PDA) or any other computing device. In embodiments, remote processing device 506 may take a role of sensing initiator where a sensing algorithm determines a Wi-Fi sensing session and the sensing measurements required to fulfill the measurement campaign. In an example, remote processing device 506 may communicate sensing measurement parameters and/or transmission parameters required to initiate a Wi-Fi sensing session to one or more of plurality of sensing receivers 502-(1-M) and/or to one or more of plurality of sensing transmitters 504-(1-N) to coordinate and control sensing transmissions for performing sensing measurements.

Referring to FIG. 5 in more detail, sensing receiver 502-1 (which is an example of one or more of plurality of sensing receivers 502-(1-M)) may include processor 508-1 and memory 510-1. For example, processor 508-1 and memory 510-1 of sensing receiver 502-1 may be processor 114 and memory 116, respectively, as shown in FIG. 1. In an embodiment, sensing receiver 502-1 may further include transmitting antenna(s) 512-1, receiving antenna(s) 514-1, and sensing agent 516-1. In some embodiments, an antenna may be used to both transmit and receive signals in a half-duplex format. When the antenna is transmitting, it may be referred to as transmitting antenna 512-1, and when the antenna is receiving, it may be referred to as receiving antenna 514-1. It is understood by a person of normal skill in the art that the same antenna may be transmitting antenna 512-1 in some instances and receiving antenna 514-1 in other instances. In the case of an antenna array, one or more antenna elements may be used to transmit or receive a signal, for example, in a beamforming environment. In some examples, a group of antenna elements used to transmit a composite signal may be referred to as transmitting antenna 512-1, and a group of antenna elements used to receive a composite signal may be referred to as receiving antenna 514-1. In some examples, each antenna is equipped with its own transmission and receive paths, which may be alternately switched to connect to the antenna depending on whether the antenna is operating as transmitting antenna 512-1 or receiving antenna 514-1.

In an implementation, sensing agent 516-1 may be responsible for causing sensing receiver 502-1 to receive sensing transmissions and associated sensing measurement parameters and/or transmission parameters, to calculate sensing measurements. In examples, sensing agent 516-1 may be responsible for processing sensing measurements to fulfill a sensing goal. In some implementations, receiving sensing transmissions and optionally associated sensing measurement parameters and/or transmission parameters, and calculating sensing measurements may be carried out by sensing agent 516-1 running in the medium access control (MAC) layer of sensing receiver 502-1 and processing sensing measurements to fulfill a sensing goal may be carried out by an algorithm running in the application layer of sensing receiver 502-1, for example sensing algorithm 518-1. In examples, a sensing algorithm 518-1 running in the application layer of sensing receiver 502-1 may be known as a Wi-Fi sensing agent, a sensing application, or sensing algorithm. In examples, sensing algorithm 518-1 may include and/or execute sensing agent 516-1. According to some implementations, sensing agent 516-1 may include and/or execute sensing algorithm 518-1. In some implementations, sensing agent 516-1 running in the MAC layer of sensing receiver 502-1 and sensing algorithm 518-1 running in the application layer of sensing receiver 502-1 may run separately on processor 508-1. In an implementation, sensing agent 516-1 may pass one or more of sensing measurement parameters, transmission parameters, or physical layer parameters (e.g., such as channel representation information, examples of which are CSI and TD-CRI) between the MAC layer of sensing receiver 502-1 and the application layer of sensing receiver 502-1. In an example, sensing agent 516-1 in the MAC layer or sensing algorithm 518-1 in the application layer may operate on physical layer parameters, for example, to detect one or more features of interest. In examples, sensing algorithm 518-1 may form services or features, which may be presented to an end-user. According to an implementation, communication between the MAC layer of sensing receiver 502-1 and other layers or components of sensing receiver 502-1 (including the application layer) may take place based on communication interfaces, such as an MLME interface and a data interface. In examples, sensing agent 516-1 may be configured to determine a number and timing of sensing transmissions and sensing measurements for the purpose of Wi-Fi sensing. In some implementations, sensing agent 516-1 may be configured to transmit sensing measurements to plurality of sensing transmitters 504-(1-N) and/or remote processing device 506 for further processing. In an implementation, sensing agent 516-1 may be configured to cause at least one transmitting antenna of transmitting antenna(s) 512-1 to transmit messages to one or more of plurality of sensing transmitters 504-(1-N) or to remote processing device 506. Further, sensing agent 516-1 may be configured to receive, via at least one receiving antenna of receiving antennas(s) 514-1, messages from one or more of plurality of sensing transmitters 504-(1-N) or from remote processing device 506. In an example, sensing agent 516-1 may be configured to make sensing measurements based on sensing transmissions received from one or more of plurality of sensing transmitters 504-(1-N).

In some embodiments, sensing receiver 502-1 may include sensing measurements storage 520-1. In an implementation, sensing measurements storage 520-1 may store sensing measurements computed by sensing receiver 502-1 based on received sensing transmissions. In an example, sensing measurements stored in sensing measurements storage 520-1 may be periodically or dynamically updated as required. In some embodiments, sensing receiver 502-1 may include sensing measurement parameters storage 522-1. In an implementation, sensing measurement parameters storage 522-1 may store sensing measurement parameters and/or transmission parameters applicable to one or more sensing measurement setups. In an implementation, sensing measurement parameters storage 522-1 may store sensing measurement parameters and/or transmission parameters applicable to one or more sensing measurement sessions. In an implementation, sensing measurement parameters storage 522-1 may store sensing measurement parameters and/or transmission parameters applicable to one or more sensing measurement instances. In an example, sensing measurement parameters and/or transmission parameters stored in sensing measurement parameters storage 522-1 may be periodically or dynamically updated as required. In an implementation, sensing measurements storage 520-1 and sensing measurement parameters storage 522-1 may include any type or form of storage, such as a database or a file system or coupled to memory 510-1.

In an implementation, sensing receiver 502-1 may include timestamp generation block 524-1. In an implementation, timestamp generation block 524-1 may be coupled to processor 508-1 and memory 510-1. In some embodiments, timestamp generation block 524-1 amongst other units, may include routines, programs, objects, components, data structures, etc., which may perform particular tasks or implement particular abstract data types. Timestamp generation block 524-1 may also be implemented as, signal processor(s), state machine(s), logic circuitries, and/or any other device or component that manipulates signals based on operational instructions.

In some embodiments, timestamp generation block 524-1 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or, the processing unit may be dedicated to performing the required functions. In some embodiments, timestamp generation block 524-1 may be machine-readable instructions that, when executed by a processor/processing unit, perform any of desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 510-1.

Referring again to FIG. 5, sensing transmitter 504-1 (which is an example of one or more of plurality of sensing transmitters 504-(1-N)) may include processor 528-1 and memory 530-1. For example, processor 528-1 and memory 530-1 of sensing transmitter 504-1 may be processor 114 and memory 116, respectively, as shown in FIG. 1. In an embodiment, sensing transmitter 504-1 may further include transmitting antenna(s) 532-1, receiving antenna(s) 534-1, and sensing agent 536-1.

Sensing agent 536-1 may be configured to cause at least one transmitting antenna of transmitting antenna(s) 532-1 and at least one receiving antenna of receiving antennas(s) 534-1 to exchange messages with one or more of plurality of sensing receivers 502-(1-M)) or with remote processing device 506. In some embodiments, an antenna may be used to both transmit and receive in a half-duplex format. When the antenna is transmitting, it may be referred to as transmitting antenna 532-1, and when the antenna is receiving, it may be referred to as receiving antenna 534-1. It is understood by a person of normal skill in the art that the same antenna may be transmitting antenna 532-1 in some instances and receiving antenna 534-1 in other instances. In the case of an antenna array, one or more antenna elements may be used to transmit or receive a signal, for example, in a beamforming environment. In some examples, a group of antenna elements used to transmit a composite signal may be referred to as transmitting antenna 532-1, and a group of antenna elements used to receive a composite signal may be referred to as receiving antenna 534-1. In some examples, each antenna is equipped with its own transmission and receive paths, which may be alternately switched to connect to the antenna depending on whether the antenna is operating as transmitting antenna 532-1 or receiving antenna 534-1.

In an implementation, sensing agent 536-1 may be responsible for causing sensing transmitter 504-1 to send sensing transmissions and, in examples, receive associated sensing measurements from one or more of plurality of sensing receivers 502-(1-M). In examples, sensing agent 536-1 may be responsible for processing sensing measurements to fulfill a sensing goal. In some implementations, sensing agent 536-1 may run in the medium access control (MAC) layer of sensing transmitter 504-1, and processing sensing measurements to fulfill a sensing goal may be carried out by sensing algorithm 538-1, which in examples may run in the application layer of sensing transmitter 504-1. In examples, sensing algorithm 538-1 running in the application layer of sensing transmitter 504-1 may be known as a Wi-Fi sensing agent, a sensing application, or a sensing algorithm. In examples, sensing algorithm 538-1 may include and/or execute sensing agent 536-1. According to some implementations, sensing agent 536-1 may include and/or execute sensing algorithm 538-1. In some implementations, sensing agent 536-1 may run in the MAC layer of sensing transmitter 504-1 and sensing algorithm 538-1 may run in the application layer of sensing transmitter 504-1. In some implementations, sensing agent 536-1 of sensing transmitter 504-1 and sensing algorithm 538-1 may run separately on processor 528-1. In an implementation, sensing agent 536-1 may pass sensing measurement parameters, transmission parameters, or physical layer parameters between the MAC layer of sensing transmitter 504-1 and the application layer of sensing transmitter 504-1. In an example, sensing agent 536-1 in the MAC layer or sensing algorithm 538-1 in the application layer may control physical layer parameters, for example physical layer parameters used to generate one or more sensing transmissions. In examples, sensing algorithm 538-1 may form services or features, which may be presented to an end-user. According to an implementation, communication between the MAC layer of sensing transmitter 504-1 and other layers or components of sensing transmitter 504-1 (including the application layer) may take place based on communication interfaces, such as an MLME interface and a data interface. In examples, sensing agent 536-1 may be configured to determine a number and timing of sensing transmissions for the purpose of Wi-Fi sensing. In some implementations, sensing agent 536-1 may be configured to cause sensing transmitter 504-1 to transmit sensing transmissions to one or more of plurality of sensing receivers 502-(1-M). In an implementation, sensing agent 536-1 may be configured to cause at least one transmitting antenna of transmitting antenna(s) 532-1 to transmit messages to one or more of plurality of sensing receivers 502-(1-M) or to remote processing device 506. Further, sensing agent 536-1 may be configured to receive, via at least one receiving antenna of receiving antennas(s) 534-1, messages from one or more of plurality of sensing receivers 502-(1-M) or from remote processing device 506.

In some embodiments, sensing transmitter 504-1 may include sensing measurements storage 540-1. In an implementation, sensing measurements storage 540-1 may store sensing measurements computed by one or more of plurality of sensing receivers 502-(1-M) based on sensing transmissions sent by sensing transmitter 504-1 and sent by one or more of plurality of sensing receivers 502-(1-M) to sensing transmitter 504-1. In an example, sensing measurements stored in sensing measurements storage 540-1 may be periodically or dynamically updated as required. In an implementation, sensing measurements storage 540-1 may include any type or form of storage, such as a database or a file system or coupled to memory 530-1.

In some embodiments, sensing transmitter 504-1 may include sensing measurement parameters storage 542-1. In an implementation, sensing measurement parameters storage 542-1 may store sensing measurement parameters and/or transmission parameters applicable to one or more sensing measurement sessions. In an implementation, sensing measurement parameters storage 542-1 may store sensing measurement parameters and/or transmission parameters applicable to one or more sensing measurement setups. In an implementation, sensing measurement parameters storage 542-1 may store sensing measurement parameters and/or transmission parameters applicable to one or more sensing measurement instances. In an example, sensing measurement parameters and/or transmission parameters stored in sensing measurement parameters storage 542-1 may be periodically or dynamically updated as required. In an implementation, sensing measurements storage 540-1 and sensing measurement parameters storage 542-1 may include any type or form of storage, such as a database or a file system or coupled to memory 530-1.

Referring to FIG. 5 in more detail, remote processing device 506 may include processor 548 and memory 550. For example, processor 548 and memory 550 of remote processing device 506 may be processor 114 and memory 116, respectively, as shown in FIG. 1. In an embodiment, remote processing device 506 may further include transmitting antenna(s) 552, receiving antenna(s) 554, sensing agent 556, and sensing algorithm, 558. In some embodiments, an antenna may be used to both transmit and receive signals in a half-duplex format. When the antenna is transmitting, it may be referred to as transmitting antenna 552, and when the antenna is receiving, it may be referred to as receiving antenna 554. It is understood by a person of normal skill in the art that the same antenna may be transmitting antenna 552 in some instances and receiving antenna 554 in other instances. In the case of an antenna array, one or more antenna elements may be used to transmit or receive a signal, for example, in a beamforming environment. In some examples, a group of antenna elements used to transmit a composite signal may be referred to as transmitting antenna 552, and a group of antenna elements used to receive a composite signal may be referred to as receiving antenna 554. In some examples, each antenna is equipped with its own transmission and receive paths, which may be alternately switched to connect to the antenna depending on whether the antenna is operating as transmitting antenna 552 or receiving antenna 554.

In an implementation, sensing agent 556 may be responsible for determining sensing measurement parameters and/or transmission parameters for one or more sensing measurement setups. In examples, sensing agent 556 may receive sensing measurement parameters and/or transmission parameters for one or more sensing measurement setups from sensing algorithm 558. In an example, sensing agent 556 may receive sensing measurements from one or more of plurality of sensing receivers 502-(1-M) and may process the sensing measurements to fulfill a sensing goal. In an example, sensing agent 556 may receive channel representation information (such as CSI or TD-CRI) from one or more of plurality of sensing receivers 502-(1-M) and may process the channel representation information to fulfill a sensing goal. In implementations, sensing agent 556 may receive sensing measurements or channel representation information and may provide the received sensing measurements or channel representation information to sensing algorithm 558, and sensing algorithm 558 may receive the sensing measurements or channel representation information from sensing agent 556 and may process the information to fulfill a sensing goal.

In some implementations, receiving sensing measurements may be carried out by an algorithm running in the medium access control (MAC) layer of remote processing device 506 and processing sensing measurements to fulfill a sensing goal may be carried out by an algorithm running in the application layer of remote processing device 506. In examples, the algorithm running in the application layer of remote processing device 506 may be known as a Wi-Fi sensing agent, a sensing application, or sensing algorithm. In some implementations, the algorithm running in the MAC layer of remote processing device 506 and the algorithm running in the application layer of remote processing device 506 may run separately on processor 548. In an implementation, sensing agent 556 may pass physical layer parameters (e.g., such as channel representation information, examples of which are CSI and TD-CRI) from the MAC layer of remote processing device 506 to the application layer of remote processing device 506 and may use the physical layer parameters to detect one or more features of interest. In an example, the application layer may operate on the physical layer parameters and form services or features, which may be presented to an end-user. According to an implementation, communication between the MAC layer of remote processing device 506 and other layers or components of remote processing device 506 may take place based on communication interfaces, such as an MLME interface and a data interface. According to some implementations, sensing agent 556 may include/execute a sensing algorithm 558. In an implementation, sensing agent 556 may process and analyze sensing measurements using sensing algorithm 558 and identify one or more features of interest. Further, sensing agent 556 may be configured to determine a number and timing of sensing transmissions and sensing measurements for the purpose of Wi-Fi sensing. In some implementations, sensing agent 556 may be configured to cause one or more of plurality of sensing transmitters 504-(1-N) to transmit sensing measurements to one or more of plurality of sensing receivers 502-(1-M).

For ease of explanation and understanding, descriptions provided above may be with reference to sensing receiver 502-1 or sensing transmitter 504-1, however, the description is equally applicable to one or more of plurality of sensing receivers 502-(1-M) and/or one or more of plurality of sensing transmitters 504-(1-N).

According to one or more implementations, communications in network 560 may be governed by one or more of the 802.11 family of standards developed by IEEE. Some example IEEE standards may include IEEE 802.11-2020, IEEE 802.11ax-2021, IEEE 802.11me, IEEE 802.11az and IEEE 802.11be. IEEE 802.11-2020 and IEEE 802.11ax-2021 are fully-ratified standards whilst IEEE 802.11me reflects an ongoing maintenance update to the IEEE 802.11-2020 standard and IEEE 802.11be defines the next generation of standard. IEEE 802.11az is an extension of the IEEE 802.11-2020 and IEEE 802.11ax-2021 standards which adds new functionality. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network. Further, IEEE 802.11ax included OFDMA, which allows sensing receiver 502 to simultaneously transmit data to all participating devices, such as plurality of sensing transmitters 504-(1-N), and vice versa using a single transmission opportunity (TXOP). The efficiency of OFDMA depends on how sensing receiver 502 schedules channel resources (interchangeably referred to as RUs) among plurality of sensing transmitters 504-(1-N) and configures transmission parameters. According to an implementation, system 500 may be an OFDMA enabled system.

Referring back to FIG. 5, according to one or more implementations, Wi-Fi sensing system 500 may participate in a sensing session. In examples, a sensing session is an agreement between a sensing initiator and a sensing responder to participate in a WLAN sensing procedure (also known as a Wi-Fi sensing procedure.) In examples, sensing measurement parameters associated with a sensing session may be determined by a sensing initiator and may be exchanged between the sensing initiator and a sensing responder. In examples, sensing initiator may be sensing transmitter 504-1 and sensing responder may be sensing receiver 502-1. In examples, sensing initiator may be sensing receiver 502-1 and sensing responder may be sensing transmitter 504-1. In examples, sensing initiator may be remote processing device 506, and both sensing transmitter 504-1 and sensing receiver 502-1 are sensing responders. In examples, sensing transmitter 504-1 may participate in multiple sensing sessions either as a sensing initiator or as a sensing responder. In examples, sensing receiver 502-1 may participate in multiple sensing sessions either as a sensing initiator or as a sensing responder. In examples, remote processing device may participate in multiple sensing sessions as a sensing initiator.

Figure 6:
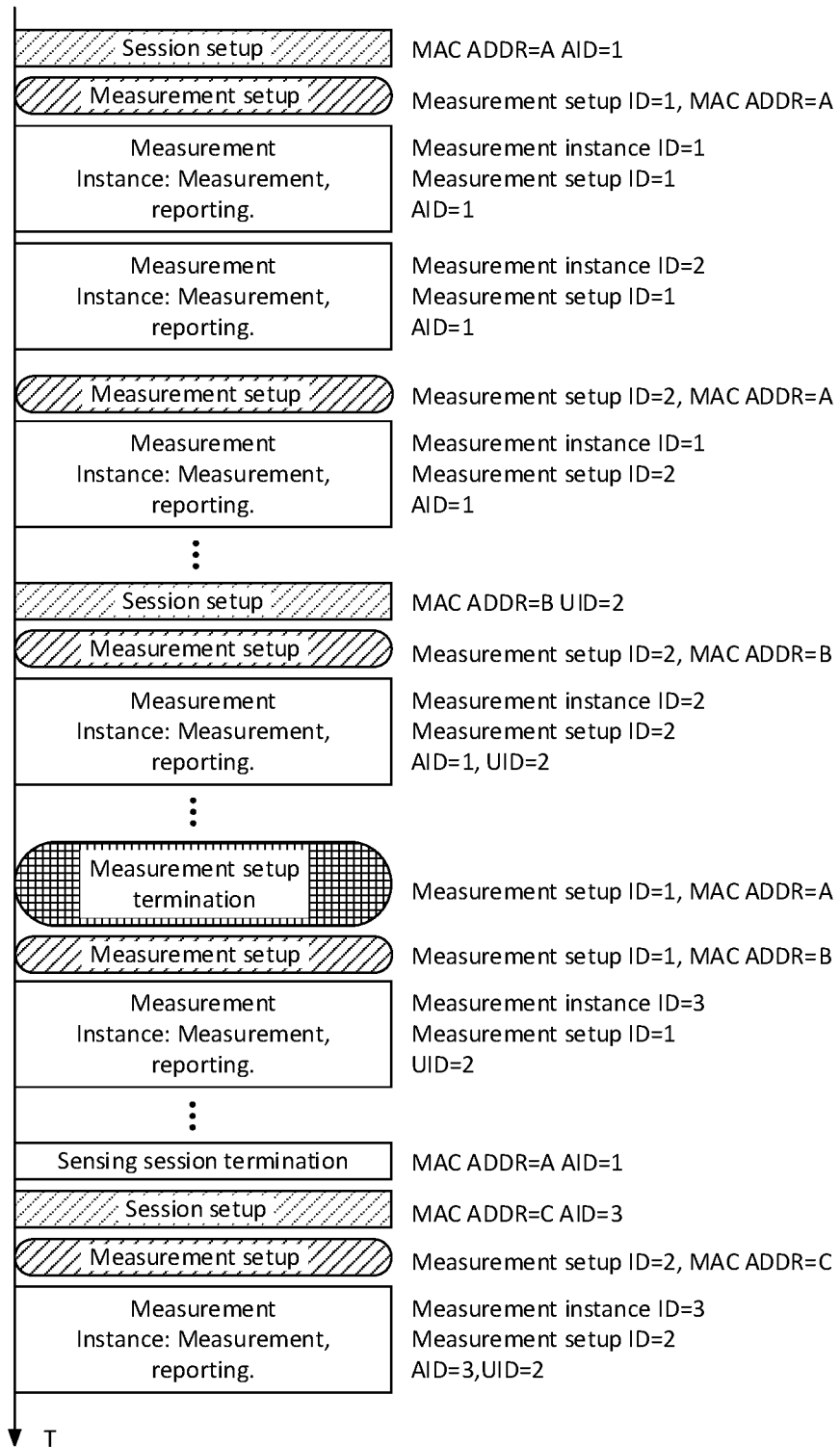
FIG. 6 depicts an example of a WLAN sensing procedure, according to some embodiments.

FIG. 6 illustrates an example of a WLAN sensing procedure (also known as a Wi-Fi sensing procedure) according to some embodiments. In examples, a WLAN sensing procedure allows a STA to perform WLAN sensing. In an example, a WLAN sensing procedure enables a STA to obtain one or more sensing measurements of the wireless transmission channel between two or more STAs and or the wireless transmission channel between a receive antenna and a transmit antenna of a STA. In examples, a WLAN sensing procedure is composed of one or more of a sensing session setup, a sensing measurement setup, one or more sensing measurement instances, sensing measurement setup termination, and sensing session termination.

FIG. 6 illustrates a sensing session setup with a STA with MAC ADDR=A and AID=1, In examples, a sensing session setup establishes a sensing session. In examples, the sensing session may be identified by the AID of the STA involved in the sensing session. FIG. 6 illustrates a sensing measurement setup procedure for the STA with MAC ADDR=A, where the sensing measurement setup ID=1.

In examples, a sensing measurement setup allows for a sensing initiator and a sensing responder to exchange and agree on operational attributes associated with a sensing measurement instance. A sensing initiator may transmit a Sensing Measurement Setup Request frame to a sensing responder with which it intends to perform a sensing measurement setup. An example of a Sensing Measurement Setup Request frame is provided in FIG. 7A. In examples, the Sensing Measurement Setup Request frame is a Public Action frame, and in examples is identified by a Public Action field value. As shown in the example illustrated in FIG. 7A, in embodiments, a Sensing Measurement Set Request frame format may include one or more of a Category field, a Public Action field, a Dialog Token field, a Measurement Setup ID field, a DMG Sensing Measurement Setup Element field, and a Sensing Measurement Parameters element. In examples, a Category value code is defined for a "Protected Sensing Frame." In an embodiment, a Protected Sensing Action field is defined in the octet immediately after the Category field in order to differentiate Protected Sensing Frame formats from Public Sensing Frame formats.

FIG. 7B illustrates an example, according to some embodiments, of a Sensing Measurement Parameters element. In examples, a Sensing Measurement Parameters element indicates operational attributes of a corresponding sensing measurement instance. In examples, the Sensing Measurement Parameters element comprises a Sensing Measurement Parameters field. FIG. 7C illustrates an example of a format of a Sensing Measurement Parameters field, according to some embodiments. In an example, a Sensing Measurement Parameters field comprises a Sensing Transmitter subfield. The Sensing Transmitter subfield may be set to 1 to indicate a sensing responder assumes a sensing transmitter role, such as sensing transmitter 504-1. In an example the sensing responder assumes a sensing transmitter role according to the Sensing Transmitter subfield for the Sensing Measurement Setup ID associated with the Sensing Measurement Parameters field. In an example, the Sensing Measurement Parameters field comprises a Sensing Receiver subfield. The Sensing Receiver subfield may be set to 1 to indicate a sensing responder assumes a sensing receiver role, such as sensing receiver 502-1. In an example the sensing responder assumes a sensing receiver role according to the Sensing Receiver subfield for the Sensing Measurement Setup ID associated with the Sensing Measurement Parameters field.

Referring again to FIG. 7C, in examples, a Sensing Measurement Parameters field format includes a Sensing Measurement Report subfield if the Sensing Receiver subfield indicates that the sensing responder should assume a sensing receiver role. In an example, the Sensing Measurement Report subfield may indicate whether or not a sensing responder sends Sensing Measurement Report frames in sensing measurement instances that result from the sensing measurement setup.

Referring again to FIG. 7C, in examples a Sensing Measurement Parameters field format includes a Measurement Report Type subfield. In examples, the Measurement Report Type subfield indicates the type of measurement result reported in sensing measurement instance(s) corresponding to the sensing measurement setup ID, for example when the sensing initiator is a sensing transmitter, such as sensing transmitter 504-1.

In examples, after the sensing responder receiver the Sensing Measurement Setup Request frame, the sensing responder may transmit a Sensing Measurement Setup Response frame. An example of a Sensing Measurement Setup Response frame is provided in FIG. 7D. In examples, the sensing responder may use a Status Code field in the Sensing Measurement Setup Response frame to indicate whether the sensing responder accepts the requested sensing measurement setup parameters in the received Sensing Measurement Setup Request frame. In an embodiment, the Status Code field may be set to 0 indicating a successful sensing measurement setup, where the sensing responder accepts the operational attributes included in the Sensing Measurement Setup Request frame. In examples, the sensing responder may indicate in the Sensing Measurement Setup Response frame that the operational attributes included in the Sensing Measurement Setup Request frame sent by the sensing initiator are not accepted, for example by setting a Status Code field to a non-zero value. In examples, the sensing responder may indicate in the Sensing Measurement Setup Response frame preferred sensing measurement parameters, for example to indicate to the sensing initiator one or more operational attributes preferred by the sensing responder. In examples, the sensing responder may indicate to the sensing initiator that preferred sensing measurement parameters are included in the Sensing Measurement Setup Response frame by setting a Status Code field to a non-zero value.

In examples, the sensing initiator may assign a role to the sensing responder as part of the sensing measurement setup sent in the Sensing Measurement Setup Request frame. For example, the sensing initiator may indicate to a sensing responder that the sensing responder is to assume the role of a sensing receiver, such as sensing receiver 502-1, or the role of a sensing transmitter, such as sensing transmitter 504-1, or the role of sensing receiver 502-1 and sensing transmitter 504-1. In examples, sensing initiator may indicate to sensing responder whether the sensing responder sends sensing measurement report frames in sensing measurement instances. In an embodiment, the role assigned to the sensing responder and/or whether the sensing responder sends sensing measurement report frames persists until the sensing measurement setup is terminated.

Referring again to FIG. 6 and the sensing session with the STA with MAC ADDR=A identified by the STA AID, AID=1, the sensing measurement setup is followed by one or more sensing measurement instances and measurement reporting instances which may be performed based on the defined operational attribute set. In the example shown in FIG. 6, the one or more sensing measurement instances for the STA with MAC ADDR=A may be assigned sensing measurement instance IDs, for example a first sensing measurement instance may be assigned sensing measurement instance ID=1, and a second measurement instance may be assigned sensing measurement instance ID=2. In examples, a sensing measurement instance may be uniquely associated with a sensing measurement setup.

Referring again to FIG. 6, a second sensing measurement setup may be initiated for the STA with MAC ADDR=A, which may be identified as sensing measurement setup ID=2. As with sensing measurement setup ID=1, sensing measurement setup ID=2 may be associated with a second operational attribute set. In examples, after the second sensing measurement setup, any subsequent one or more sensing measurement instances may be performed based on either the first operational attribute set (sensing measurement setup ID=1) or the second operational attribute set (sensing setup measurement ID=2.)

Referring again to FIG. 6, FIG. 6 illustrates a sensing session setup with a STA with MAC ADDR=B and UID=2. In examples, the sensing session may be identified by the UID of the STA with MAC ADDR=B. FIG. 6 further illustrates a sensing measurement setup for the STA with MAC ADDR=B. In the example, the operational attribute set for the sensing measurement setup for the STA with MAC ADDR=B is the same as the second operational attribute set established with the STA with MAC ADDR=A, and the sensing measurement setup ID is used for both the STA with MAC ADDR=A and the STA with MAC ADDR=B. That is, a sensing measurement setup ID (which may also be referred to as a sensing measurement setup label) may apply to one or more STA. In examples according to FIG. 6, subsequent sensing measurement instances associated with sensing measurement setup ID=2 may be associated with the STA with MAC ADDR=A, the STA with MAC ADDR=B, or with both the STA with MAC ADDR=A and the STA with MAC ADDR=B. An example of one-to-many triggering is shown in FIG. 6 where AID=1 and UID=2 are both associated with a single measurement instance and measurement reporting (measurement instance ID=2 and measurement setup ID=2.)

In examples, an operational attribute set of a sensing session may be terminated by performing a sensing measurement setup termination procedure, for example as is shown in FIG. 6 for sensing measurement setup ID=1 and the STA with MAC ADDR=A. In examples, the sensing measurement setup ID of a terminated sensing measurement setup may be used for a subsequent sensing measurement setup. This is shown in FIG. 6 where a sensing measurement setup with ID=1 is established for the STA with MAC ADDR=B, after the termination of the sensing measurement setup ID=1 with the STA with MAC ADDR=A. In some embodiments, a sensing session may be terminated using a sensing session termination procedure, as shown in FIG. 6.

FIG. 8A illustrates exchanges between a sensing initiator and a sensing responder that may be one-to-many or many-to-one. In examples, a measurement instance and/or measurement reporting may have a one-to-one (single device to single device) announcement or triggering or may have a one-to-many (single device to multiple device) announcement or triggering. In examples, a measurement instance may have a one-to-one, one-to-many, or many-to-one (many devices to a single device) sounding.

As previously described, a sensing session is an agreement between a sensing initiator and a sensing responder to participate in a WLAN sensing procedure, that is a sensing session is pairwise and in examples, may be identified by MAC addresses of the sensing initiator and the sensing responder or by the associated AID/UID. FIG. 8B shows an example of pairwise exchanges or procedures that may take place between a sensing initiator and a sensing responder related to a sensing session, which include a sensing session setup, a sensing measurement setup, a sensing measurement setup termination, and a sensing session termination.

Figure 9:
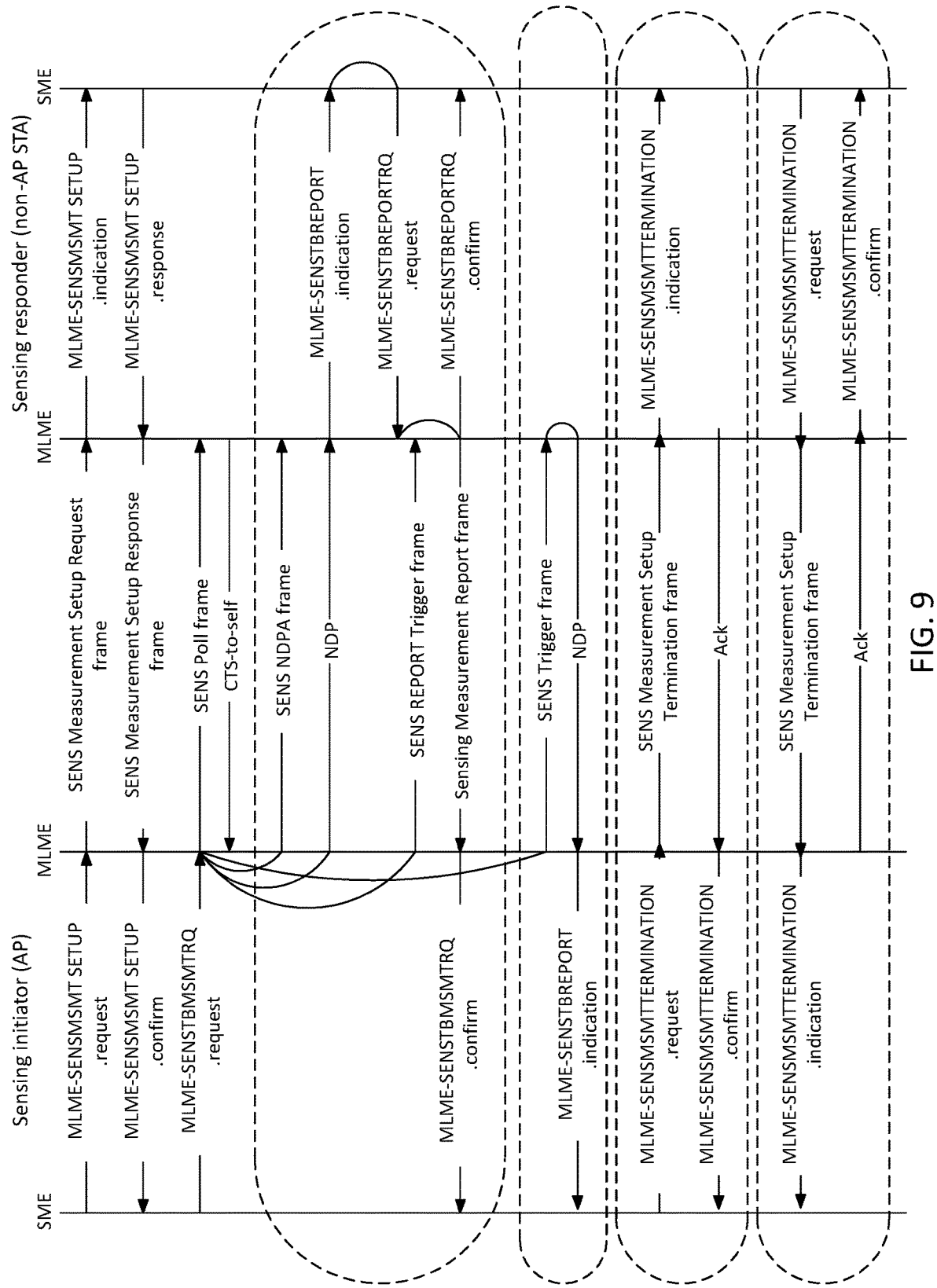
FIG. 9 depicts a message flow of a trigger-based (TB) sensing measurement instance of a WLAN sensing procedure that consists of either NDPA sounding or TF sounding, according to some embodiments.

In examples, a sensing measurement instance of a WLAN sensing procedure may be a trigger-based (TB) sensing measurement instance. FIG. 9 depicts a message flow of a sensing session of a WLAN sensing procedure comprising a sensing measurement setup procedure followed by one or more trigger-based (TB) sensing measurement instances that consists of either NDPA sounding or trigger frame (TF) sounding, following by a sensing measurement setup termination procedure, according to some examples. In examples, a TB sensing measurement instance may be used where the sensing initiator is an AP and one or more non-AP STAs are sensing responders. In examples, a TB sensing measurement instance may include a polling phase, an NDPA sounding phase, a trigger frame (TF) sounding phase, and a reporting phase.

Figure 10A:
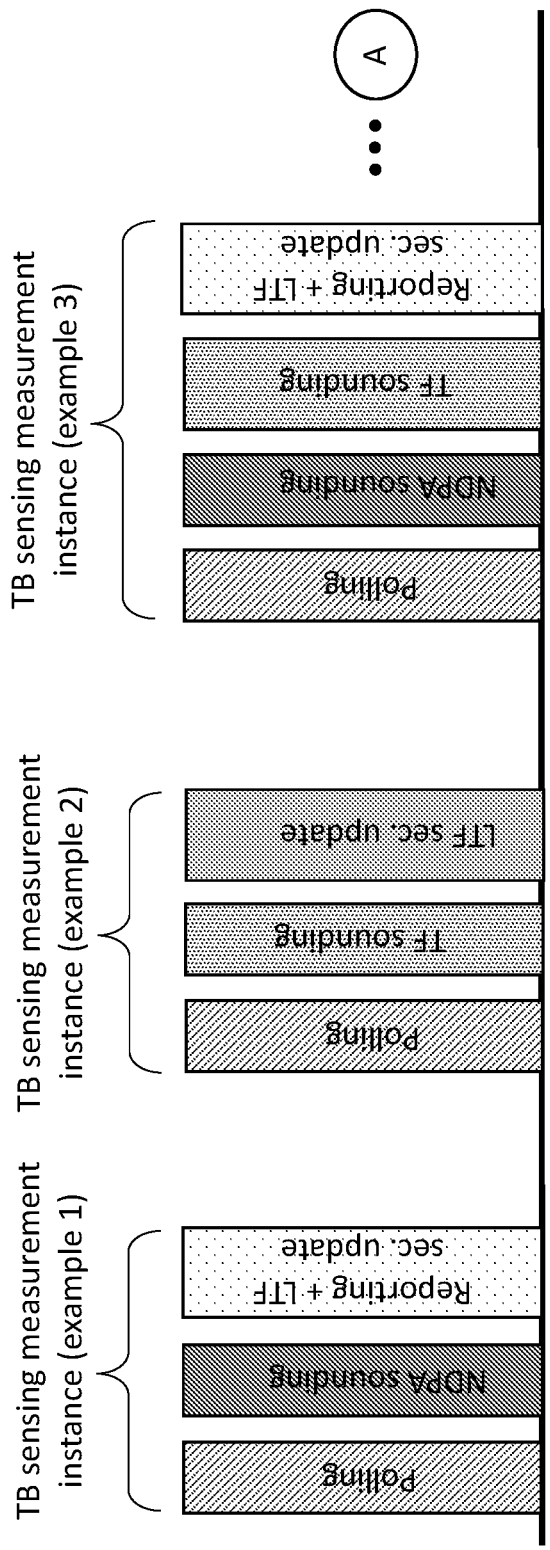
FIG. 10A and FIG. 10B depict examples of trigger-based (TB) sensing measurement instances, according to some embodiments.
Figure 10B:
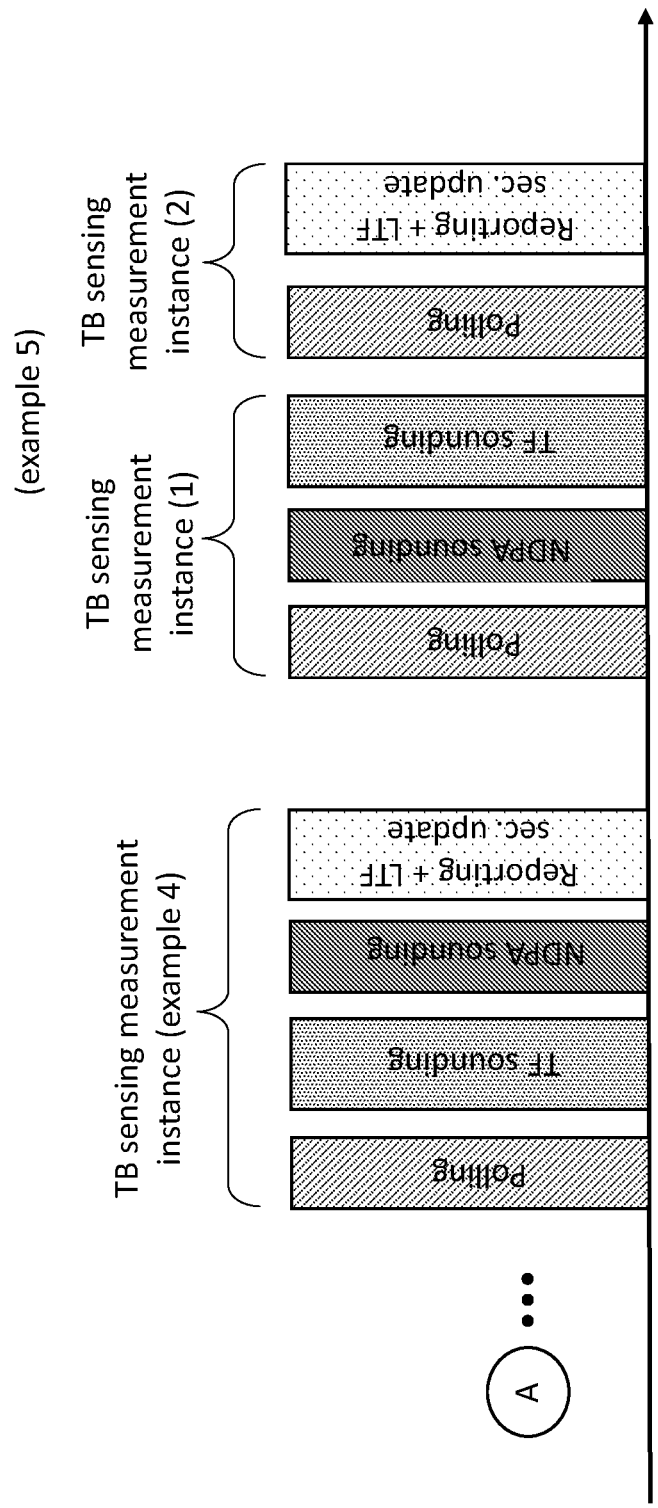

FIG. 10A and FIG. 10B illustrate five examples of TB sensing measurement instances. Example 1 of FIG. 10A illustrates an example of a TB sensing measurement instance comprising a polling phase, an NDPA sounding phase, and a reporting phase. Example 2 of FIG. 10A illustrates an example of a TB sensing measurement instance comprising a polling phase and a TF sounding phase. Example 3 of FIG. 10A and Example 4 of FIG. 10B illustrate two examples of a TB sensing measurement instance comprising a polling phase, an NDPA sounding phase, a TF sounding phase, and a reporting phase. Example 5 of FIG. 10B shows two TB sensing measurement instances, where the first TB sensing measurement instance comprises a polling phase, an NDPA sounding phase, and a TF sounding phase, and the second TB sensing measurement instance comprises a polling phase and a reporting phase. In examples, the TF sounding phase of the TB sensing measurement instance may precede the NDPA sounding phase of the TB sensing measurement instance, for example as in Example 4. In examples, the NDPA sounding phase of the TB sensing measurement instance may precede the NDPA sounding phase of the TB sensing measurement instance, for example as in Example 3. In some embodiments, the reporting phase of the second TB sensing measurement instance in Example 5 may be addressed to sensing responders other than the sensing responders involved in the TF sounding phase or the NDPA sounding phase of the first TB measurement instance.

Figure 11A:
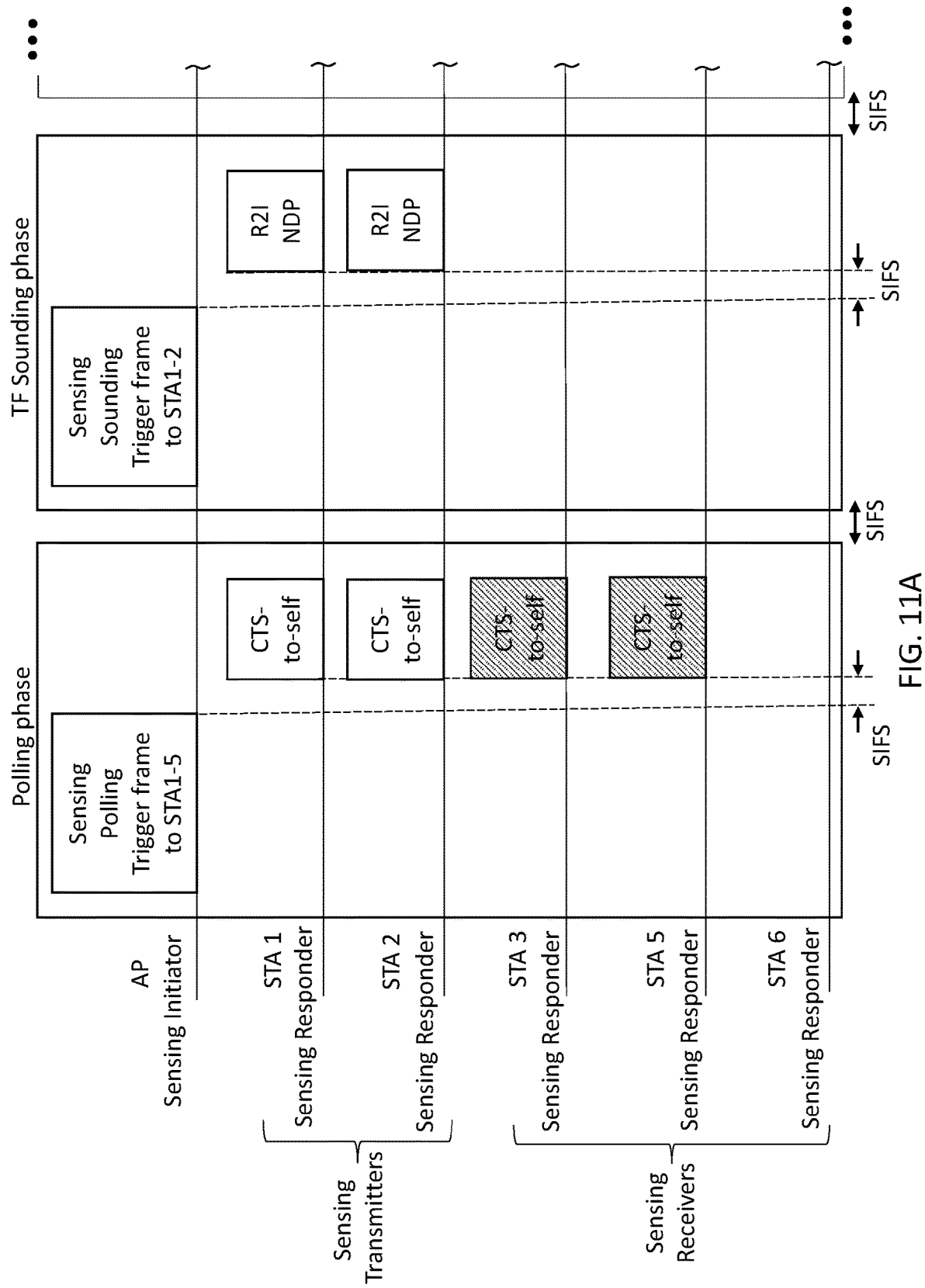
FIG. 11A and FIG. 11B depict an example of a single TB sensing measurement instance including a polling phase, a trigger frame sounding phase, and an NDPA sounding phase, according to some embodiments.
Figure 11B:
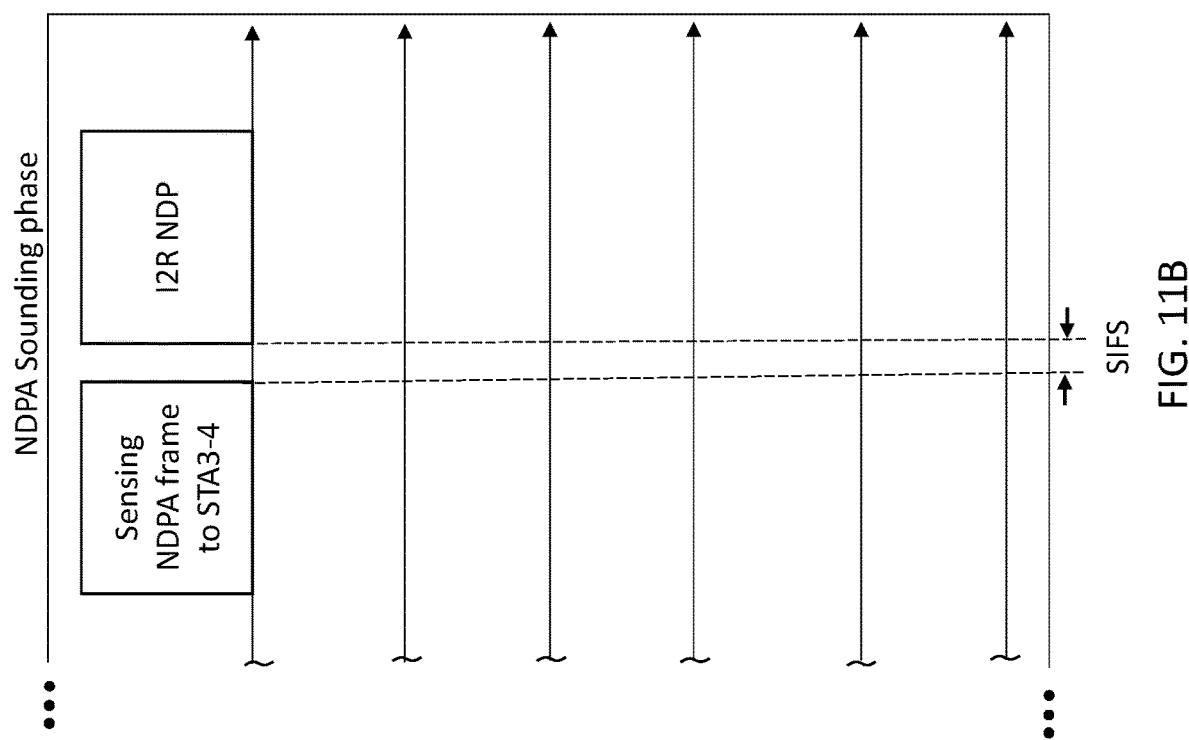

FIG. 11A and FIG. 11B are one example of a TB sensing measurement instance with a single AP in the role of a sensing initiator and five STAs, referred to as STA 1, STA 2, STA 3, STA 4, and STA 5, all of which in the example are sensing responders. In the example, the TB sensing measurement instance comprises a polling phase, a TF sounding phase, and an NDPA sounding phase. In the example, STA 1 and STA 2 are sensing transmitters, such as sensing transmitter 504-1 and sensing transmitter 504-2. In the example of FIG. 11A and FIG. 11B, STA 3, STA 4, and STA 5 are sensing receivers, such as sensing receiver 502-1, sensing receiver 502-2, and sensing receiver 502-3. In examples, in the polling phase, the AP as the sensing initiator transmits a Sensing Polling Trigger frame to STA 1, STA 2, STA 3, STA 4, and STA 5. In an embodiment, sensing transmitter STA 1 (504-1) and sensing transmitter STA 2 (504-2) respond to the Sensing Polling Trigger frame with an indication that the STA is available to participate in a sensing measurement instance. In examples, the indication is a CTS-to-self frame. In an embodiment, sensing receiver STA 3 (502-1) and sensing receiver STA 4 (502-2) respond to the Sensing Polling Trigger frame with an indication that the STA is available to participate in a sensing measurement instance. In examples, the indication is a CTS-to-self frame. In the example, sensing receiver STA 5 (502-3) does not respond to the Sensing Polling Trigger frame sent by the AP as the sensing initiator, indicating that STA 5 (502-3) will not participate in the sensing measurement instance.

The sensing measurement instance of FIG. 11A and FIG. 11B includes a TF Sounding phase. In examples, in the TF Sounding phase, the AP as the sensing initiator sends a Sensing Sounding Trigger frame to sensing transmitter STA 1 (504-1) and to sensing transmitter STA 2 (504-2). In examples, a period of one or more SIFS elapses between the AP receiving the CTS-to-self frames from STA 1, STA 2, STA 3, and STA 4 before sending the Sensing Sounding Trigger frame. In examples, responsive to receiving the Sensing Sounding Trigger frame, sensing transmitter STA 1 (504-1) and sensing transmitter STA 2 (504-2) send sensing transmissions to the AP. In examples, the sensing transmissions may comprise NDP transmissions. In an example, one or more of the NDP transmissions to the AP may be R2I NDP transmissions (as shown in the example of FIG. 11A and FIG. 11B). In examples, a period of one or more SIFS elapses between sensing transmitter STA 1 (504-1) receiving the Sensing Sounding Trigger frame and transmitting a sensing transmission, and in examples a period of one or more SIFS elapses between sensing transmitter STA 2 (504-2) receiving the Sensing Sounding Trigger frame and transmitting a sensing transmission. In examples, the AP may assume the role of sensing receiver 502-4, and the AP may make sensing measurements on the sensing transmissions from sensing transmitter STA 1 (504-1) and sensing transmitter STA 2 (504-2).

Referring again to FIG. 11A and FIG. 11B, in a NDPA sounding phase, the AP acting as sensing initiator assumes the role of sensing transmitter (504-3). In examples, the AP as sensing transmitter 504-3 transmits a sensing transmission. In examples, the sensing transmission may be a broadcast transmission. In examples, the sensing transmission may be a unicast transmission to one or more STAs, for example to sensing receiver STA 3 (502-1) and/or to sensing receiver STA 4 (502-2). In examples, a period of one or more SIFS elapses between the AP as sensing transmitter 504-3 sending the sensing NDPA frame and when the AP as sensing transmitter 504-3 sends the one or more sensing transmissions. In examples, one or more of the sensing transmissions may be a full bandwidth NDP frame. In examples, one or more of the sensing transmissions may be a partial bandwidth NDP frame. In examples, one or more of the NDP frames may be an I2R NDP frame.

Figure 12:
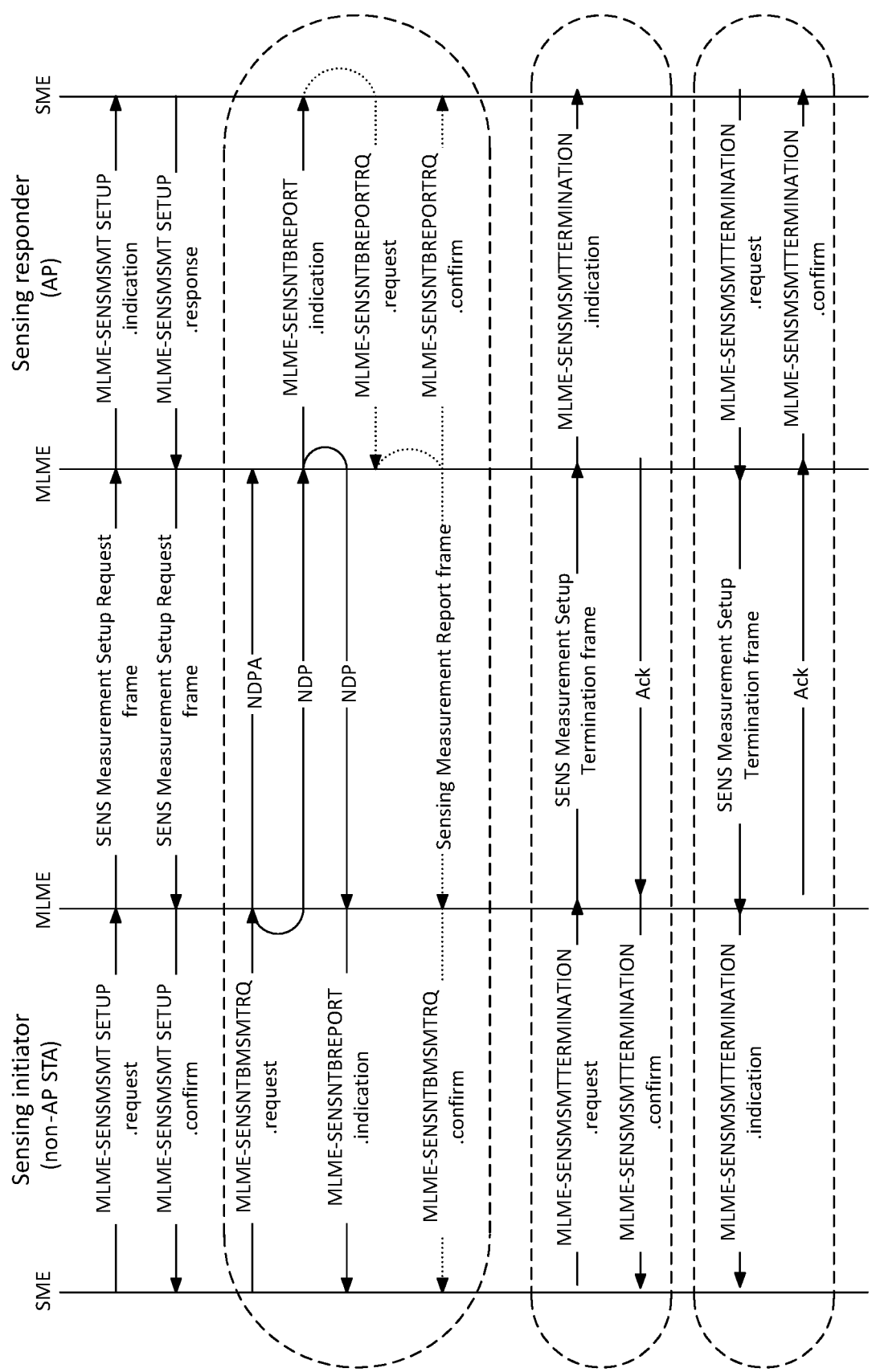
FIG. 12 depicts a message flow of a non-TB sensing measurement instance of a WLAN sensing procedure with both uplink and downlink sounding, according to some embodiments.

In examples, a sensing measurement instance of a WLAN sensing procedure may be a non-trigger-based (non-TB) sensing measurement instance. FIG. 12 depicts a message flow of a sensing measurement setup procedure followed by one or more non-TB sensing measurement instances of a WLAN sensing procedure that consist of one or more of downlink sounding or uplink sounding, according to some embodiments, followed by a sensing measurement setup termination procedure, according to some examples. In examples, a non-TB sensing measurement instance may be used where the sensing initiator is a non-AP STA and an AP is the sensing responder. In examples of uplink sounding as shown in FIG. 12, the sensing initiator (non-AP STA) acting as a sensing transmitter (for example, sensing transmitter 504-1) transmits a sensing announcement frame followed by a sensing transmission. In examples, the sensing announcement frame may be an NDPA frame. In examples, the sensing transmission may be an NDP frame. In examples, responsive to receiving the sensing transmission, the AP acting as a sensing receiver (for example, sensing receiver 502-1), may transmit to the sensing initiator (non-AP STA in the role of sensing transmitter 504-1) a sensing measurement report, for example one or more Sensing Measurement Report frames. In examples of downlink sounding as shown in FIG. 12, the sensing initiator (non-AP STA) acting as a sensing receiver (for example, sensing receiver 502-1) transmits a sensing announcement frame. In examples, the sensing announcement frame may be an NDPA frame. In examples, responsive to receiving the sensing announcement frame, the AP acting as sensing transmitter (for example, sensing transmitter 504-1) may transmit one or more sensing transmissions. In examples, one or more of the sensing transmissions may be an NDP frame. In examples, the non-AP STA acting as a sensing receiver (502-1), responsive to receiving a sensing transmission, may make a sensing measurement on the sensing transmission. In examples, the sensing measurement setup may be terminated by the sensing initiator or the sensing responder transmitting a SENS Measurement Setup Termination frame. In examples, the sensing responder or sensing initiator (respectively) may respond with an acknowledgment.

Figure 13:
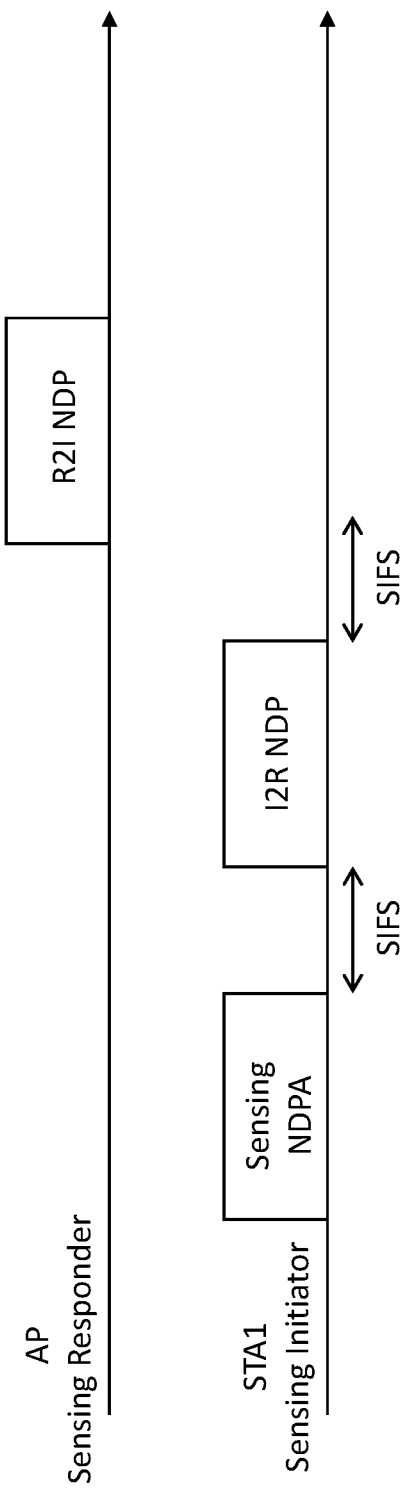
FIG. 13 depicts an example of a single non-TB sensing measurement instance, according to some embodiments.

FIG. 13 illustrates a detailed example of a non-TB sensing measurement instance, according to some embodiments. In examples, STA 1 acting as sensing initiator and sensing transmitter, such as sensing transmitter 504-1, transmits a sensing announcement frame. In examples, the sensing announcement frame may be a sensing NDPA frame. In examples, one or more SIFS may elapse followed by STA 1 acting as sensing initiator and sensing transmitter (such as sensing transmitter 504-1) transmitting one or more sensing transmissions. In examples, one or more of the sensing transmissions may be an NDP frame. In an example. STA 1 acting as sensing initiator and sensing receiver, such as sensing receiver 502-1, transmits a sensing announcement frame. In examples, the sensing announcement frame may be a sensing NDPA frame. In examples, one or more SIFS may elapse followed by AP 1 acting as sensing responder and sensing transmitter (such as sensing transmitter 504-1) transmitting one or more sensing transmissions. In examples, one or more of the sensing transmissions may be an NDP frame.

Figure 14:
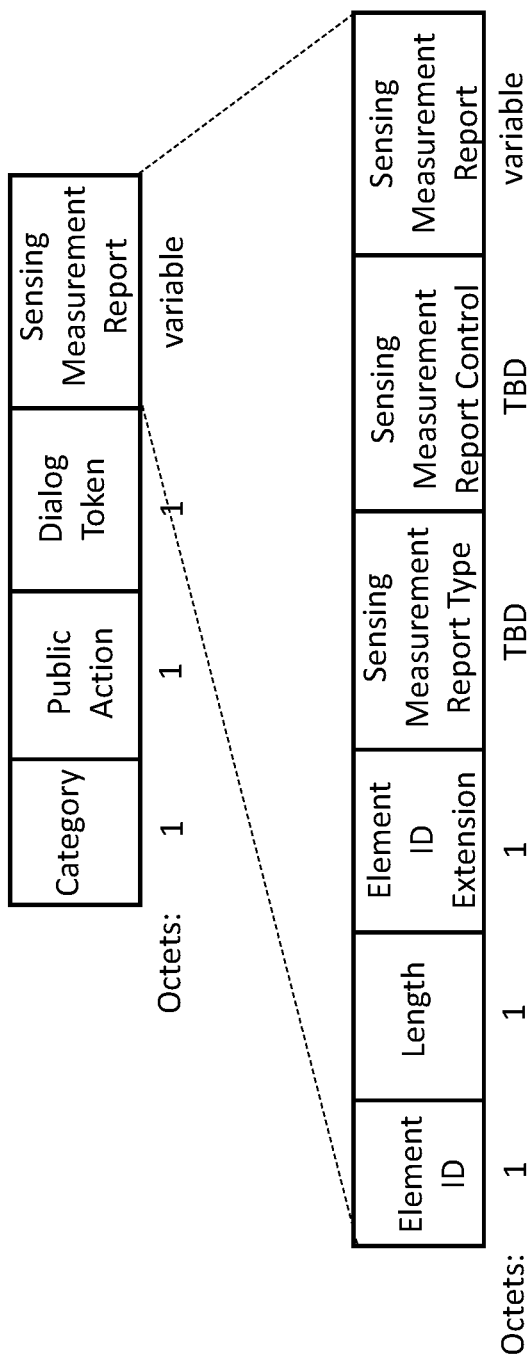
FIG. 14 depicts an example of a Public Action frame format of a Sensing Measurement Report frame and a Sensing Measurement Report field format, according to some embodiments.

FIG. 14 illustrates an example of a Sensing Measurement Report frame. In some embodiments, a Sensing Measurement Report frame is a Public Action category or a Public Action No Ack category. In some examples, a Sensing Measurement Report frame may be transmitted to provide WLAN sensing measurements, for example to a sensing agent or a sensing algorithm of a sensing initiator. In examples, a Sensing Measurement Report frame may comprise one or more Sensing Measurement Report elements. A Sensing Measurement Report element may comprise a single sensing measurement report, in some embodiments. In examples, a Sensing Measurement Report element may include a Sensing Measurement Report type field, which may contain a number that identifies the type of sensing measurement report. For example, a value of 0 may indicate that the sensing measurement type is a CSI measurement, whereas a non-zero value may indicate that the sensing measurement type is a TD-CRI measurement.

Referring again to FIG. 14, in embodiments a Sensing Measurement Report element may include a Sensing Measurement Report Control field. In examples, the Sensing Measurement Report Control field may contain information necessary to interpret the Sensing Measurement Report field. For example, the Sensing Measurement Report Control field format may comprise one or more subfields. In an embodiment, one or more subfields of the Sensing Measurement Report Control field may include PHY layer parameters used by the sensing receiver when performing the sensing measurement, for example receiver antenna beamforming or spatial layer information.

In a sensing session, exchanges of transmissions between one or more of plurality of sensing receivers 502-(1-M) and one or more of plurality of sensing transmitters 504-(1-N) may occur. In an example, control of these transmissions may be with the MAC layer of the IEEE 802.11 stack. According to an implementation, one or more of plurality of sensing receivers 502-(1-M) may secure a TXOP which may be allocated to one or more sensing transmissions by one or more of plurality of sensing transmitters 504-(1-N). According to an implementation, one or more of plurality of sensing receivers 502-(1-M) may allocate channel resources (or RUs) within a TXOP to the one or more of plurality of sensing transmitters 504-(1-N). In an example, one or more of plurality of sensing receivers 502-(1-M) may allocate the channel resources to the one or more of plurality of sensing transmitters 504-(1-N) by allocating time and bandwidth within the TXOP to the one or more of plurality of sensing transmitters 504-(1-N).

According to an implementation, an example of a hierarchy of fields within sensing trigger message is shown in FIG. 15A to FIG. 15H.

Figure 15A:
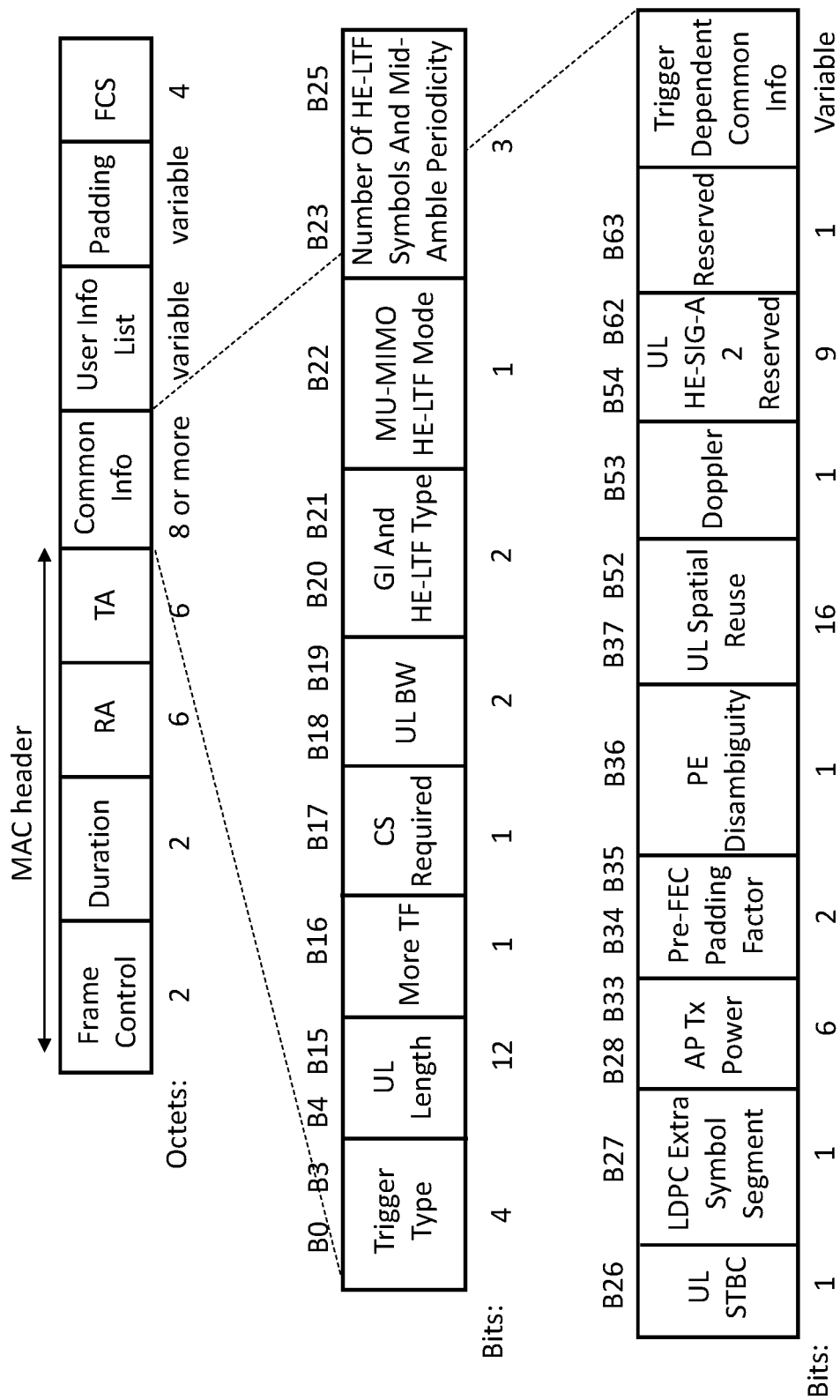

As described in FIG. 15A, the Common Info field may contain information which is common to one or more of plurality of sensing transmitters 504-(1-N). According to some implementations, the requirement of an NDPA preceding an NDP may be optional. This may be indicated to one or more of plurality of sensing transmitters 504-(1-N) and may for example be encoded into a "Trigger Dependent Common Info" field if the requirement is common to plurality of sensing transmitters 504-(1-N), or into a "Trigger Dependent User Info" field if the requirement is specific to one or more of plurality sensing transmitters sensing transmitters 504-(1-N). According to an example, the requirement for a sensing announcement (for example, and NDPA) preceding a sensing response NDP may be encoded by a single bit where 0 (bit clear) indicates that a sensing announcement is optional and 1 (bit set) indicates that a sensing announcement is required.

As described in FIG. 15B, a Trigger Type (within B0 . . . 3 of "Common Info" field) may be defined which represents a sensing trigger message. In examples, a sensing Trigger message may have a Trigger Type subfield value of any Reserved value from 9-15, for example a Sensing Trigger message may have a Trigger Type subfield value of 9. In an example of triggering a sensing transmission from a sensing transmitter 504-1, a Trigger Dependent User Info field may include sensing trigger message data. In an implementation, a time-synchronized sensing transmission may be required from plurality of sensing transmitters 504-(1-N) responding to a sensing trigger message. In an example, the requirement for one or more time-synchronized sensing transmissions may be encoded into a Trigger Dependent Common Info field. According to an example, the requirement for one or more time-synchronized sensing transmissions may be encoded by a single bit where 0 (bit clear) represents a request for a normal or non-time-synchronized response and 1 (bit set) represents a request for a time-synchronized response. In some examples, a method of time-synchronization may be requested in the sensing trigger. In examples, the method of time-synchronization to be requested may be encoded into a Trigger Dependent Common Info field. In examples the encoding may use two bits as shown in the following table.

| Encoding | Method | Description |
| --- | --- | --- |
| 00 | A | Sensing announcement followed by sensing NDP. |
| 01 | B | Padding followed by a sensing response message. |
| 10 | C | Sensing NDP without an initial sensing announcement. |
| 11 | N/A | For future use or extensions. |

Figure 15C:
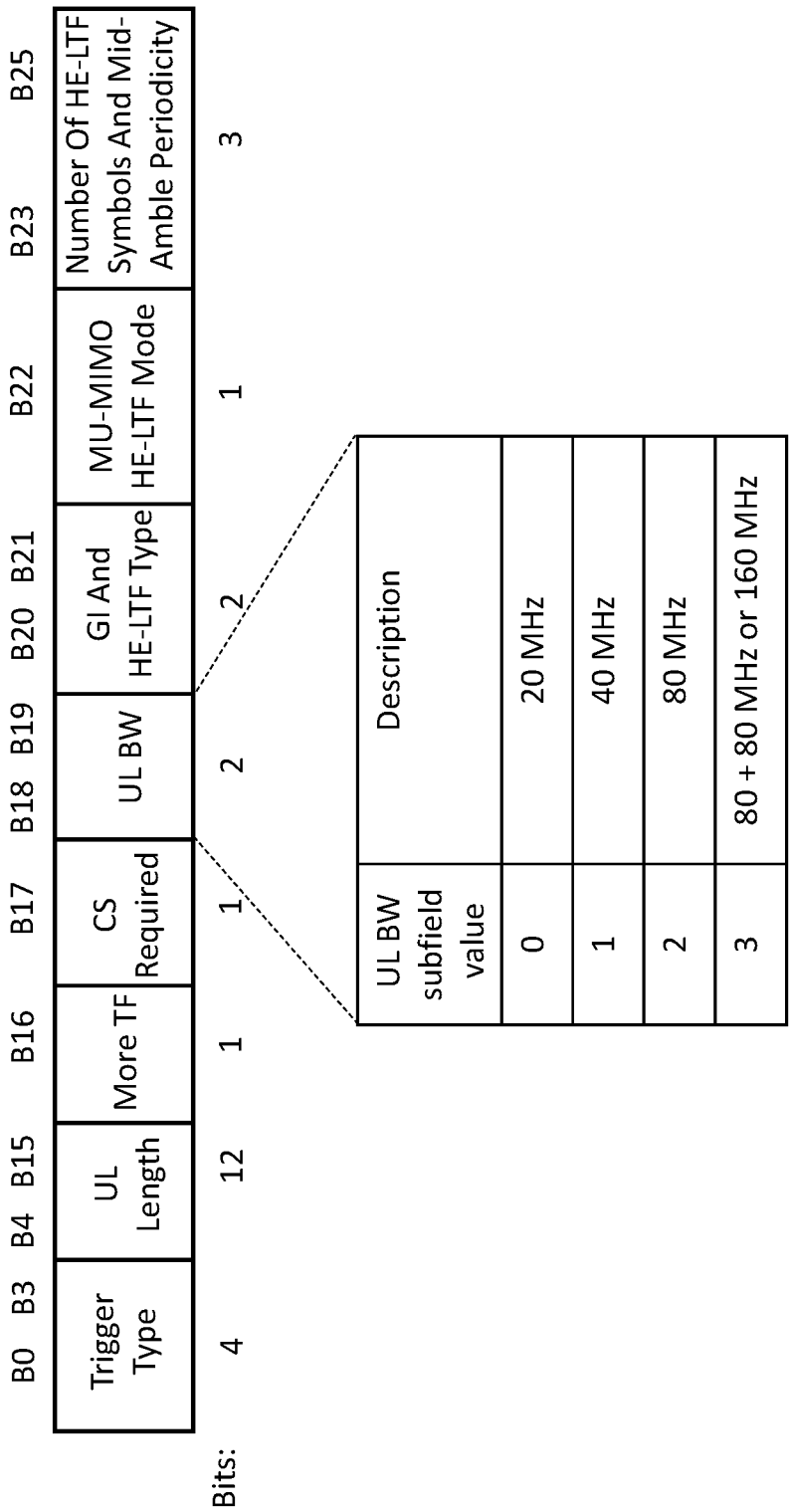

As described in FIG. 15C the sensing trigger message may have an uplink bandwidth (UL BW) subfield value of 0, 1, 2 or 3 corresponding to bandwidths of 20 MHz, 40 MHz, 80 MHz, or 80+80 MHz (160 MHz).

Figure 15D:
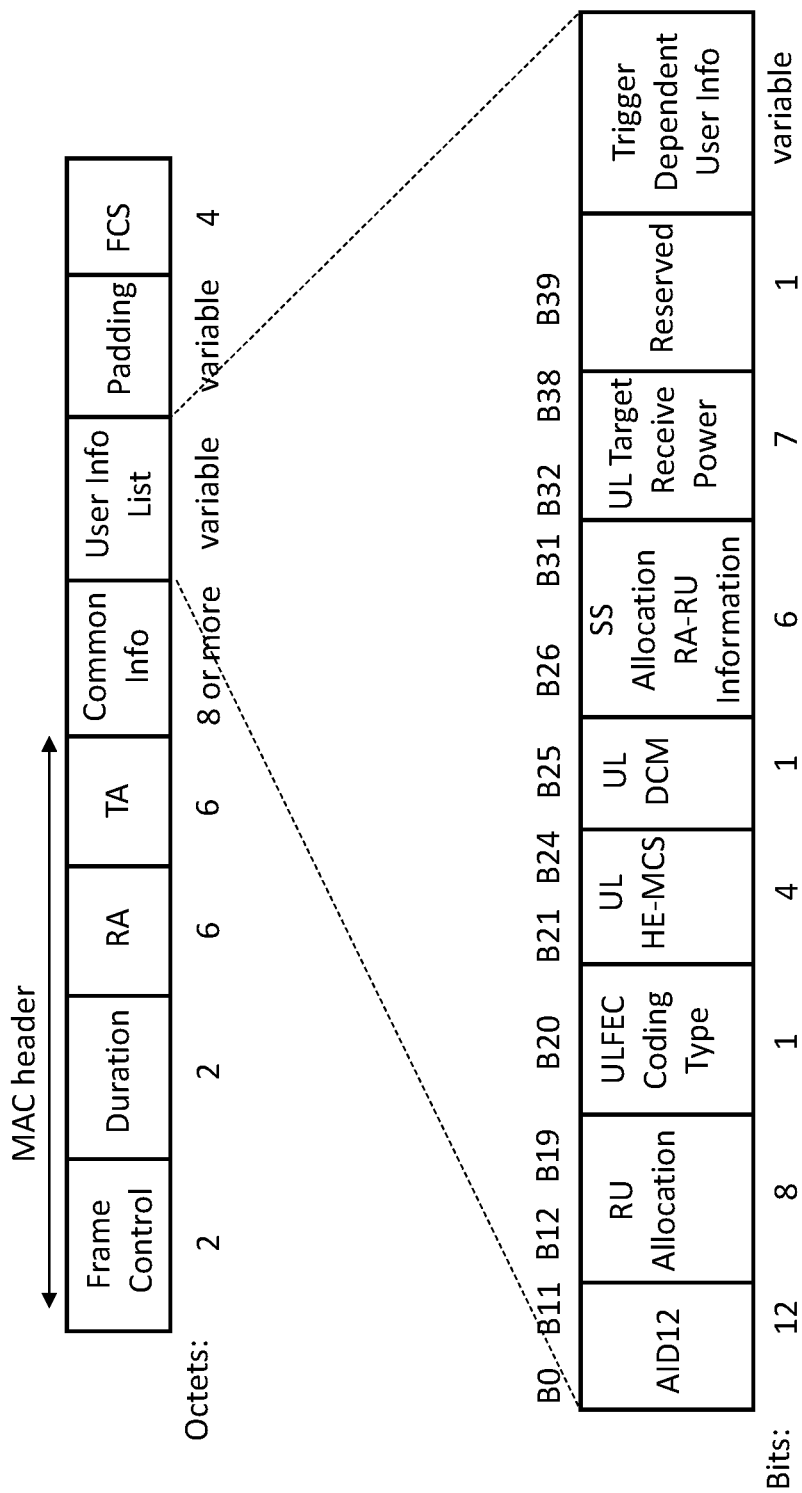

As described in FIG. 15D, the User Info List contains information which is specific to each of the plurality of sensing transmitters 504-(1-N). In examples, the User Info List may include the AID of a sensing transmitter, an RU allocation for a sensing transmitter, and other Trigger Dependent User Info.

Figure 15E:
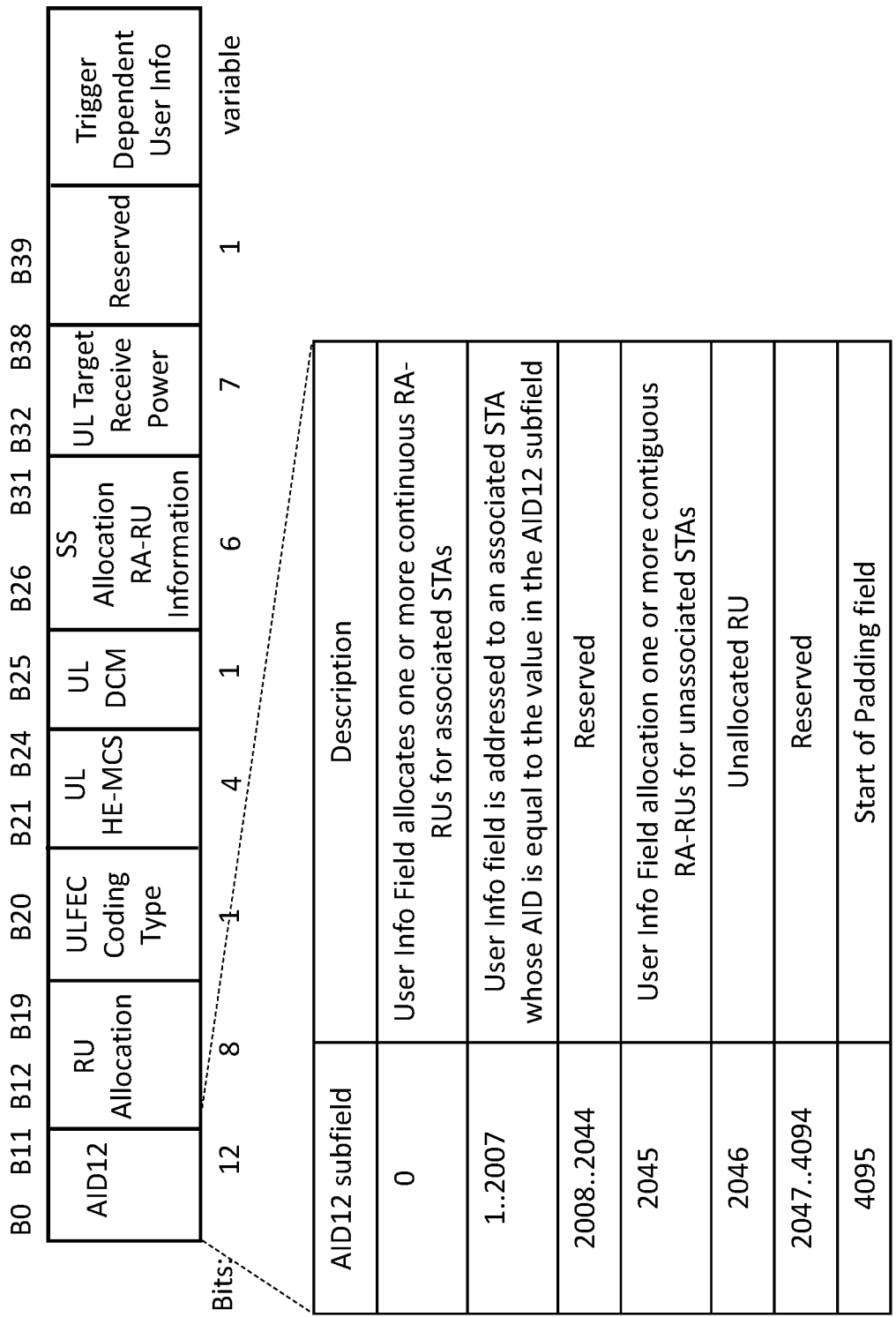

As described in FIG. 15E, the AID12 subfield of the User Info List illustrated in FIG. 15D may be used to address a specific sensing transmitter of the plurality of sensing transmitters 504-(1-N).

Figure 15F:
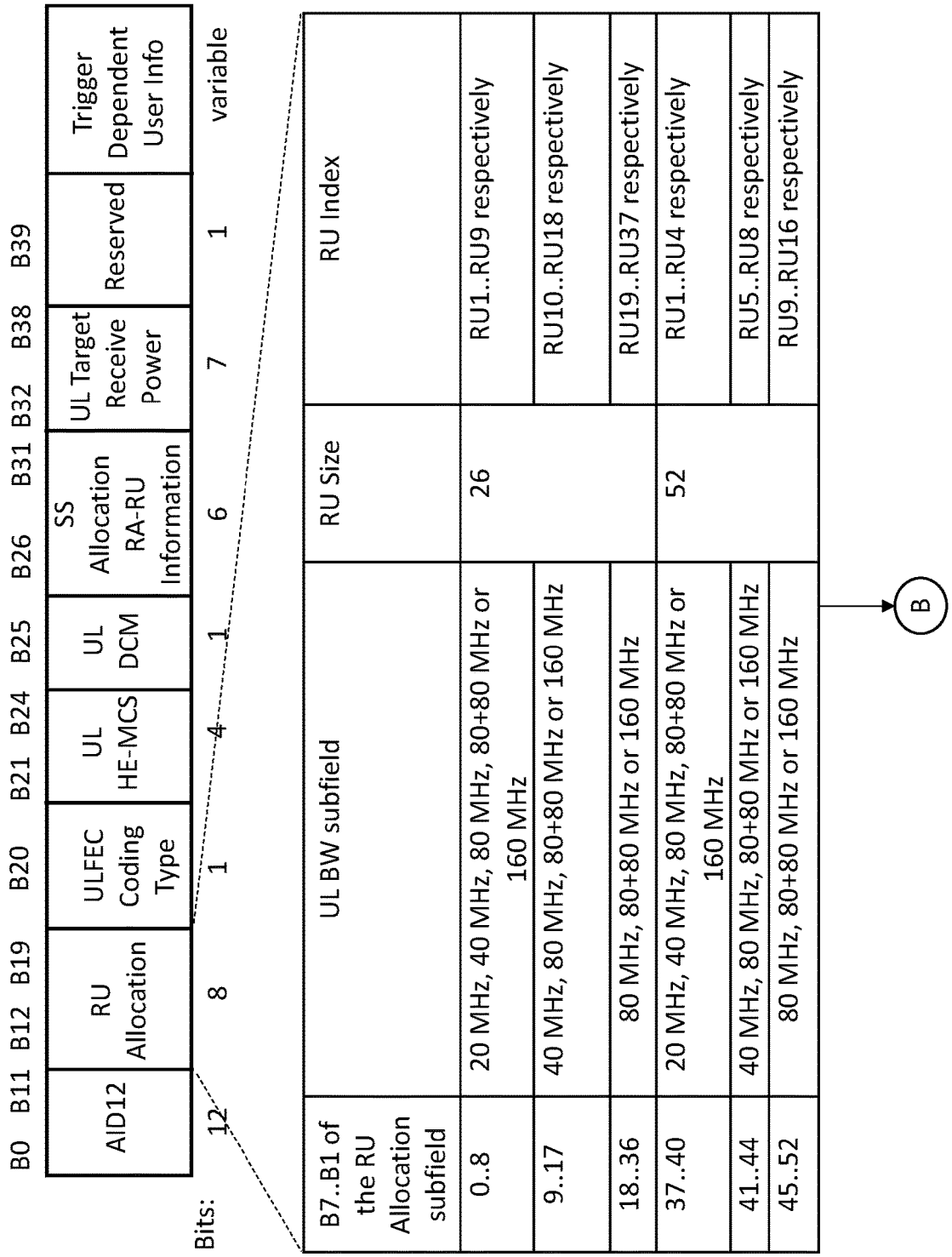
Figure 15G:

As described in FIG. 15F and FIG. 15G, the RU Allocation subfield is used to allocate resource units (RU) to each of the plurality of sensing transmitters 504-(1-N).

Figure 15H:
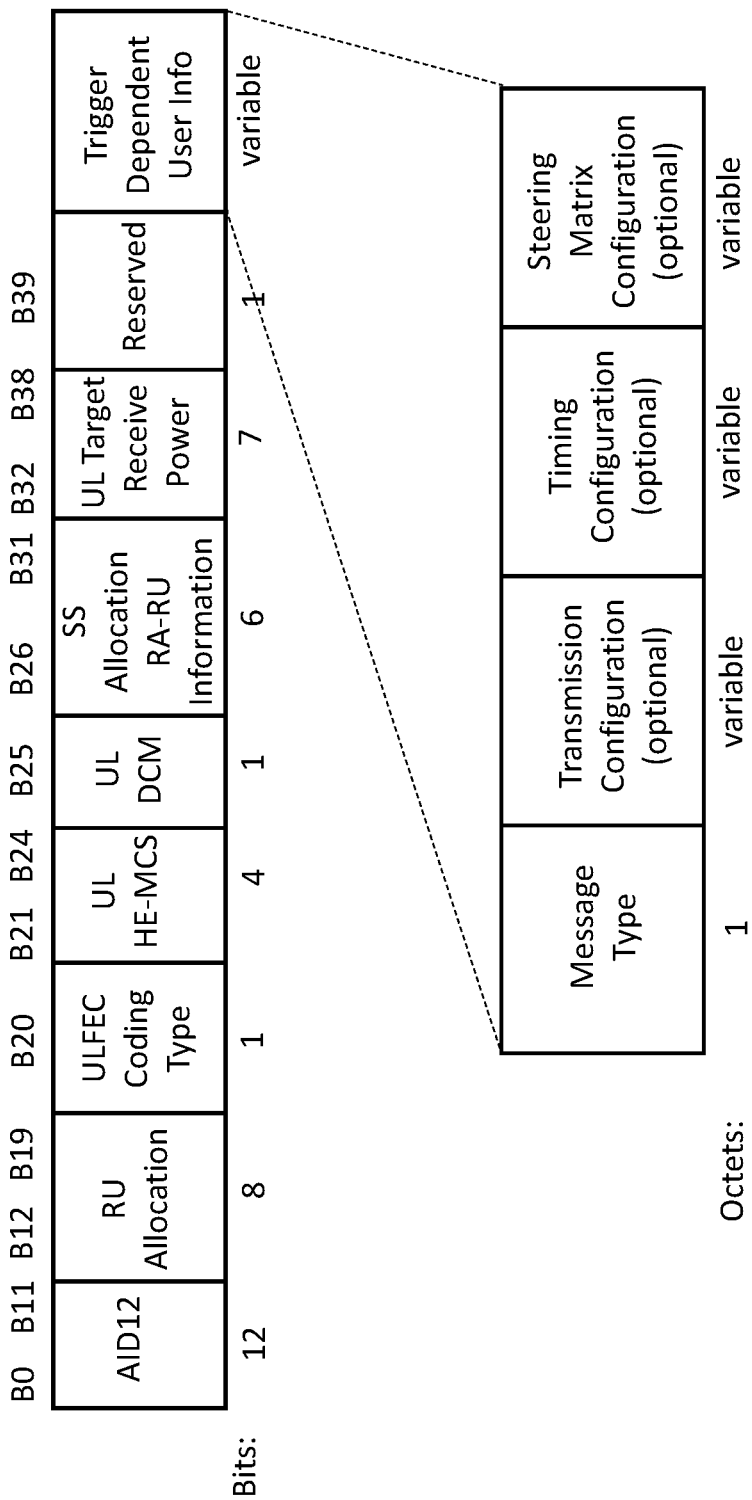

As described in FIG. 15H, the Trigger Dependent User Info subfield may be used to request the transmission configuration and/or steering matrix configuration for one or more of the plurality of sensing transmitters 504-(1-N) that the sensing trigger message is triggering.

C. Systems and Methods for Motion Detection Using Sensing Transmission Clusters

The following describes systems and methods for motion detection in Wi-Fi sensing using sensing transmission clusters.

A Wi-Fi sensing system may be a network of Wi-Fi-enabled devices that may be a part of an IEEE 802.11 network. In an example, a Wi-Fi sensing system may be configured to detect features of interest in a sensing space.

A sensing space may refer to any physical space in which a Wi-Fi sensing system may operate and may include a place of abode, a place of work, a shopping mall, a sports hall or sports stadium, a garden, or any other physical space. The Wi-Fi sensing system may be a network of Wi-Fi-enabled devices which are part of an IEEE 802.11 network (sometimes referred to as a basic service set (BSS) or extended service set (ESS)). The features of interest may include motion of objects and motion tracking, presence detection, intrusion detection, gesture recognition, fall detection, breathing rate detection, and other applications.

Currently, an IEEE 802.11 physical channel constitutes a number of orthogonal frequency division multiplexing (OFDM) tones or carriers depending on the overall bandwidth of the channel and the revision of the specification. For example, 52 data and pilot carriers may be used for a 20 MHz channel bandwidth, and 104 data and pilot carriers may be used for a 40 MHz channel bandwidth. A baseband Wi-Fi receiver may calculate a sensing measurement (for example, channel state measurement (CSI)) consisting of a real and imaginary part for each element and the sensing measurement may be passed to a sensing algorithm to determine if there is motion or movement in the sensing space. In examples, motion may be determined in the sensing space by the sensing algorithm by looking for perturbation in the local environment, e.g., on transmission paths (links) between one or more transmitter devices (for example, sensing transmitters) and one or more receiver devices (for example, sensing receivers).

Figure 16:
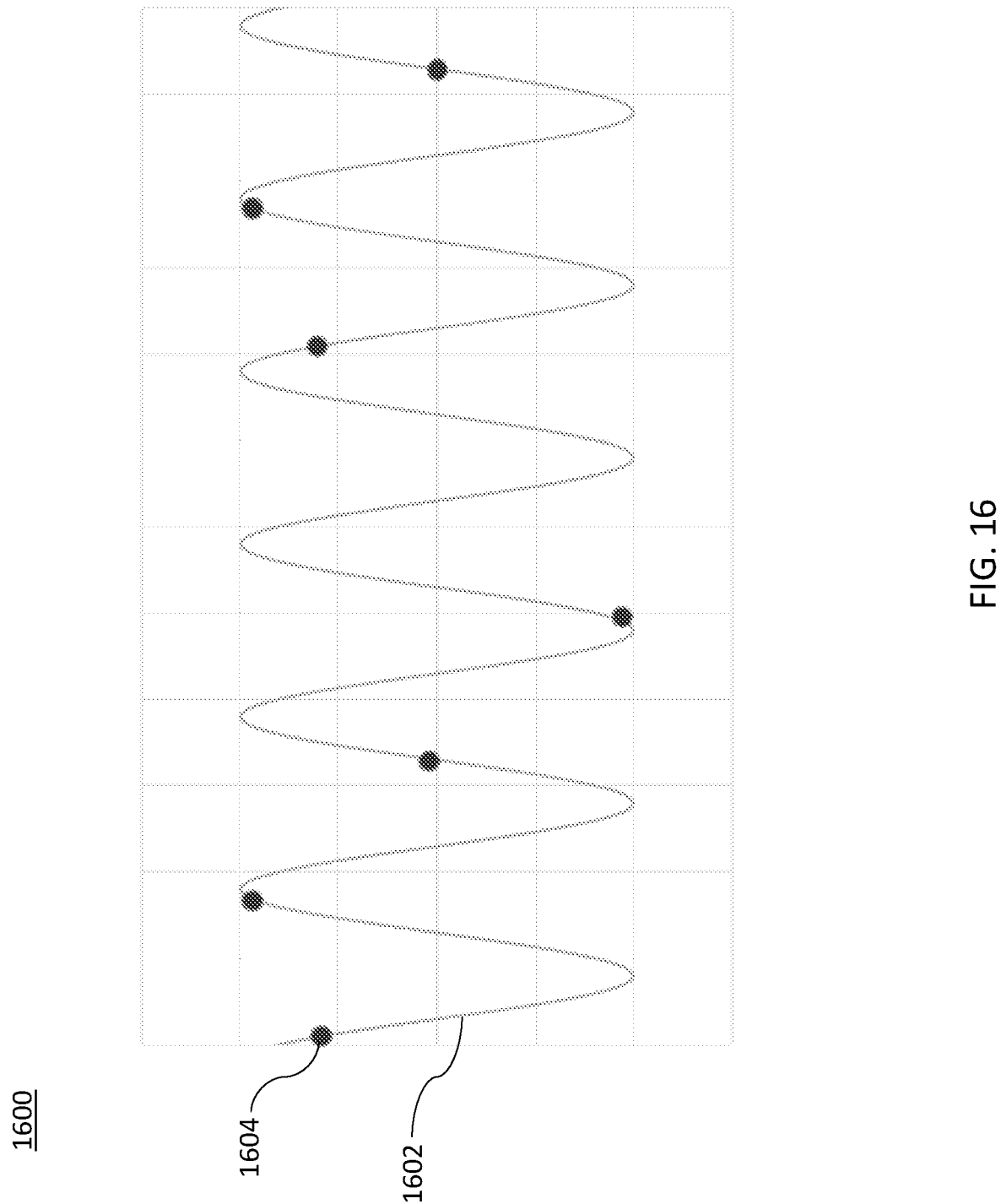
FIG. 16 depicts an example of a signal at a specific frequency, according to some embodiments.

FIG. 16 depicts example 1600 of signal 1602 at a specific frequency (single frequency) that may be represented in time/amplitude domain as a portion of sinusoid (sinusoidal wave), according to some embodiments. In an example, signal 1602 may be transmitted by a sensing transmitter in response to a sensing trigger message (or a sensing sounding trigger frame) from a sensing initiator. In examples, signal 1602 may be sampled periodically using sensing measurements. In the example shown in FIG. 16, dots (represented by reference number "1604") along the sinusoid may indicate points where a sensing receiver performed a sensing measurement on a sensing transmission of signal 1602 at the specific frequency.

Figure 17:
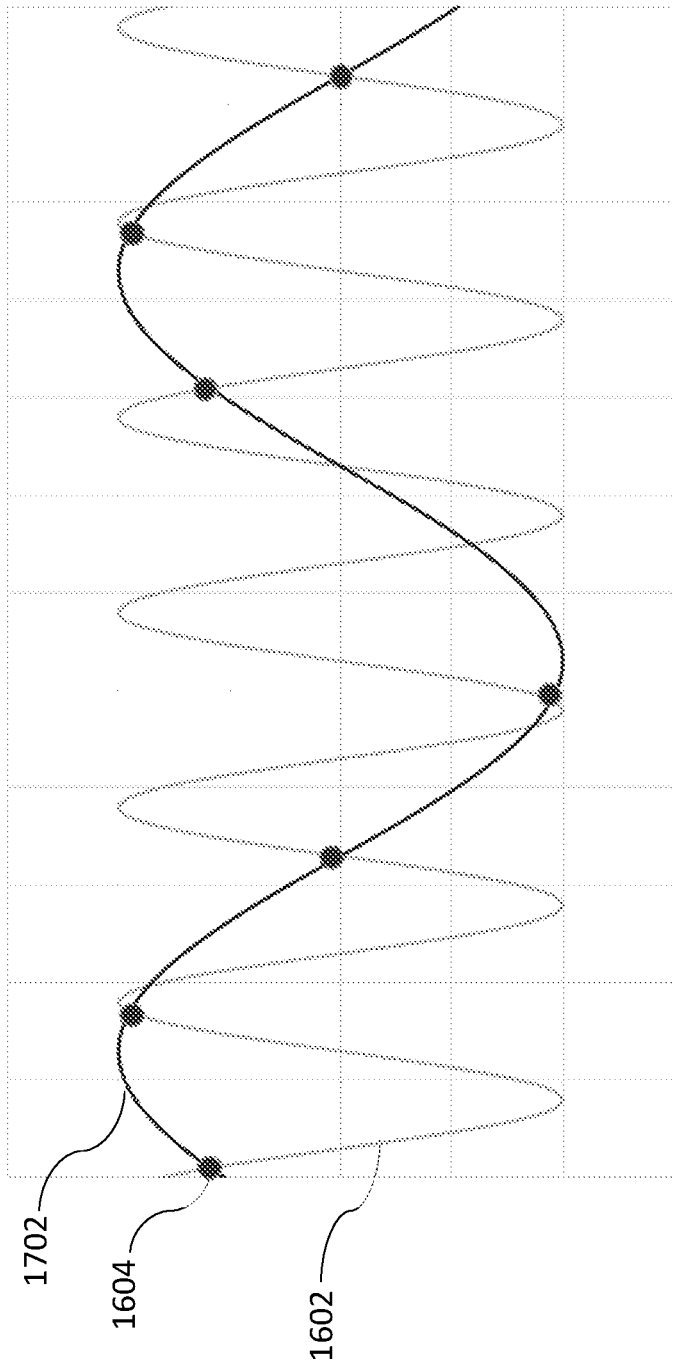
FIG. 17 depicts an example of inaccurate frequency detection due to aliasing, according to some embodiments.

FIG. 17 depicts example 1700 of inaccurate frequency detection due to aliasing, according to some embodiments.

In particular, FIG. 17 demonstrates that the reconstruction of a signal from sampling (represented by dots 1604 in FIG. 16) of original frequency signal (for example, signal 1602 of FIG. 16) may result in either the original frequency signal or a different lower frequency signal (represented by reference number "1702"). This shows that incorrect frequencies can be obtained from the sampling of the original frequency signal.

In examples, the process of making a sensing measurement (or a series of sensing measurements) is described by the exchange of transmissions between a sensing transmitter and a sensing receiver. In an example of a trigger-based sensing procedure, and following an initial polling phase, in the trigger frame (TF) sounding phase, a sensing sounding trigger frame may be sent from the sensing initiator (for example, AP) to one or more sensing transmitters (for example, STAs). The sensing sounding trigger frame may trigger a sensing transmission that may be a null data packet (NDP) sensing response frame (for example, uplink from STA to AP) that the sensing receiver (which may be the sensing initiator or may be another device) uses to make a sensing measurement. Example of the TB sensing measurement instance is explained in detail in FIG. 11A and FIG. 11B.

In examples, a Trigger frame is defined by P802.11ax/D8.0 and it may serve many purposes which are signaled in the payload of the Trigger frame (for example, Trigger Frame Type and Trigger Frame Subtype). An example of a structure of the Trigger frame and an example of a hierarchy of fields within a sensing trigger are explained in detail by FIG. 15A to FIG. 15H.

In a sensing measurement instance, multiple TF sounding phases may be possible. However, in the multiple TF sounding phases the sensing initiator may trigger only different sensing transmitters within the acquired TXOP. TF sounding phase is described by P802.11bf/D0.2. In some examples, TF sounding may also be performed where a single sensing sounding trigger frame triggers a sensing transmitter to generate multiple sensing transmissions, for example NDP transmissions spaced one SIFS apart.

Figure 18:
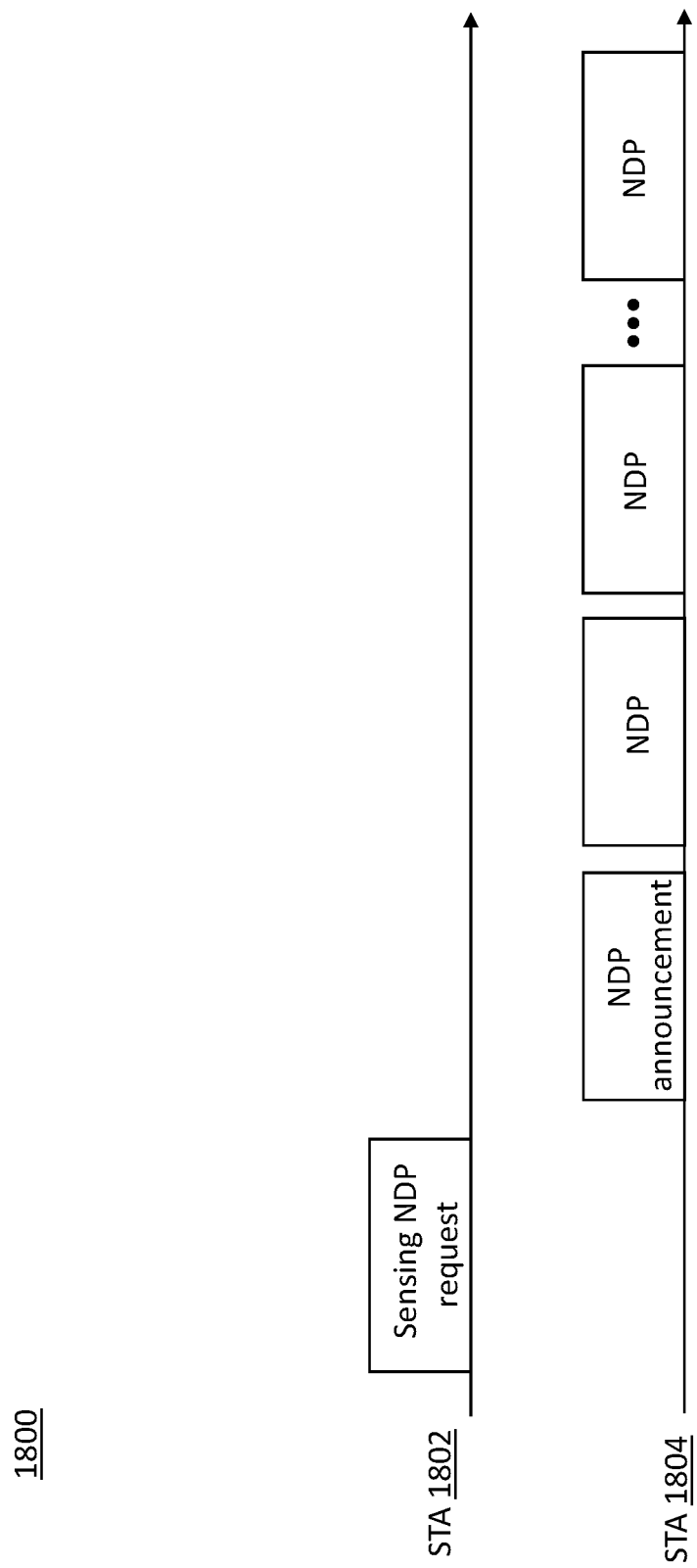
FIG. 18 illustrates an example of WLAN sensing sounding procedure with multiple NDPs, according to some embodiments.

FIG. 18 illustrates example 1800 of a WLAN sensing sounding procedure with multiple NDPs, according to some embodiments. In particular, FIG. 18 shows that STA 1802 transmits a sensing NDP request (which is an example of sensing sounding trigger frame) to STA 1804. In examples, upon receiving the sensing NDP request, STA 1804 may make sensing transmissions. In an example, the sensing transmissions may include an NDP announcement (NDPA) followed by two or more NDPs. In examples, STA 1804 may transmit multiple NDPs consecutively with short time intervals (e.g., SIFS) between them. According to an example, the number of NDPs to be sent in a WLAN sensing sounding instance may be specified by STA 1802.

In examples, TF sounding may also be performed where a single sensing sounding trigger frame may trigger a sensing transmitter to transmit multiple sensing transmissions announcements following by sensing transmissions, with each sensing transmission spaced one SIFS apart.

Figure 19:
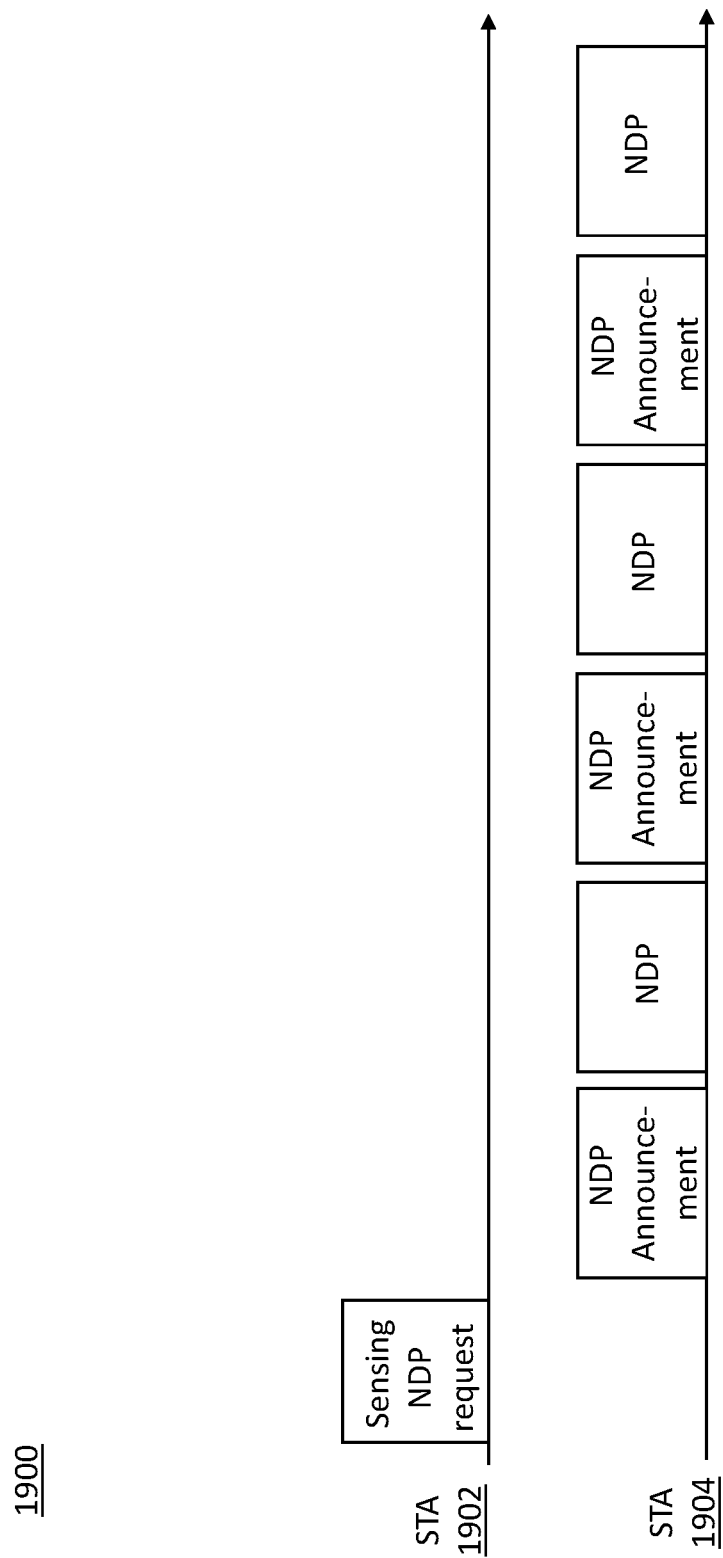
FIG. 19 illustrates another example of WLAN sensing sounding procedure with multiple NDPs, according to some embodiments.

FIG. 19 illustrates example 1900 of WLAN sensing sounding procedure with multiple NDPs, according to some embodiments. In particular, FIG. 19 shows that STA 1902 transmits a sensing NDP request (which is an example of sensing sounding trigger frame) to STA 1904. In examples, upon receiving the sensing NDP request, STA 1904 may make sensing transmissions. In an example, the sensing transmissions may include two or more repetitions of an NDPA followed by an NDP. In examples, STA 1904 may transmit multiple consecutive transmissions of an NDP announcement followed by an NDP. According to an example, the number of successive transmissions of an NDP announcement followed by an NDP to be sent in a WLAN sensing sounding instance may be specified by STA 1902.

In examples, the high efficiency long training field (HE-LTF) (introduced in IEEE 802.11ax) may be used in high efficiency OFDM systems. The HE PHY provides support for 3.2 µs (1× HE-LTF), 6.4 µs (2× HE-LTF), and 12.8 µs (4× HE-LTF) HE-LTF symbol durations. In an example, a guard interval may be added before each LTF symbol. The width of the guard interval may be adjustable, and may take values of 0.8 µs, 1.6 µs, or 3.2 µs. The valid combinations of LTF symbol and guard interval are given in Table 27-12 of IEEE 802.11ax/D8.0.

Figure 20:
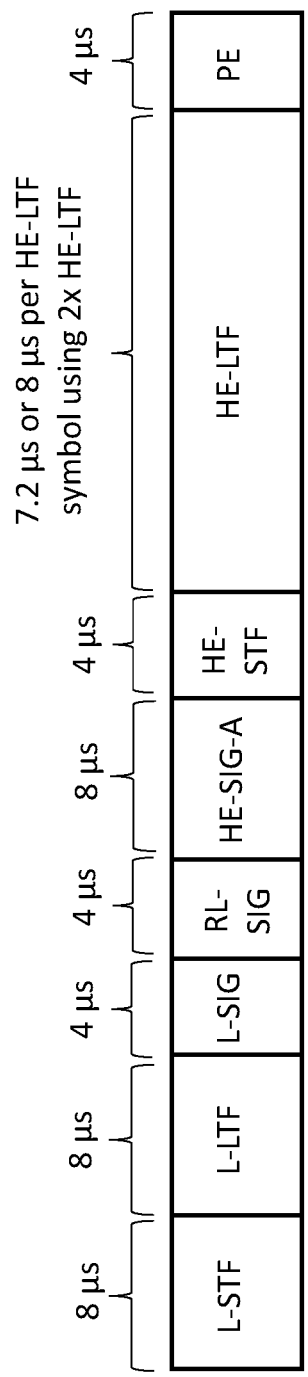
FIG. 20 depicts an example of a format of a high efficiency (HE) sounding NDP, according to some embodiments.

There are two HE NDPs currently defined by IEEE 802.11ax/D8.0, referred to as HE sounding NDP and HE TB feedback NDP. In an example, the HE sounding NDP may be sent from the AP to the STA. The HE sounding NDP must support 2× HE-LTF (6.4 µs) with a 0.8 µs guard interval or a 1.6 µs guard interval. Optionally, the HE sounding NDP may support 4× HE-LTF (3.2 μs) with a 3.2 μs guard interval. Example 2000 of a format of an HE sounding NDP is illustrated in FIG. 20. FIG. 20 is a reproduction of FIG. 27-45 in P802.11ax/D8.0.

Figure 21:
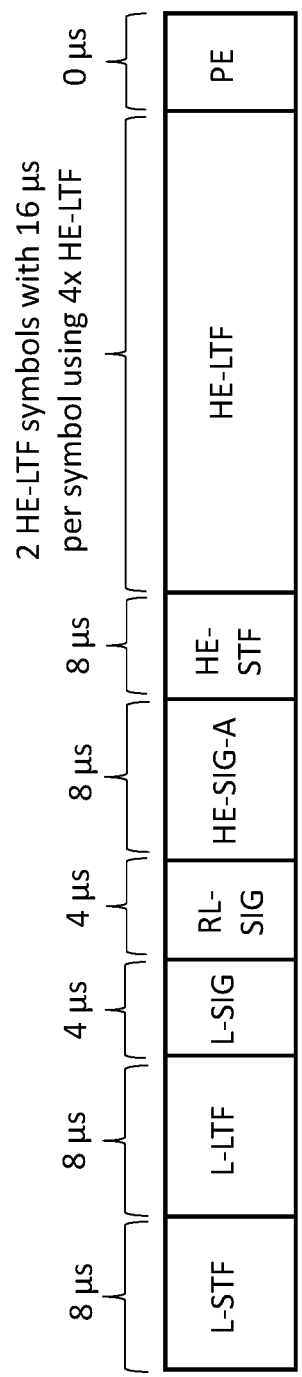
FIG. 21 depicts an example of a format of an HE TB feedback NDP, according to some embodiments.

In an example, the HE TB feedback NDP may be sent from the STA to the AP, and may be used to carry the NDP feedback report information. According to an example, the HE TB feedback NDP must support 4× HE-LTF (3.2 μs) with a 3.2 μs guard interval. Example 2100 of a format of an HE TB feedback NDP is illustrated in FIG. 21. FIG. 21 is a reproduction of FIG. 27-46 in P802.11ax/D8.0. In an example, the HE TB feedback NDP may include two 4× HE-LTF symbols.

Figure 22:
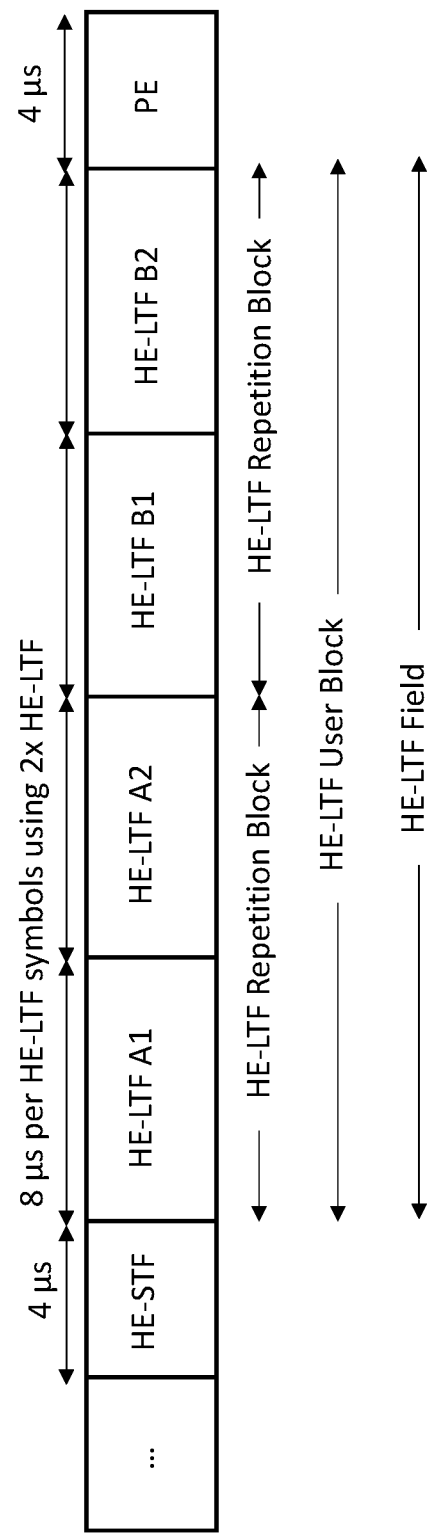
FIG. 22 illustrates an example of an HE Ranging NDP with two long training field (LTF) repetitions, according to some embodiments.

An HE Ranging NDP and an HE TB Ranging NDP were introduced in P802.11az/D4.2, both of which define an option to specify a repetition of the HE-LTF. FIG. 22 illustrates example 2200 of an HE Ranging NDP with two LTF repetitions, as defined by P802.11az/D4.2. In an example, HE LTF repetitions in the HE TB Ranging NDP may be enabled by the parameter LTF_REP.

In scenarios where a sensing measurement is made by a sensing receiver (acting as a sensing responder), the sensing measurement may be transferred to the sensing initiator. In an example, the sensing measurement may be transferred using a sensing measurement report. In certain scenarios, the sensing measurement report may be triggered by a Sensing Measurement Report Trigger frame. FIG. 23 depicts example 2300 of a format of a Sensing Measurement Report frame, according to some embodiments. FIG. 23 is a reproduction of FIG. 9-1139d in P802.11bf/D0.2.

In certain scenarios, Wi-Fi sensing operations may co-exist with regular data operations of the Wi-Fi network. The ongoing data requirements of the network may determine the availability of the network for sensing transmissions to occur (for example, in terms of time and frequency). In an example, sensing measurements are made on those sensing transmissions, and are used to detect and measure motion of an object in the transmission channel. In scenarios where the data network is congested, the number of opportunities for a sensing initiator to trigger sensing transmissions from a sensing transmitter may be fewer. Additionally, these opportunities may be aperiodic.

Currently IEEE 802.11 defines the availability window to be 10 TU (where TU is a timing unit and 1 TU is equal to 1024 μs). The maximum duration of a TXOP may be configurable by a network administrator and may be dependent on the Access Category (AC) of the transmission. However, default durations are between 2.048 ms and 4.096 ms. Therefore, a sensing transmitter, even when granted a TXOP, can at most transmit for the maximum duration of the TXOP within each 10 TU availability window. Assuming that the sensing transmitter is given the opportunity to make one sensing transmission per availability window, then the average interval between sensing measurements is 10 ms, or 100 Hz. Further, assuming that there is no ability to add an antialiasing filter, and assuming 1 sample every 10 ms then this results in a 50 Hz measurement bandwidth. Due to aliasing caused by under sampling, a Doppler frequency with a frequency greater that 50 Hz will appear to have a frequency between 0 and 50 Hz. For example, a 140 Hz Doppler frequency will appear to be a 40 Hz Doppler frequency.

The movement of the object may be derived as:

$$V = \frac{f_D c}{2 f_t} \quad (9)$$

where, V represents velocity, $f_D$, represents Doppler frequency (Doppler signature), c represents the speed of light in a vacuum (approx. $300 \times 10^6$ m/s) and $f_t$ represents the carrier frequency of the sensing transmission.

In an example, where $f_D=140$ Hz, then, $$V = \frac{140 \text{ Hz} \times 300 \times 10^6 \text{ m/s}}{2 \times 7.0 \times 10^9 \text{ Hz}} = 3.0 \text{ m/s}$$

and if $f_D$ is aliased to 40 Hz then V may be determined incorrectly as $$V = \frac{40 \text{ Hz} \times 300 \times 10^6 \text{ m/s}}{2 \times 7.0 \times 10^9 \text{ Hz}} = 0.86 \text{ m/s}$$

In a Wi-Fi sensing system, the sensing measurement interval may not be periodic, and may be extremely irregular as the opportunity to perform sensing transmissions may be given a lower priority in comparison to data transmissions in the system. In examples, even if there is a possibility to make a sensing measurement within an assigned availability window, due to variable channel utilization, the sensing transmission may happen close to the start of the availability window, somewhere in the middle of the availability window, or somewhere near the end of the availability window. In a worst case scenario, no sensing transmission may be possible in the current availability window at all, and the sensing initiator may need to wait until the next agreed upon availability window. This may result in insufficient sampling, thus resulting in inaccurate representation of the Doppler frequency shifts caused by motion of an object and leading to an inaccurate motion detection. Therefore, accurate measurement of a Doppler frequency superimposed on a channel state measurement made on a sensing transmission (where the Doppler frequency is caused by motion of an object in the transmission channel between a sensing transmitter and a sensing receiver) is essential to make an accurate determination and measurement of motion in the transmission channel.

According to aspects of the present disclosure, the aliasing of the measured Doppler frequency due to insufficient frequency of sampling at a sensing receiver (i.e., the irregular and potentially long interval between consecutive sensing transmissions and sensing measurements) may be overcome by enabling a series of rapid (quick succession in time) sensing measurements on a sensing transmission by a sensing transmitter with an average period sufficiently short to measure all WLAN sensing use cases. The series of rapid sensing measurements may be referred to as fast sounding. The sampling rate of the series of rapid sensing measurements may enable unambiguous determination of the Doppler frequency (i.e., frequency detection without aliasing) of the received reflections, enabling accurate motion detection. However the sensing measurements derived from fast sounding, while unambiguous with respect to Doppler frequency measurement, may have low signal to noise ratio (SNR).

In a joint communication and sensing network, resources (e.g., channel, spectrum, resource units, transmission opportunities) are shared for communication purposes and sensing purposes. Typically, as is the case for WLAN, sensing functionalities are secondary with respect to the communication services provided. Communication patterns are typically bursty in nature, where after the spectrum is acquired, large blocks of data may be transmitted. Also, it is typical for the same spectrum to be shared between different communication networks, further complicating access to the channel for either communications or sensing purposes. As a result, it is not feasible for sensing to have guaranteed access to resources to perform a requested sensing measurement. To ensure that the spectrum is sampled at the required rates for advanced applications to detect the desired environmental changes without ambiguity, the present disclosure describes a solution, wherein fast sounding is combined with a further step of slow sounding.

As described previously, the sensing measurements from fast sounding, while unambiguous with respect to Doppler frequency measurement, are of low SNR. This may be overcome by combining fast sounding with slow sounding, allowing for coherent integration of multiple fast sounding sensing measurements outcomes (clusters) to generate an accurate, high SNR Doppler frequency representation that may be used to detect motion, without risking detection of aliased frequencies.

Figure 24:
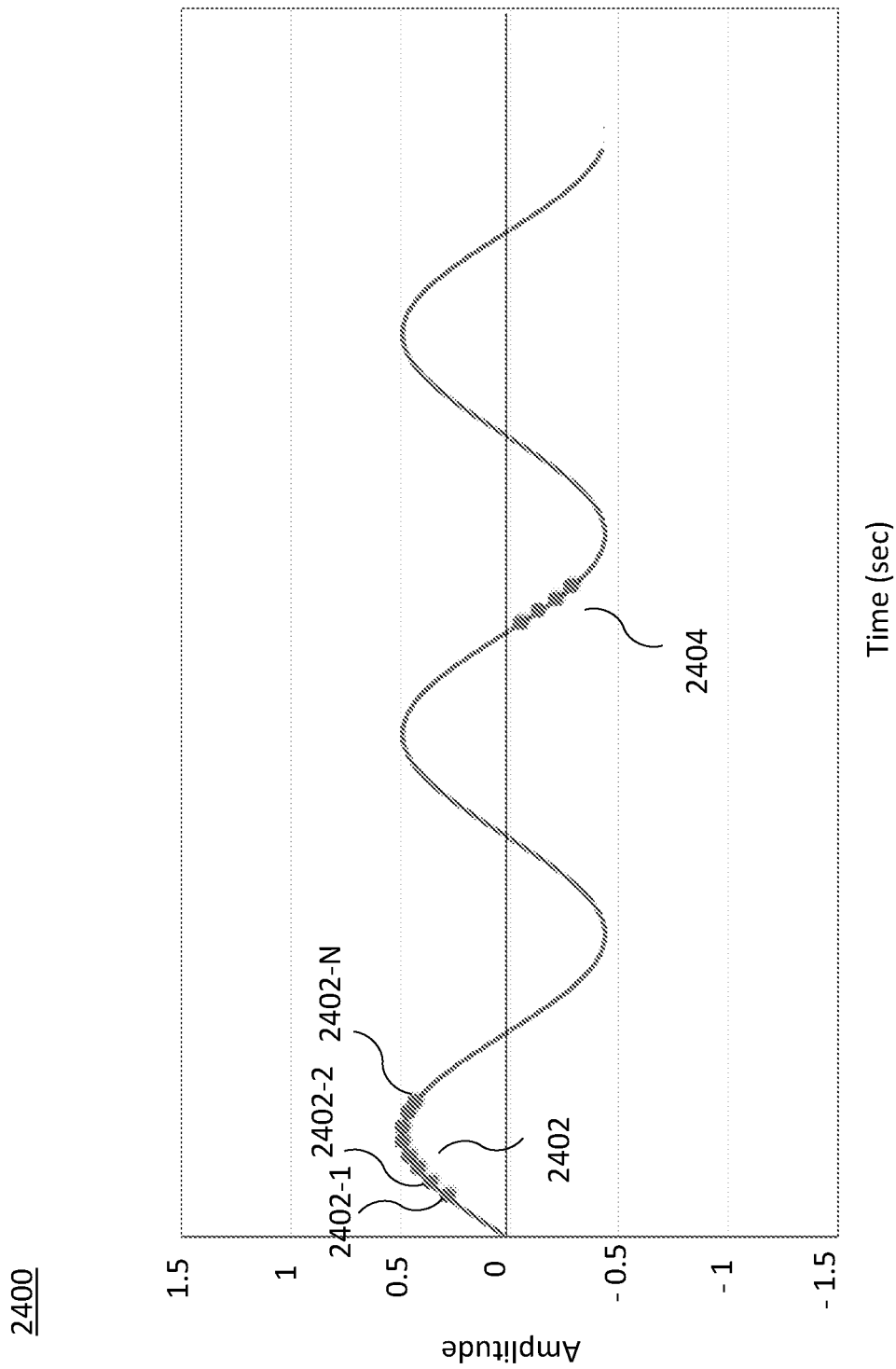
FIG. 24 depicts an example of fast sounding cluster measurements made on HE-LTF repetitions in a sensing transmission, according to some embodiments.

FIG. 24 depicts example 2400 of first plurality of fast sounding measurements 2402 and later second plurality of fast sounding measurements 2404 where second plurality of fast sounding measurements 2404 is an example of slow sounding. 2402-(1-N) shows a fast sounding measurement from first plurality of fast sounding measurements 2402.

In examples, Doppler frequency measurement may be referred to as environment sensing of dynamic objects. Examples of dynamic objects include an object which is moving, a human who is breathing, or a human performing a gesture. The dynamic object changes or modulates the reflection of the sensing transmission over time. The objective of Wi-Fi sensing may be to measure these changes in the reflections. According to aspects of the present disclosure, Wi-Fi sensing may use a Doppler frequency to measure these changes and determine motion of dynamic objects.

Figure 25:
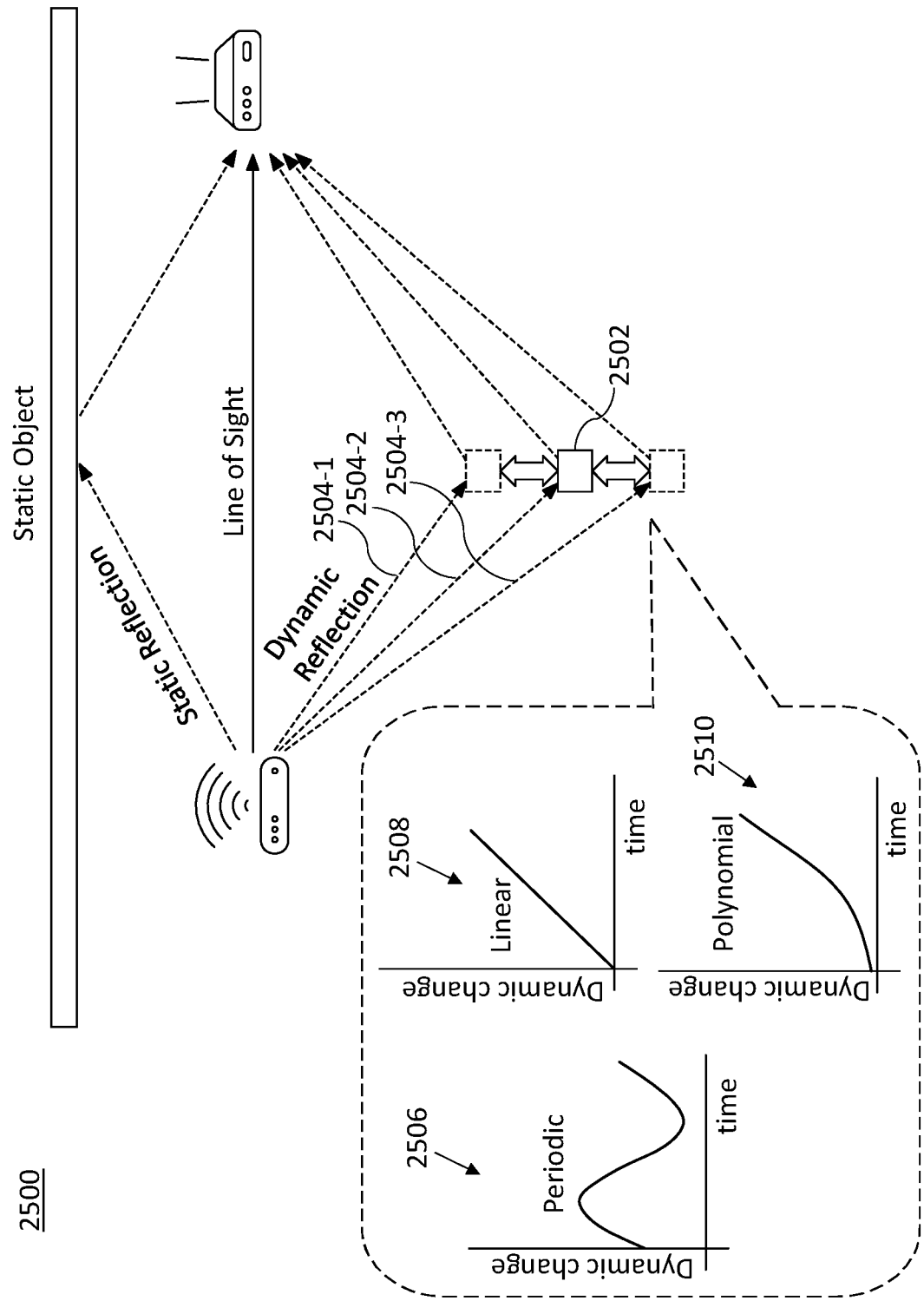
FIG. 25 depicts an illustration of three types of dynamic changes for a dynamic object, according to some embodiments.

FIG. 25 depicts illustration 2500 of three types of dynamic changes for dynamic object 2502, according to some embodiments. In illustration 2500, dynamic object 2502 may change the reflection of the sensing transmission over time. The dynamic reflection paths are represented using reference numbers 2504-1, 2504-2, and 2504-3. Also, illustration 2500 shows three types of dynamic changes and the corresponding frequency modulations or Doppler frequency that result. In illustration 2500, three examples of types of dynamic changes are shown, including periodic (represented by reference number "2506"), linear (represented by reference number "2508"), and polynomial (represented by reference number "2510").

In examples, Doppler frequency measurement may be achieved by leveraging the CSI that is calculated by the sensing receiver on a sensing transmission. In an example, the amplitude and phase of a dynamic reflection path may be analyzed for each CSI measurement relative to the line-of-sight path. The ability to do so depends on being able to determine accurately the Doppler frequency in a received reflected signal. The movement of dynamic object 2502 may be captured using and measurement of Doppler frequency through signal processing. A Doppler frequency represents changes in the frequency of a received signal caused by the motion of an object. For example, when an object moves towards a transmitted signal, then compression caused by that motion on the reflected signal results in the received frequency of the reflected transmitted signal being slightly higher than the actual transmitted frequency of the signal. If the motion of the object is away from the transmitted signal, then the expansion of the signal caused by the motion of the object results in the received frequency of the reflected transmitted signal being slightly lower than the actual transmitted frequency of the signal.

In examples, these frequency changes are the Doppler frequency that can be extracted from CSI measurements, where the Doppler frequency appears as a modulation of the frequency of the steady-state CSI that is associated with the transmission channel between the sensing transmitter and the sensing receiver.

Figure 26:
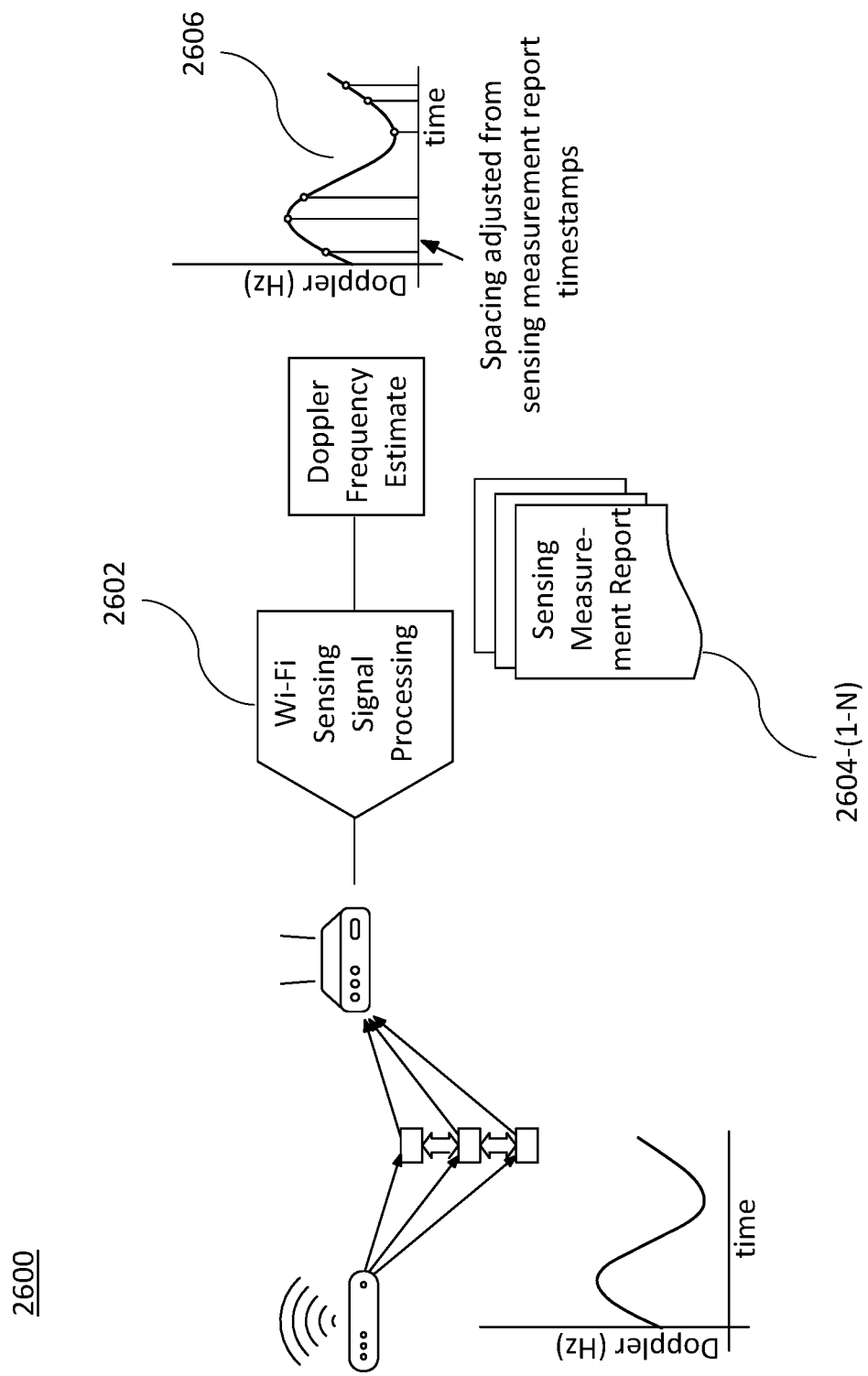
FIG. 26 depicts an illustration of accurate time axis generation using time stamped sensing measurement reports to enable Doppler measurement, according to some embodiments.

The measurement of Doppler frequency requires observation of periodic samples, which are generated from measuring a training field in a sensing transmission. The ability to generate sensing transmissions in a Wi-Fi sensing system may be unpredictable as it depends on spectrum availability (i.e., where there is also use of spectrum for data transmissions or other sensing transmissions), scheduling priorities (which may depend on the class of service of other transmissions queued in the system) and the availability of the STA to make or receive sensing transmissions. In examples, a time stamp of the sensing measurement report may be calculated at the sensing receiver to enable samples to be placed on an accurate time axis thereby allowing accurate interpretation of the varying amplitude and phase measurements as a function of time. FIG. 26 depicts illustration 2600 of accurate time axis generation using time stamped sensing measurement reports to enable Doppler measurement, according to some embodiments. In illustration 2600, sensing measurements are made periodically by Wi-Fi Sensing Signal Processing 2602 and are reported in Sensing Measurement Reports 2604-(1-N). In an example, each one of Sensing Measurement Reports 2604-(1-N) includes a time stamp which describes a time of measurement of the sensing measurements contained within. Using the time stamps, an accurate time-Doppler estimation 2606 may be created with the spacing of the sensing measurements adjusted by the time stamp.

Multiple use cases have been defined in IEEE 802.11bf, which can be used to identify velocity detection requirements for objects moving within a sensing space of the Wi-Fi system. In examples, the velocity detection requirements may be used to determine a minimum timing between sensing measurement reports required to be able to measure an object moving at that velocity. The use cases and corresponding velocities and Doppler frequency measurement requirements for different frequency bands in a Wi-Fi sensing system are described in Table 1 provided below. Velocity of motion and the accuracy of the velocity of motion is given by the use cases, and $f_D$, and accuracy of $f_D$, may be calculated by Equation (9), where $f_t$ is given by the frequency of the band in which the sensing transmissions are made,

TABLE 1

Doppler frequency and accuracy requirements corresponding to maximum velocity
and velocity accuracy requirements based on WLAN sensing use cases

| | | | 7 GHz | | 5 GHz | | 2.4 GHz | |
|---|---|---|---|---|---|---|---|---|
| Use Case | Max Velocity (m/s) | AccuRacy of Velocity (m/s) | $f_D$ (Hz) | Accuracy of $f_D$ (Hz) | $f_D$ (Hz) | Accuracy of $f_D$ (Hz) | $f_D$ (Hz) | Accuracy of $f_D$ (Hz) |
| Smart meeting room - 2.1.2 Store Sensing - 2.1.6 | 1 | 0.3 | 46.7 | 14.0 | 33.3 | 10.0 | 16.0 | 4.8 |
| Smart meeting room - 2.1.2 Store Sensing - 2.1.6 | 1 | 0.1 | 46.7 | 4.7 | 33.3 | 3.3 | 16.0 | 1.6 |
| Proximity Detection - 2.2.6 | 1.5 | 0.2 | 70.0 | 9.3 | 50.0 | 6.7 | 24.0 | 3.2 |
| Room Sensing - 2.1.1 Gesture recognition - 2.2.3 | 2 | 0.1 | 93.3 | 4.7 | 66.7 | 3.3 | 32.0 | 1.6 |
| Home Security - 2.1.4 | 3 | 0.3 | 140.0 | 14.0 | 100.0 | 10.0 | 48.0 | 1.6 |
| Home Security - 2.1.4 Home Appliance Control - 2.2.7 Tracking/presence detection - 2.3.3 | 3 | 0.1 | 140.0 | 4.7 | 100.0 | 3.3 | 48.0 | 1.6 |

From Table 1, is may be determined that a Wi-Fi sensing system should be capable of detecting velocity of an object at 3.0 m/s. This results in a Doppler frequency of 140 Hz (in the 7 GHz band). To avoid Doppler aliasing, the sampling frequency must be greater than or equal to twice the maximum Doppler frequency in a given frequency band of transmission.

According to Nyquist's sampling theorem, the Doppler frequency of the CSI must be sampled at a rate of at least twice the maximum Doppler frequency, i.e. 280 Hz, to be able to unambiguously determine the Doppler frequency. Accordingly, the interval between sensing measurements must be less than $$\frac{1}{280 \text{ Hz}} = 3.5 \text{ ms}.$$

Considering Wi-Fi sensing use cases and the velocity requirements that result from the Wi-Fi sensing use cases an accuracy requirement for a time stamp of a sensing measurement may be calculated using Equation (9). It may be shown that for the easiest use case, the velocity accuracy requirement may be met with an time stamp accuracy of 7.2 ms at 2.4 GHz. In an example, for same use case, the velocity accuracy requirement may be met with an time stamp accuracy of 2.5 ms at 7 GHz. The most stringent (hardest) use case for motion detection defined for IEEE 802.11 requires a time stamp accuracy of 115 µs, setting a maximum inter-sampling time for sensing measurements. These time stamp accuracy requirements for all use cases are described in Table 2 provided below.

TABLE 2

Minimum time stamp accuracy (which sets the minimum periodicity
of sensing measurement reports) corresponding to maximum velocity
and velocity accuracy requirements based on WLAN sensing use-cases

| Use-Case | Max. Velocity (m/s) | Accuracy of velocity (m/s) | 7 GHZ Accuracy of time stamp (s) | 5 GHZ Accuracy of time stamp (s) | 2.4 GHZ Accuracy of time stamp (s) |
|---|---|---|---|---|---|
| Smart meeting room-2.1.2 Store Sensing-2.1.6 | 1 | 0.3 | 2.5E–3 | 3.5E–3 | 7.2E–3 |
| Smart meeting room-2.1.2 Store Sensing-2.1.6 | 1 | 0.1 | 974.0E–6 | 1.4E–3 | 2.8E–3 |
| Proximity Detection-2.2.6 | 1.5 | 0.2 | 840.3E–6 | 1.2E–3 | 2.5E–3 |
| Room Sensing-2.1.1 Gesture recognition-2.2.3 | 2 | 0.1 | 255.1E–6 | 357.1E–6 | 744.0E–6 |
| Home Security-2.1.4 | 3 | 0.3 | 324.7E–6 | 454.5E–6 | 947.0E–6 |
| Home Security-2.1.4 Home Appliance Control-2.2.7 Tracking/presence detection-2.3.3 | 3 | 0.1 | 115.2E–6 | 161.3E–6 | 336.0E–6 |

Examples by which motion is detected in a sensing space based on fast sounding and slow sounding are described in detail below.

Referring back to FIG. 5, in an implementation, sensing receiver 502-1 (acting as a sensing responder) may be configured to transmit a sensing trigger message to sensing transmitter 504-1. According to an implementation, sensing agent 516-1 of sensing receiver 502-1 may be configured to transmit the sensing trigger message to sensing transmitter 504-1. In an example, the sensing trigger message may be a sensing sounding trigger frame. In examples, the sensing trigger message may include information about a plurality of fast sounding sensing signals to be transmitted. In an implementation, sensing agent 516-1 may identify a predefined number of fast sounding sensing signals to be received in a transmission opportunity (TXOP). In an example, the predefined number of fast sounding sensing signals to be received may be signaled by the sensing trigger message.

According to an implementation, in response to receiving the sensing trigger message, sensing agent 536-1 of sensing transmitter 504-1 may be configured to transmit the plurality of fast sounding sensing signals to sensing receiver 502-1. In an example, sensing agent 536-1 may transmit the plurality of fast sounding sensing signals as a series of sensing transmissions transmitted one short interframe space (SIFS) apart from one another. In an example, sensing agent 536-1 may transmit multiple sensing transmissions (for example, sensing NDPs) one SIFS apart in response to the sensing trigger message.

In some implementations, sensing agent 536-1 may transmit the plurality of fast sounding sensing signals within a sensing transmission. In an example, the plurality of fast sounding sensing signals may include a predefined number of high efficiency long training fields (HE-LTFs).

In an implementation, sensing agent 516-1 may be configured to receive the plurality of fast sounding sensing signals transmitted by sensing transmitter 504-1 in response to the sensing trigger message. In examples, sensing agent 516-1 may receive the plurality of fast sounding sensing signals in a single TXOP. According to an implementation, sensing agent 516-1 may receive the plurality of fast sounding sensing signals as a series of sensing transmissions transmitted one SIFS apart from one another. In another implementation, sensing agent 516-1 may receive the plurality of fast sounding sensing signals within a sensing transmission. In an example implementation, sensing agent 516-1 may receive the plurality of fast sounding sensing signals at a rate configured to sense an object moving at at least a threshold speed within a channel of the plurality of fast sounding sensing signals without aliasing. In an example, sensing agent 516-1 may receive the plurality of fast sounding sensing signals at an average rate of at least 280 Hz. In an example, the threshold speed may be 3.0 m/s.

In some implementations, sensing agent 516-1 may transmit a plurality of sensing trigger messages including the sensing trigger message to sensing transmitter 504-1. In response to the plurality of sensing trigger messages including the sensing trigger message, sensing agent 536-1 may transmit a plurality of fast sounding sensing signals in response to respective ones of the plurality of sensing trigger messages. In an example, the plurality of fast sounding sensing signals include a plurality of sensing transmissions, each including at least one HE-LTF. In an example, sensing agent 536-1 may transmit one or more sensing transmissions (for example, sensing NDPs) that utilize HE-LTF repetition, resulting in up to 8 sensing measurement opportunities for each sensing transmission (explained later). In an implementation, sensing agent 516-1 may receive the plurality of fast sounding sensing signals transmitted in response to respective ones of the plurality of sensing trigger messages.

According to an implementation, sensing agent 516-1 may be configured to perform a plurality of sensing measurements (also referred to as first plurality of sensing measurements) on the plurality of fast sounding sensing signals. In examples, the plurality of sensing measurements include measurements of Doppler frequency associated with motion of an object in a sensing space. In an implementation, timestamp generation block 524-1 may be configured to determine or generate time stamps for sensing measurements performed on the plurality of fast sounding sensing signals. Examples by which time stamps may be generated that are not discussed here are contemplated herein. In an implementation, sensing agent 516-1 may associate the plurality of time stamps with one or more sensing measurements performed on one or more of the plurality of fast sound sensing signals.

In an example, the process of transmitting, by sensing receiver 502-1, the sensing trigger message and the process of receiving, by sensing receiver 502-1, the plurality of fast sounding sensing signals as the series of sensing transmissions transmitted by sensing transmitter 504-1 in response to the sensing trigger message may be referred to as a single trigger multiple transmission sounding process. According to the single trigger multiple transmission sounding process, a single trigger message may be used to trigger multiple sensing transmissions per availability window.

Figure 27:
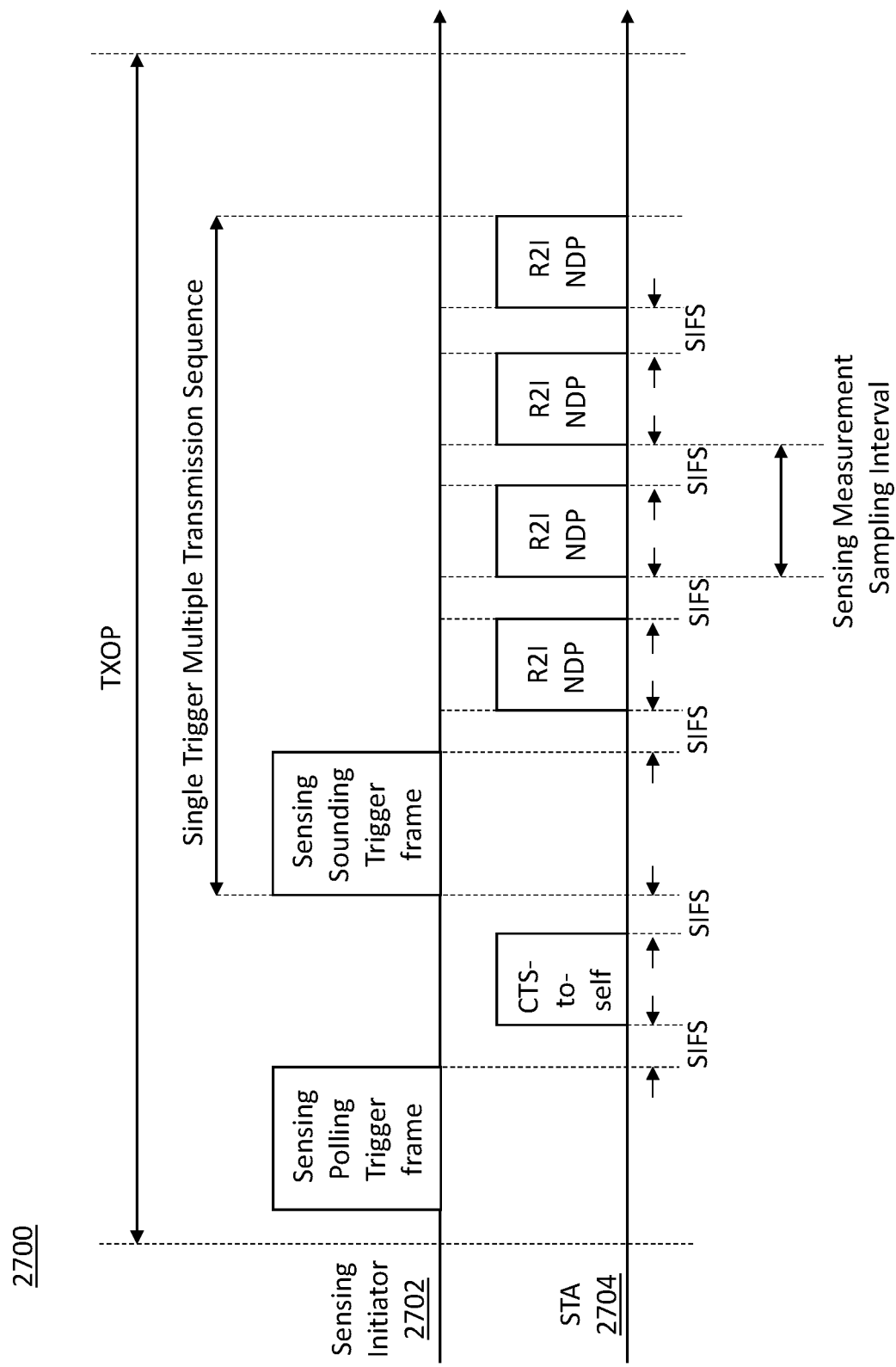
FIG. 27 depicts an illustration of a single trigger multiple transmission sounding process in a transmission opportunity (TXOP), according to some embodiments.

FIG. 27 depicts illustration 2700 of a single trigger multiple transmission sounding process in a TXOP, according to some embodiments.

In illustration 2700, following an exchange of sensing polling trigger frame and CTS-to-self, sensing initiator 2702 may transmit a sensing trigger message (sensing sounding trigger frame) to STA 2704. Sensing Initiator 2702 may be an example of sensing receiver 502-1 and STA 2704 may be an example of sensing transmitter 504-1. In an implementation, in response to the sensing trigger message, STA 2704 may transmit multiple sensing transmissions (for example, sensing NDPs or R2I NDPs) one SIFS apart from one another in a TXOP. In examples, the time between fast sounding instances for single trigger multiple transmissions is the time duration of a SIFS and the time duration of R2I NDP (also referred to as R2I HE TB sounding NDP). In an example, the time between fast sounding instances for single trigger multiple transmissions is expressed using Equation (11) provided below.

$$T_{STMT} = \text{SIFS} + T_{R21} \tag{11}$$

where, $T_{STMT}$ represents the time between fast sounding instances for single trigger multiple transmissions, and $T_{R21}$ represents the time duration of R2I NDP.

In an example, the SIFS may be 10 µs long and the R2I NDP may be approximately 72 µs long (as shown in FIG. 21) giving a time between sensing measurements of 82 µs which corresponds to a measurement bandwidth of 12.2 kHz. This is less than the maximum inter-sampling period for sensing measurements (i.e., less than 115 µs). As a result, this example allows the measurement of an object moving at a velocity V=261 m/s as follows:

$$V = \frac{12195 \text{ Hz} \times 300 \times 10^6 \text{ m/s}}{2 \times 7.0 \times 10^9 \text{ Hz}} = 261 \text{ m/s}$$

In examples, this detection capability far exceeds the use case requirements for Wi-Fi sensing, however, provides the ability to oversample the signal and improve detection SNR.

According to some implementations, single trigger multiple transmissions may be performed without the need for a sensing measurement report time stamp as sensing transmitter 504-1 may transmit each NDP exactly one SIFS apart, and sensing receiver 502-1 may use this information to build an accurate time representation of the amplitude and phase variations to determine the Doppler frequency.

In examples, a sensing sounding trigger frame may be defined which solicits multiple sensing transmissions per availability window. In an example, the sensing sounding trigger frame may be a variant of the Trigger frame described in FIG. 15A to FIG. 15H. In some examples, the sensing sounding trigger frame may be identified as a variant of a Ranging Trigger frame and a Trigger Type subfield value may be 8. In some other examples, a new type of Trigger frame may be defined. For example, a sensing sounding trigger frame may be defined as a Trigger Type of "Sensing" and may be allocated the Trigger Type subfield value of 9.

As described earlier, sensing agent 516-1 may identify the number of multiple sensing transmissions (fast sounding sensing signals) per availability window. In an implementation, the number of multiple sensing transmissions may be signaled by the sensing sounding trigger frame. In an example, the number of multiple sensing transmissions per availability window may be carried by Trigger Dependent Common Info (as shown in FIG. 15A).

Figure 28:
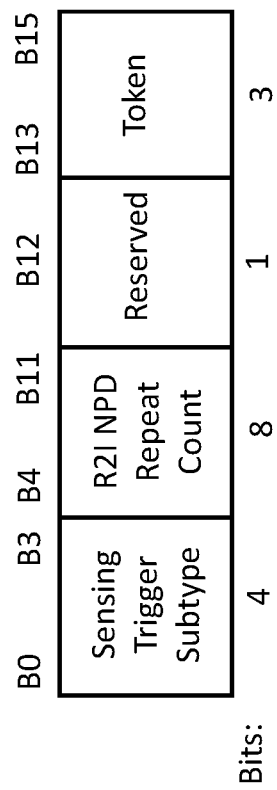
FIG. 28 shows an example of a Trigger Dependent Common Info subfield for a sensing trigger message (sensing sounding trigger frame), according to some embodiments.

FIG. 28 shows example 2800 of a Trigger Dependent Common Info subfield for a sensing trigger message (sensing sounding trigger frame), according to some embodiments.

In examples, the number of multiple sensing transmissions per availability window may be carried by R2I NDP Repeat Count and may be encoded as an unsigned integer value. In an example, a value of 0 may mean that multiple sensing transmissions per availability window is disabled. A value of 1 . . . 255 may mean that multiple sensing transmissions per availability window is enabled. A value between 1 and 255 may mean that R2I NDPs may be sent in the availability window. The value of Sensing Trigger Subtype may be given by Table 3 provided below and a sensing sounding trigger frame may be a Sensing Trigger Subtype of 1.

TABLE 3

Sensing Trigger Subtype subfield encoding

| Sensing Trigger Subtype subfield value | Sensing Trigger frame subvariant |
| --- | --- |
| 0 | Poll |
| 1 | Sounding |
| 2 | Secure Sounding |
| 3 | Report |
| 4 | Passive Sounding |
| 5-15 | Reserved |

In some examples, Sensing Trigger Subtype may be a combined Ranging/Sensing Trigger Subtype and the sensing sounding trigger frame may be identified between variants of both ranging and Sensing Trigger message types. In an example, the Token may be reserved for other Sensing Trigger message subtypes which share a common format.

Figure 29:
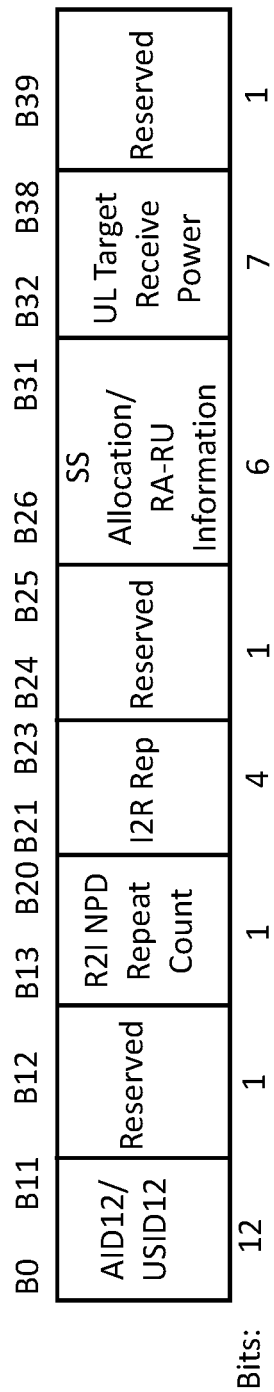
FIG. 29 depicts an example of a User Info field of a sensing sounding trigger frame, according to some embodiments.

In some examples, the number of multiple sensing transmissions per availability window may be defined per sensing responder (which is an example of sensing receiver 502-1) addressed by the Trigger frame. In these examples, the number of multiple sensing transmissions per availability window may be carried by the User Info field of the Trigger frame. Example 2900 of a User Info field of a sensing sounding trigger frame is depicted by FIG. 29. In an example, the station to which the User Info is directed may be described by an association ID (AID12) or by an unassociated station ID (USID12). The number of multiple sensing transmissions per availability window may be carried by R2I NDP Repeat Count and may be encoded as described previously.

In an implementation, a sensing measurement may be made on the LTF in an NDP. The HE-LTF may be repeated up to 8 times in a single NDP packet, such as an HE Ranging NDP. As shown in FIG. 20 and FIG. 21, the duration of an HE-LTF (with four symbols per HE-LTF) is two 16 µs symbols or 32 µs. Further, the duration of an HE-LTF (with two symbols per HE-LTF) is two 8 µs symbols or 16 µs. In examples, up to 8 sensing measurements may be made on a single NDP by replicating the HE-LTF field (and the symbols used to transmit them) up to eight times.

In examples, for 32 µs interval between sensing measurements, the measurement bandwidth is 31.25 kHz. This theoretically allows the measurement of an object moving at a velocity of 670 m/s as follows:

$$V = \frac{31250 \text{ Hz} \times 300 \times 10^6 \text{ m/s}}{2 \times 7.0 \times 10^9 \text{ Hz}} = 670 \text{ m/s}$$

In an example, this detection capability far exceeds the use case requirements for Wi-Fi sensing, however, provides the ability to oversample the signal and improve detection SNR.

In an implementation, HE-LTF repetition sounding may be performed without the need for a sensing measurement report time stamp as the spacing in time between the HE-LTF in the NDP is deterministic, and sensing receiver 502-1 may use this information to build an accurate time representation of the amplitude and phase variations to determine the Doppler frequency.

As described earlier, the sensing sounding trigger frame may solicit repeated LTF in a single NDP packet. In an example, the number of repeated LTF in the single NDP packet may be represented by I2R Rep in User Info field (as shown in FIG. 29). In an example, I2R Rep is a 3-bit value and may represent the number of LTF repetitions minus 1.

Further, as described previously, the SNR of the Doppler frequency measurements may be low, therefore there is a need to coherently combine multiple determinations of the Doppler frequency to increase the overall SNR of the determination. This can be done by repeating fast sounding technique periodically using slow sounding. This is referred to as fast-slow sounding technique.

According to an implementation, sensing agent 516-1 may transmit a regular sensing sounding trigger frame to sensing transmitter 504-1. In an example, the sensing sounding trigger frame may include information about a plurality of slow sounding sensing signals to be transmitted. In an implementation, in response to the sensing sounding trigger frame, sensing agent 536-1 may transmit the plurality of slow sounding sensing signals.

In an implementation, (and as shown by FIG. 24) sensing agent 516-1 may receive the plurality of slow sounding sensing signals transmitted by sensing transmitter 504-1. In an example, sensing agent 516-1 may receive the plurality of slow sounding sensing signals in one or more availability windows. In examples, at least one of the plurality of fast sounding sensing signals is included in at least one of the plurality of slow sounding sensing signals. In an example, at least one of the plurality of slow sounding sensing signals is transmitted in response to the sensing sounding trigger frame at most once per availability window.

In an example, the time duration of an availability window may be 10 TU (where each TU is 1024 μs). Therefore, sounding according to the availability window may take place at a time interval of approximately 10 ms or greater, resulting in an effective measurement bandwidth of 50 Hz or less. As described earlier, system issues such as spectrum availability, higher priority services, and STA availability may mean that a sensing transmission may be achieved in a subset of availability windows. A sensing measurement report time stamp may be used to build an accurate time representation of the spacing of the slow sounding instances.

Figure 30:
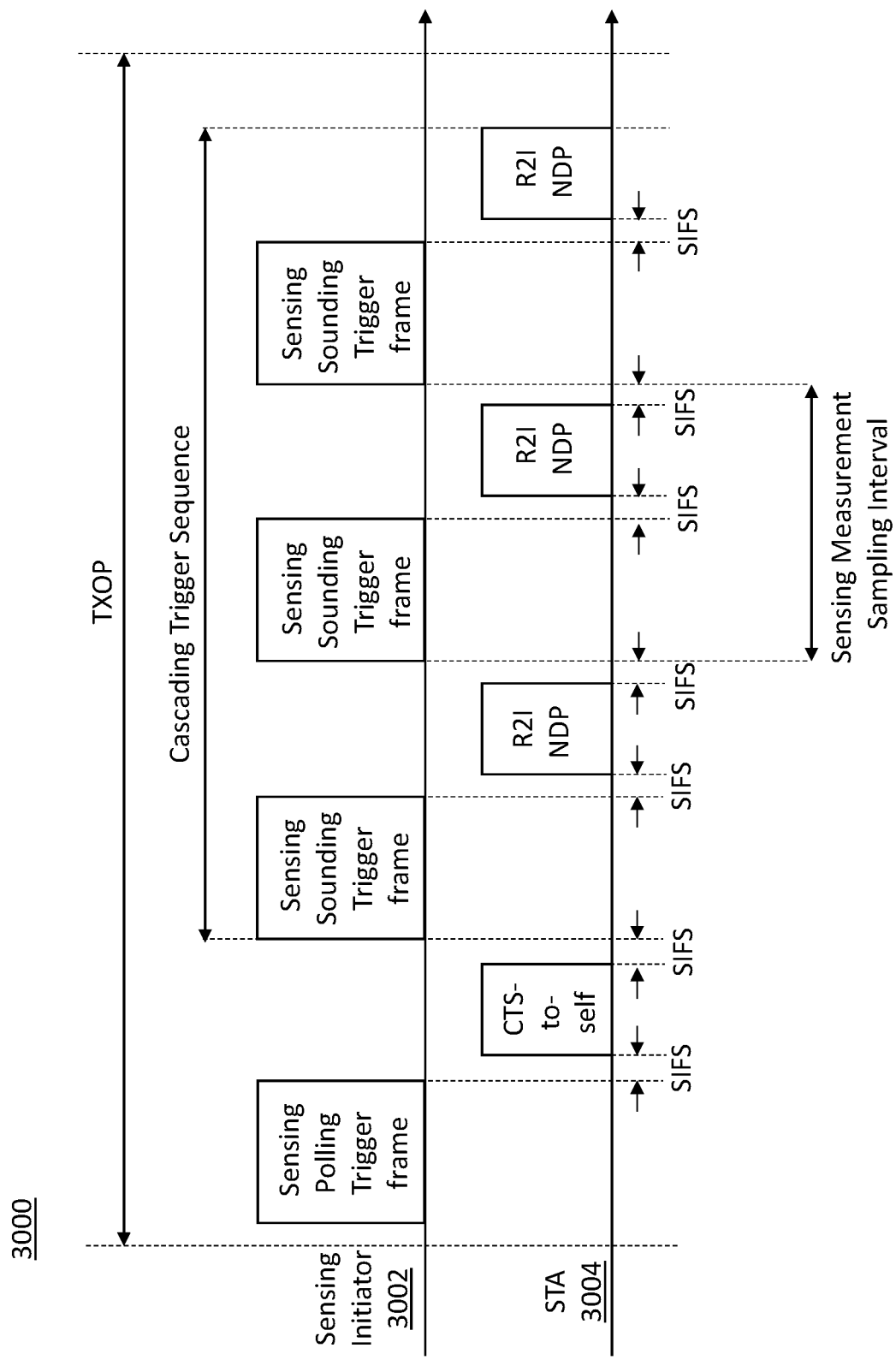
FIG. 30 depicts an illustration of a cascading trigger sounding process in a TXOP, according to some embodiments.

FIG. 30 depicts illustration 3000 of a cascading trigger sounding process in a TXOP, according to some embodiments.

In illustration 3000, following an exchange of sensing polling trigger frame and CTS-to-self, a cascading trigger sequence may be used to trigger multiple sensing transmissions per availability window. Sensing initiator 3002 may transmit a plurality of sensing trigger messages (e.g., sensing sounding trigger frames) to STA 3004. Sensing initiator 3002 may be an example of sensing receiver 502-1 and STA 3004 may be an example of sensing transmitter 504-1. In examples, the plurality of sensing trigger messages may trigger multiple sensing transmissions in the same TXOP. In an implementation, in response to the plurality of sensing trigger messages, STA 3004 may transmit multiple sensing transmissions. In examples, the time between slow sounding instances for cascading trigger sounding is the time duration of the sensing sounding trigger frame plus two SIFS and the time duration of R2I NDP. In an example, the time between slow sounding instances for cascading trigger sounding is mathematically expressed using Equation (12) provided below.

$$T_{CASC} = T_{TF} + \text{SIFS} + T_{R2I} + \text{SIFS} \quad (12)$$

where, $T_{CASC}$ represents the time between slow sounding instances for cascading trigger sounding, $T_{TF}$ represents time duration of the sensing sounding trigger frame, and $T_{R2I}$ represents the time duration of R2I NDP.

In examples, a Trigger frame includes a data payload within the PPDU which increases the time duration of the frame. The data payload of the sensing sounding trigger frame (Trigger frame) may be variable. However, for a calculation purpose, the data payload of the sensing sounding trigger frame may be assumed to be approximately 33 octets (bytes) based upon the definition of a ranging Trigger frame given by P802.11az/D4.2 (without padding). With coding, the data may be carried by 36 octets. Assuming that a conservative modulation scheme carries 8 bits per symbol (e.g., 256-QAM), then 36 octets equate to 36 symbols. The duration of an HE symbol (HE is the only PHY which supports a Trigger frame) is 16 ms (worst case with a guard interval of 3.2 ms) and so the time to transmit the data payload in the Trigger frame may be assumed to be 36×16 ms (i.e., 576 ms). Further, assuming that an HE SU PPDU carries the data payload, then the PHY-layer structure requires approximately 72 ms to transmit. Accordingly, the total time to transmit the sensing sounding trigger frame ($T_{TF}$) may be approximately 648 ms. Then the total time between sensing transmissions for a cascading trigger sounding process may be given by $T_{CASC}$, where $$T_{CASC} = T_{TF} + \text{SIFS} + T_{R2I} + \text{SIFS}$$
$$= 648 + 10 + 72 + 10$$
$$= 740 \text{ μs}$$

According to an implementation, any sensing sounding trigger frame which triggers a fast sounding sensing signal may be used as the cascading trigger sequence. In some examples, the number of remaining sensing sounding trigger frames in the TXOP may be signaled by each sensing sounding trigger frame. The number of remaining sensing sounding trigger frames may be on a per-station basis and may be signaled in User Info or the number of remaining sensing sounding trigger frames may assume that a common set of STAs are targeted by the sensing sounding trigger frame and the number of remaining sensing sounding trigger frames may be signaled by Trigger Dependent Common Info. In examples, this information may be contained in a sensing session setup configuration or a sensing measurement setup configuration, and may apply to all STAs that are using the sensing session setup or sensing measurement setup for a sensing measurement instance.

According to an example, ten sensing sounding trigger frames are to be transferred by a cascaded trigger sequence to a common set of STAs. In this example, number of remaining sensing sounding trigger frames signaled in the first sensing sounding trigger frame will be nine, and it may be signaled by Trigger Dependent Common Info. Subsequently, the number of remaining sensing sounding trigger frames signaled in the second sensing sounding trigger frame will be eight, and finally, the number of remaining sensing sounding trigger frames signaled in the tenth sensing sounding trigger frame will be zero.

According to an implementation, sensing agent 516-1 may perform a plurality of sensing measurements (also referred to as second plurality of sensing measurements) on the plurality of slow sounding sensing signals received from sensing transmitter 504-1. In an implementation, sensing agent 516-1 may detect motion in the sensing space based on the first plurality of sensing measurements performed on the plurality of fast sounding sensing signals and the second plurality of sensing measurements performed on the plurality of slow sounding sensing signals. According to some implementations, timestamp generation block 524-1 may be configured to determine or generate time stamps for sensing measurements performed on the plurality of slow sounding sensing signals. Examples by which time stamps may be generated that are not discussed here are contemplated herein. In an implementation, sensing agent 516-1 may associate a time stamp with one or more sensing measurements performed on one or more of the plurality of slow sounding sensing signals.

According to some implementations, sensing agent 516-1 may be configured to transmit the first plurality of sensing measurements (performed on the plurality of fast sounding sensing signals) and associated time stamps to a sensing initiator for further processing. Further, sensing agent 516-1 may also transmit the second plurality of sensing measurements (performed on the plurality of slow sounding sensing signals) and associated time stamps to the sensing initiator for further processing. In an implementation, sensing agent 516-1 may process the first plurality of sensing measurements and the second plurality of sensing measurements to detect motion in the sensing space. In examples, the sensing initiator may be remote processing device 506.

Figure 31:
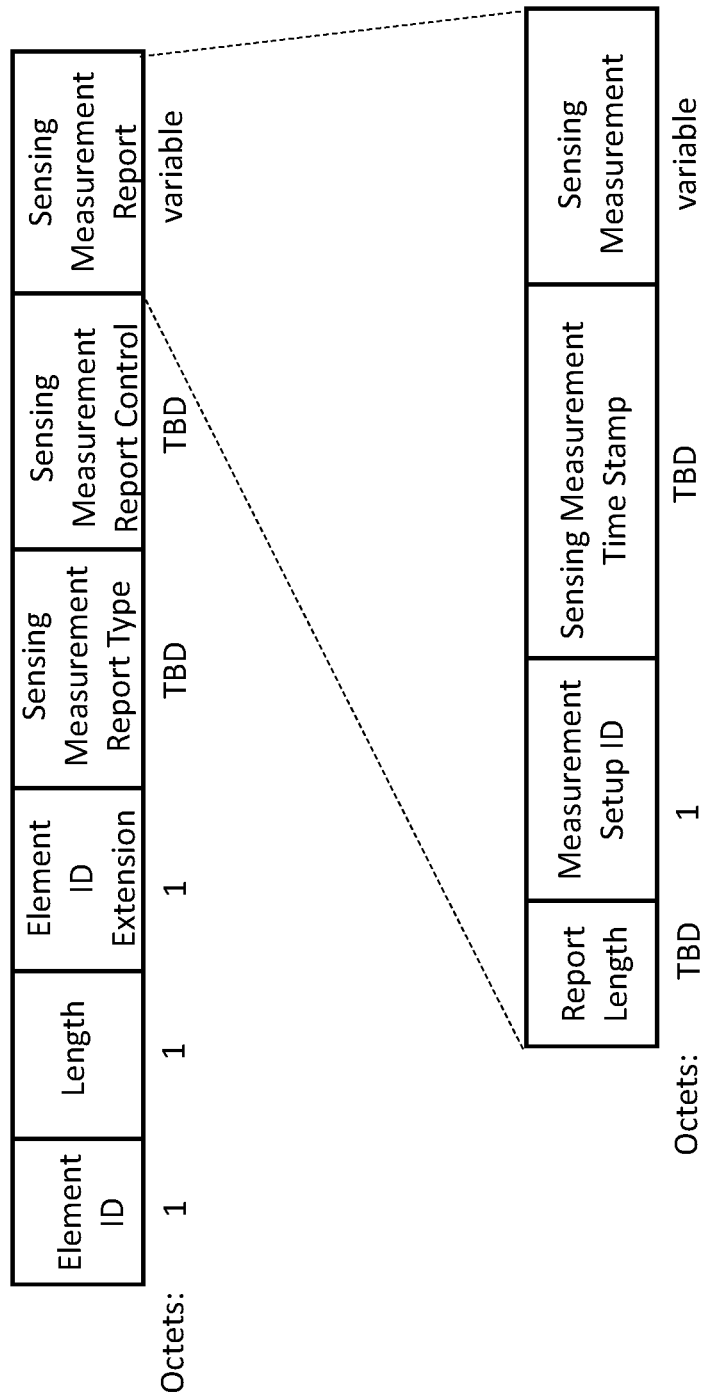
FIG. 31 depicts an example of a Sensing Measurement Report element including a provision for time stamp, according to some embodiments.

In an implementation, a sensing measurement including a time stamp may be transferred by a sensing measurement report. In examples, the sensing measurement report may be implemented by a Sensing Measurement Report frame. In an example, the Sensing Measurement Report frame may include a Sensing Measurement Report element or a Sensing Measurement Report field, and the Sensing Measurement Report element or a Sensing Measurement Report field may, in turn, include a time stamp. In an example, the Sensing Measurement Report element as defined by P802.11bf/D0.2 may be adapted to carry the time stamp. FIG. 31 depicts example 3100 of a Sensing Measurement Report element including a provision for time stamp, according to some embodiments. The Sensing Measurement Report element may include a single sensing measurement report. The Sensing Measurement Report element may be included in the Sensing Measurement Report frame. The Sensing Measurement Report Type field may be set to a number that identifies the type of sensing measurement report.

Figure 32:
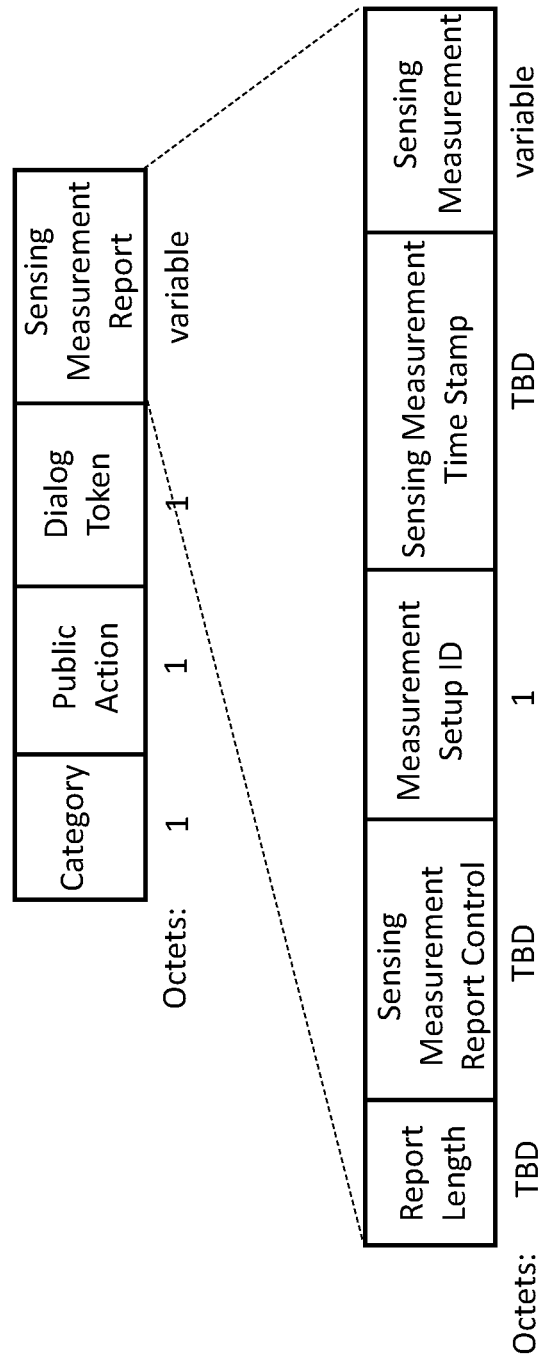
FIG. 32 depicts an example of a Sensing Measurement Report frame implemented as a field and including a provision for time stamp, according to some embodiments.

In some examples, the Sensing Measurement Report may be implemented by a field. FIG. 32 depicts example 3200 of a Sensing Measurement Report frame implemented as a field and including a provision for time stamp. In this example, the Sensing Measurement Report Type may be carried as part of Sensing Measurement Report Control.

As previously described, in each slow sounding instance, a fast sounding technique may be used. In an example, each sensing sounding trigger frame may request sensing transmitter 504-1 to use an HE-LTF repetition fast sounding technique and in another example each sensing sounding trigger frame may request sensing transmitter 504-1 to use a single trigger multiple transmission sounding process, thus enabling the sensing initiator to obtain a cluster of sensing transmissions for unambiguous Doppler frequency determination within each availability window. In some examples, when the cascading trigger sequence sounding technique is used, each triggered sensing transmission in the TXOP may use an HE-LTF repetition fast sounding technique, thereby enabling the sensing initiator to obtain several fast sounding sensing measurements in each TXOP.

According to some embodiments, the sensing initiator may obtain fast sounding from multiple STAs. In an example, the multiple STAs may include one or more of plurality of sensing transmitters 504-(1-N). In examples, the sensing initiator may use a fast-slow sounding technique to trigger a different STA to perform fast sounding in each slow sounding measurement opportunity. In examples, the sensing initiator may require greater than eight (8) sounding sensing measurements from a single STA. As each HE-LTF repetition can provide at most eight (8) sensing measurements per NDP, the sensing initiator may use a fast-slow sounding technique to trigger the same STA to perform fast sounding in each slow sounding measurement opportunity. According to an example, if the sensing initiator wants to perform fast sounding with STA A, STA B, and STA C (for example, sensing transmitter 504-1, sensing transmitter 504-2, and sensing transmitter 504-3), then the sensing initiator may use a fast-slow sounding technique to trigger the STA A, STA B, and STA C to perform fast sounding in an interleaved sequence across the slow sounding measurement opportunities. In an example, the interleaved sequence may be "A, A, A, B, B, B, C, C, C". Accordingly, STA A may be assigned to first, second, and third slow sounding opportunities. Further, STA B may be assigned to fourth, fifth, and sixth slow sounding opportunities, and so on. Another example of the interleaved sequence may be "A, B, C, A, B, C, A, B, C". By using the fast-slow sounding technique on multiple STAs, the sensing initiator may be enabled to determine Doppler frequencies on multiple sensing transmissions.

FIG. 33 depicts flowchart 3300 for performing a plurality of sensing measurements on a plurality of fast sounding sensing signals to detect motion in a sensing space, according to some embodiments. In an implementation, flowchart 3300 is carried out by a networking device configured to operate as a sensing responder (for example, sensing receiver 502-1).

In a brief overview of an implementation of flowchart 3300, at step 3302, a sensing trigger message including information about a plurality of fast sounding sensing signals to be transmitted may be transmitted. At step 3304, the plurality of fast sounding sensing signals transmitted by a sensing transmitter (for example, sensing transmitter 504-1) in response to the sensing trigger message may be received. In an example, the plurality of fast sounding sensing signals may be received in a transmission opportunity (TXOP). At step 3306, a plurality of sensing measurements may be performed on the plurality of fast sounding sensing signals. In examples, the plurality of sensing measurements may include measurements of Doppler frequency information associated with motion in a sensing space.

Step 3302 includes transmitting a sensing trigger message including information about a plurality of fast sounding sensing signals to be transmitted. According to an implementation, sensing receiver 502-1 may be configured to transmit the sensing trigger message, including information about the plurality of fast sounding sensing signals to be transmitted, to sensing transmitter 504-1. In an example, the sensing trigger message may be a sensing sounding trigger frame. In some implementations, sensing receiver 502-1 may identify, from the sensing trigger message, a predefined number of fast sounding sensing signals to be received within the TXOP.

Step 3304 includes receiving the plurality of fast sounding sensing signals transmitted by a sensing transmitter in response to the sensing trigger message, the plurality of fast sounding sensing signals being received in a TXOP. According to an implementation, sensing receiver 502-1 may be configured to receive the plurality of fast sounding sensing signals transmitted by sensing transmitter 504-1 in response to the sensing trigger message. In an example, the plurality of fast sounding sensing signals may be received in the TXOP. In examples, sensing receiver 502-1 may receive the plurality of fast sounding sensing signals as a series of sensing transmissions transmitted one short interframe space (SIFS) apart from one another. In some implementations, sensing receiver 502-1 may receive the plurality of fast sounding sensing signals as a plurality of frames within a sensing transmission. In an example, the plurality of frames includes a predefined number of high efficiency long training fields. In some embodiments, sensing receiver 502-1 may transmit a plurality of sensing trigger messages including the sensing trigger message to sensing transmitter 504-1. Further, sensing receiver 502-1 may receive the plurality of fast sounding sensing signals transmitted by sensing transmitter 502-1 in response to respective ones of the plurality of sensing trigger messages. In examples, the plurality of fast sounding sensing signals may include a plurality of sensing transmissions, each including at least one high efficiency long training field (HE-LTF). Further, in examples, sensing receiver 502-1 may receive the plurality of fast sounding sensing signals at a rate configured to sense an object moving at at least a threshold speed within a channel of the plurality of fast sounding sensing signals without aliasing. In an example, the threshold speed may be 3.0 m/s. Further, in an example, sensing receiver 502-1 may receive the plurality of fast sounding sensing signals at an average rate of at least 280 Hz.

Step 3306 includes performing a plurality of sensing measurements on the plurality of fast sounding sensing signals, where the plurality of sensing measurements include measurements of Doppler frequency information associated with motion in a sensing space. According to an implementation, sensing receiver 502-1 may be configured to perform the plurality of sensing measurements on the plurality of fast sounding sensing signals, where the plurality of sensing measurements include measurements of Doppler frequency information associated with motion in the sensing space. In an implementation, sensing receiver 502-1 may associate a plurality of time stamps with one or more sensing measurements performed on one or more of the plurality of fast sounding sensing signals.

Figure 34A:
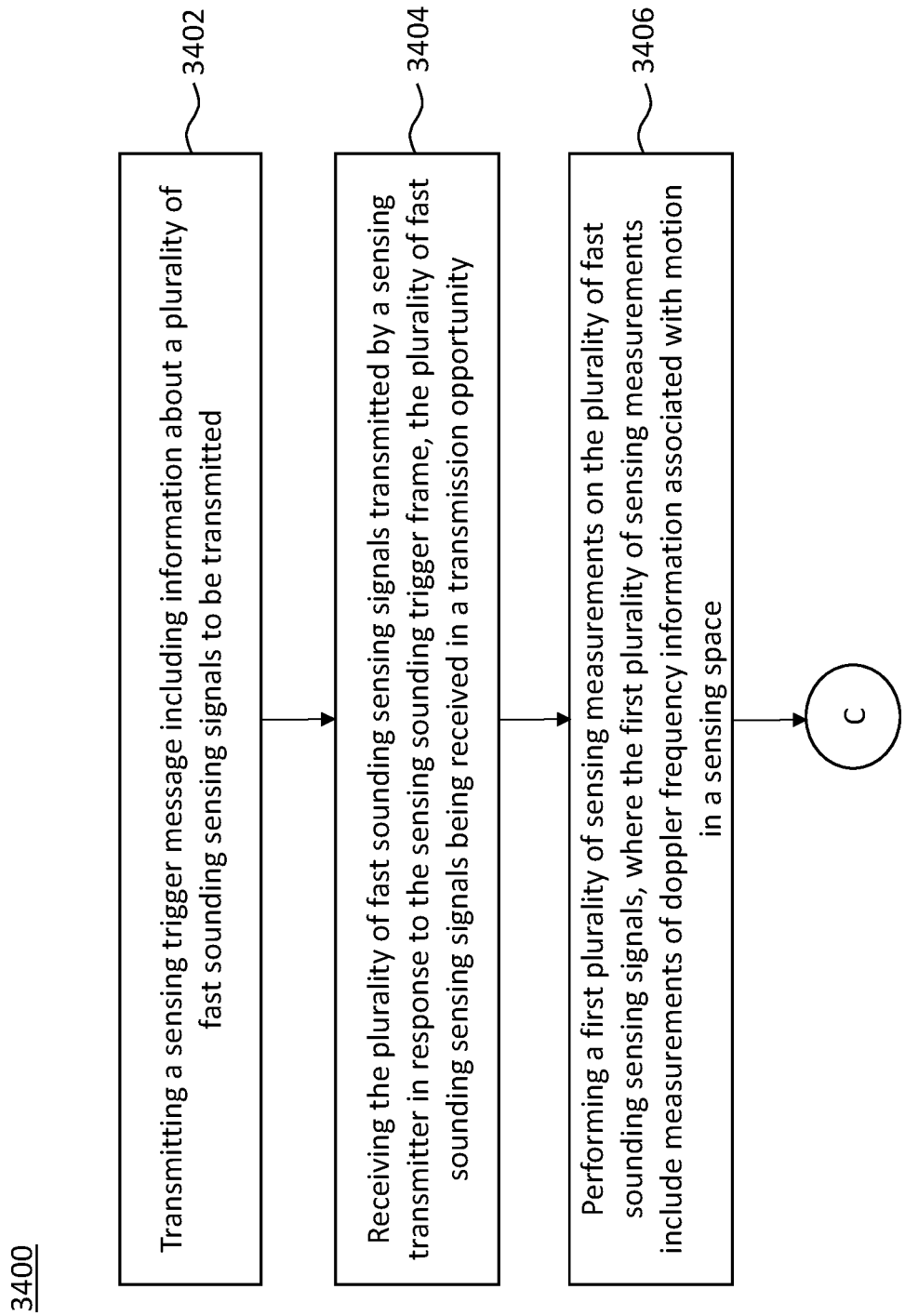
FIG. 34A and FIG. 34B depict a flowchart for performing a first plurality of sensing measurements and a second plurality of sensing measurements on a plurality of fast sounding sensing signals and a plurality of slow sounding sensing signals, respectively, to detect motion in a sensing space, according to some embodiments.
Figure 34B:
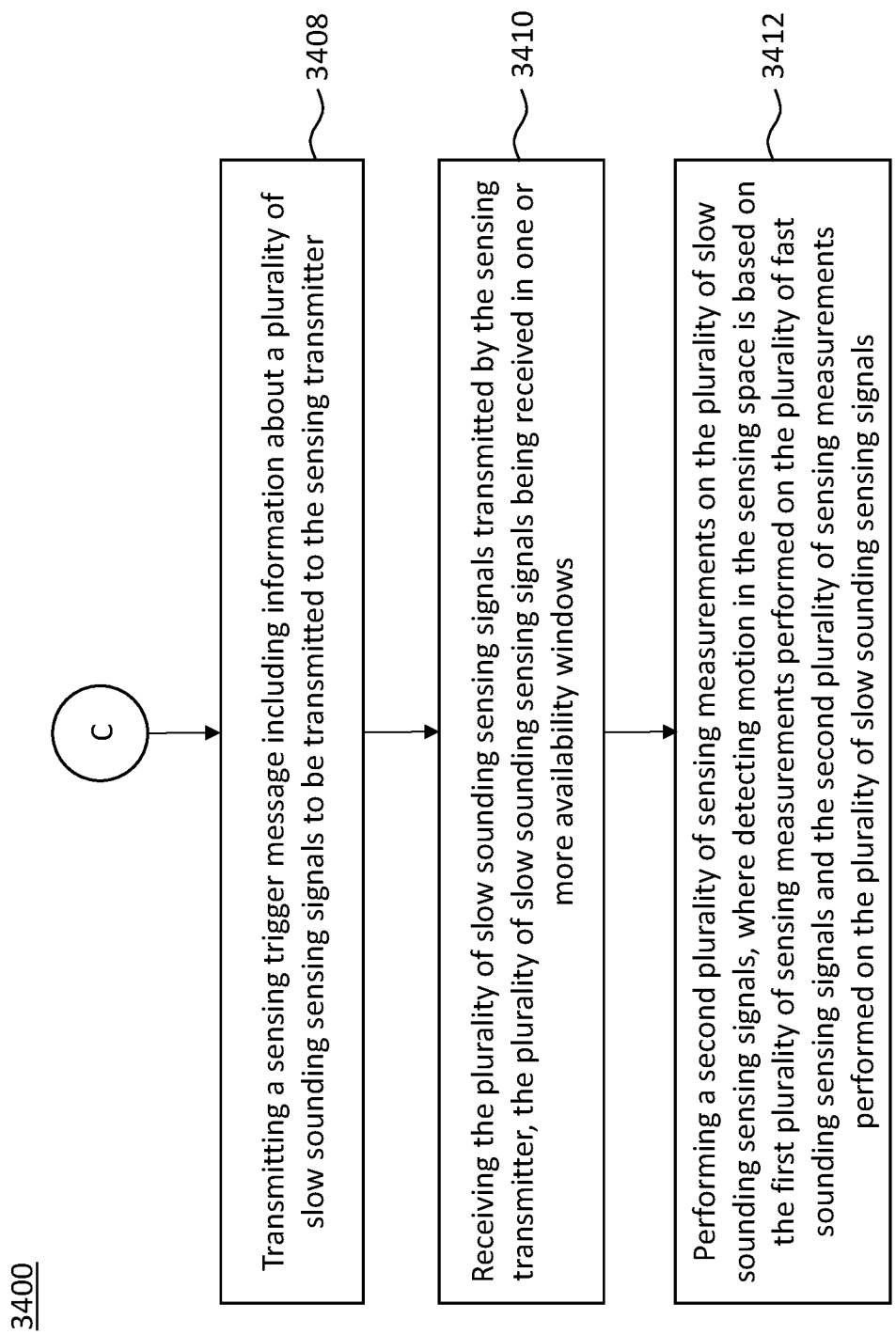

FIG. 34A and FIG. 34B depict flowchart 3400 for performing a first plurality of sensing measurements and a second plurality of sensing measurements on a plurality of fast sounding sensing signals and a plurality of slow sounding sensing signals, respectively, to detect motion in a sensing space, according to some embodiments. In an implementation, flowchart 3400 is carried out by a networking device configured to operate as a sensing responder (for example, sensing receiver 502-1).

In a brief overview of an implementation of flowchart 3400, at step 3402, a sensing trigger message including information about a plurality of fast sounding sensing signals to be transmitted may be transmitted. At step 3404, the plurality of fast sounding sensing signals transmitted by a sensing transmitter (for example, sensing transmitter 504-1) in response to the sensing trigger message may be received. In an example, the plurality of fast sounding sensing signals may be received in a transmission opportunity (TXOP). At step 3406, a first plurality of sensing measurements may be performed on the plurality of fast sounding sensing signals. In examples, the first plurality of sensing measurements may include measurements of Doppler frequency information associated with motion in a sensing space. At step 3408, a sensing sounding trigger frame including information about a plurality of slow sounding sensing signals to be transmitted may be transmitted to the sensing transmitter. At step 3410, a plurality of slow sounding sensing signals transmitted by the sensing transmitter in response to the sensing sounding trigger frame may be received. In an example, the plurality of slow sounding sensing signals may be received in one or more availability windows. At step 3412, a second plurality of sensing measurements may be performed on the plurality of slow sounding sensing signals. In an example, detecting motion in the sensing space may be based on the first plurality of sensing measurements performed on the plurality of fast sounding sensing signals and the second plurality of sensing measurements performed on the plurality of slow sounding sensing signals.

Step 3402 includes transmitting a sensing trigger message including information about a plurality of fast sounding sensing signals to be transmitted. According to an implementation, sensing receiver 502-1 may be configured to transmit the sensing sounding trigger frame, including information about the plurality of fast sounding sensing signals to be transmitted, to sensing transmitter 504-1.

Step 3404 includes receiving the plurality of fast sounding sensing signals transmitted by a sensing transmitter in response to the sensing trigger message, the plurality of fast sounding sensing signals being received in a TXOP. According to an implementation, sensing receiver 502-1 may be configured to receive the plurality of fast sounding sensing signals transmitted by sensing transmitter 504-1 in response to the sensing trigger message.

Step 3406 includes performing a first plurality of sensing measurements on the plurality of fast sounding sensing signals, where the first plurality of sensing measurements include measurements of Doppler frequency information associated with motion in a sensing space. According to an implementation, sensing receiver 502-1 may be configured to perform the first plurality of sensing measurements on the plurality of fast sounding sensing signals, where the first plurality of sensing measurements include measurements of Doppler frequency information associated with motion in the sensing space.

Step 3408 includes transmitting a sensing sounding trigger frame including information about a plurality of slow sounding sensing signals to be transmitted to the sensing transmitter. According to an implementation, sensing receiver 502-1 may be configured to transmit the sensing sounding trigger frame including information about the plurality of slow sounding sensing signals to be transmitted to sensing transmitter 504-1.

Step 3410 includes receiving the plurality of slow sounding sensing signals transmitted by the sensing transmitter in response to the sensing sounding trigger frame, the plurality of slow sounding sensing signals being received in one or more availability windows. According to an implementation, sensing receiver 502-1 may be configured to receive the plurality of slow sounding sensing signals transmitted by sensing transmitter 504-1 in response to the sensing sounding trigger frame. In examples, the plurality of slow sounding sensing signals may be received in one or more availability windows. In an example, at least one of the plurality of fast sounding sensing signals may be included in at least one of the plurality of slow sounding sensing signals.

Step 3412 includes performing a second plurality of sensing measurements on the plurality of slow sounding sensing signals, where detecting motion in the sensing space is based on the first plurality of sensing measurements performed on the plurality of fast sounding sensing signals and the second plurality of sensing measurements performed on the plurality of slow sounding sensing signals. According to an implementation, sensing receiver 502-1 may be configured to perform the second plurality of sensing measurements on the plurality of slow sounding sensing signals, where detecting motion in the sensing space is based on the first plurality of sensing measurements performed on the plurality of fast sounding sensing signals and the second plurality of sensing measurements performed on the plurality of slow sounding sensing signals. In an implementation, sensing receiver 502-1 may associate a time stamp with one or more sensing measurements performed on one or more of the plurality of slow sounding sensing signals.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for Wi-Fi sensing carried out by a sensing initiator including at least one processor configured to execute instructions, the method comprising:
 transmitting, by the sensing initiator to a sensing responder, a plurality of sensing sounding trigger frames, each of the plurality of sensing sounding trigger frames identifying a predefined number of high efficiency long training fields to be included within a respective sensing transmission;

receiving, by the sensing initiator from the sensing responder, a plurality of sensing transmissions within one single transmission opportunity period, the one single transmission opportunity period representing an interval of time during which the sensing initiator has the right to initiate a frame exchange, each of the plurality of sensing transmissions including high efficiency long training fields corresponding to the predefined number; and performing, by the sensing initiator, a plurality of sensing measurements on one or more of the high efficiency long training fields included in the plurality of sensing transmissions, wherein the plurality of sensing measurements is used to detect a Doppler frequency of motion in a sensing space.

2. The method of claim 1, further comprising:

receiving, by the sensing initiator, a plurality of sensing signals transmitted by the sensing responder, the plurality of sensing signals being received in one or more availability windows and including a plurality of sensing transmissions spaced apart by at least two short interframe space ("SIFS"); and performing, by the sensing initiator, a second plurality of sensing measurements on the plurality of sensing signals, wherein detecting motion in the sensing space is further based on the plurality of sensing measurements and the second plurality of sensing measurements.

3. The method of claim 2, wherein at least one of the plurality of sensing signals is transmitted in response to a sensing sounding trigger frame of the plurality of sensing sounding trigger frames.

4. The method of claim 2, further comprising associating a time stamp with one or more sensing measurements performed on one or more of the plurality of sensing signals.

5. The method of claim 1, further comprising associating a plurality of time stamps with respective ones of the plurality of sensing measurements performed on the one or more high efficiency long training fields.

6. The method of claim 1, further comprising:

receiving, by the sensing initiator, the high efficiency long training fields separated from one another by a guard interval.

7. The method of claim 1, further comprising:

identifying, by the sensing initiator, the predefined number of high efficiency long training fields.

8. The method of claim 1, further comprising:

receiving, by the sensing initiator, a plurality of frames, each including the predefined number of high efficiency long training fields within the plurality of sensing transmissions.

9. The method of claim 1, further comprising determining the predefined number of high efficiency long training fields to be included within the plurality of sensing transmissions to sense an object moving at at least a threshold speed within a channel of the plurality of sensing transmissions without aliasing.

10. The method of claim 9, wherein the threshold speed is 3.0 m/s.

11. The method of claim 1, further comprising receiving the predefined number of high efficiency long training fields at an average rate of at least 250 kHz.

12. The method of claim 1, further comprising detecting the Doppler frequency of motion in the sensing space according to the plurality of sensing measurements.

13. The method of claim 1, wherein the predefined number of high efficiency long training fields is at least two.

14. A system for Wi-Fi sensing comprising a sensing initiator and including at least one processor configured to execute instructions for:

transmitting a plurality of sensing sounding trigger frames, each of the plurality of sensing sounding trigger frames identifying a predefined number of high efficiency long training fields to be included within a respective sensing transmission;

receiving a plurality of sensing transmissions within a single transmission opportunity period, the one single transmission opportunity period representing an interval of time during which the sensing initiator has the right to initiate a frame exchange, each of the plurality of sensing transmissions including high efficiency long training fields corresponding to the predefined number; and performing a plurality of sensing measurements, on one or more of the high efficiency long training fields included in the plurality of sensing transmissions, wherein the plurality of sensing measurements is used to detect a Doppler frequency of motion in a sensing space.

15. The system of claim 14, wherein the at least one processor is further configured for:

receiving a plurality of sensing signals transmitted by a sensing responder, the plurality of sensing signals being received in one or more availability windows and including a plurality of sensing transmissions spaced apart by at least two short interframe space ("SIFS"); and performing a second plurality of sensing measurements on the plurality of sensing signals, wherein detecting motion in the sensing space is further based on the plurality of sensing measurements performed and the second plurality of sensing measurements.

16. The system of claim 15, wherein at least one of the plurality of sensing signals is transmitted in response to a sensing sounding trigger frame of the plurality of sensing sounding trigger frames.

17. The system of claim 15, wherein the at least one processor is further configured for associating a time stamp with one or more sensing measurements performed on one or more of the plurality of sensing signals.

18. The system of claim 14, wherein the at least one processor is further configured for associating a plurality of time stamps with respective ones of the plurality of sensing measurements performed on the one or more high efficiency long training fields.

19. The system of claim 14, wherein the at least one processor is further configured for:

receiving the high efficiency long training fields separated by a guard interval from one another.

20. The system of claim 14, wherein the at least one processor is further configured for:

identifying the predefined number of high efficiency long training fields.

21. The system of claim 14, wherein the at least one processor is further configured for:

receiving a plurality of frames, each including the predefined number of high efficiency long training fields within the plurality of sensing transmissions.

22. The system of claim 14, wherein the at least one processor is further configured for determining the predefined number of high efficiency long training fields to be included within the plurality of sensing transmissions to sense an object moving at at least a threshold speed within a channel of the plurality of sensing transmissions without aliasing.

23. The system of claim 22, wherein the threshold speed is 3.0 m/s.

24. The system of claim 14, wherein the at least one processor is further configured for receiving the predefined number of high efficiency long training fields at an average rate of at least 250 kHz.

25. The system of claim 14, wherein the at least one processor is further configured for detecting the Doppler frequency of motion in the sensing space according to the plurality of sensing measurements.

26. The system of claim 14, wherein the predefined number of high efficiency long training fields is at least two.

* * * * *